United States Patent
Korrer et al.

(10) Patent No.: US 12,467,918 B1
(45) Date of Patent: Nov. 11, 2025

(54) SYSTEMS AND METHODS FOR MEASURING CHANGES IN CELLULAR ACTIVITY IN LIVE TISSUE

(71) Applicant: Elephas Biosciences Corporation, Madison, WI (US)

(72) Inventors: Michael Korrer, Madison, WI (US); Pichet Adstamongkonkul, Madison, WI (US); T.S. Ramasubramanian, Madison, WI (US); Scott Johnson, Madison, WI (US); Sean Caenepeel, Madison, WI (US)

(73) Assignee: Elephas Biosciences Corporation, Madison, WI (US)

( * ) Notice: Subject to any disclaimer, the term of this patent is extended or adjusted under 35 U.S.C. 154(b) by 0 days.

(21) Appl. No.: 19/038,526

(22) Filed: Jan. 27, 2025

Related U.S. Application Data

(60) Provisional application No. 63/743,964, filed on Jan. 10, 2025.

(51) Int. Cl.
| | |
|---|---|
| *G01N 33/574* | (2006.01) |
| *C12N 5/078* | (2010.01) |
| *G01N 33/48* | (2006.01) |
| *G01N 33/50* | (2006.01) |
| *G01N 33/68* | (2006.01) |

(52) U.S. Cl.
CPC ....... *G01N 33/5047* (2013.01); *C12N 5/0634* (2013.01); *G01N 33/48* (2013.01); *G01N 33/574* (2013.01); *G01N 33/6854* (2013.01); *C12N 2503/02* (2013.01); *G01N 2333/70521* (2013.01); *G01N 2333/70532* (2013.01); *G01N 2333/70578* (2013.01); *G01N 2333/70596* (2013.01); *G01N 2500/10* (2013.01)

(58) Field of Classification Search
CPC ........... G01N 33/5047; G01N 33/6854; G01N 33/48; G01N 33/574; G01N 2333/70521; G01N 2333/70532; G01N 2333/70578; G01N 2333/70596; G01N 2500/10
See application file for complete search history.

(56) References Cited

U.S. PATENT DOCUMENTS

| | | | |
|---|---|---|---|
| 10,627,613 B2 | 4/2020 | Boccara et al. | |
| 2020/0011868 A1* | 1/2020 | Niazi | G01B 11/0675 |
| 2022/0396777 A1* | 12/2022 | Shalek | C12N 5/0693 |
| 2023/0280271 A1 | 9/2023 | Leung et al. | |

OTHER PUBLICATIONS

Adstamongkonkul et al. Comparison of the Clinical Biomarkers DMMR, MSI-H, and PD-L1 with Cytokines Secreted from Anti-PD-1 Treated Human Live Tumor Fragments on an Ex Vivo Platform. J Immunother Cancer. 12, (Suppl. 2): A1-A1683 (Nov. 2024). Abstract 529.*

Huang D et al. Optical coherence tomography, Science 254, 1178-1181 (1991).

C. Apelian, F. Harms, O. Thouvenin, and A. C. Boccara, "Dynamic full field optical coherence tomography: subcellular metabolic contrast revealed in tissues by interferometric signals temporal analysis," Biomed. Opt. Express 7(4), 1511 (2016), 14 pages.

* cited by examiner

*Primary Examiner* — Gailene Gabel
(74) *Attorney, Agent, or Firm* — Casimir Jones, S.C.; Robert A. Goetz

(57) ABSTRACT

Provided herein are systems and methods for measuring cellular activity within a biological sample comprising living cells over an extended time period. In particular, provided herein are techniques for measuring changes in cellular activity within a tissue sample comprising living cells (e.g., a tissue section comprising living cells) during and/or after exposure to a first stimulus (e.g., a control stimulus) at a first time point and during and/or after exposure to a second stimulus (e.g., a non-control stimulus) (e.g., a pharmaceutical stimulus) at a second time point after the first time point.

19 Claims, 12 Drawing Sheets

SYSTEMS AND METHODS FOR MEASURING CHANGES IN CELLULAR ACTIVITY IN LIVE TISSUE

CROSS-REFERENCE TO RELATED APPLICATIONS

The present application claims priority to U.S. Provisional Application No. 63/743,964, filed Jan. 10, 2025, which is incorporated herein by reference in its entirety.

FIELD OF THE INVENTION

Provided herein are systems and methods for measuring cellular activity within a biological sample comprising living cells over an extended time period. In particular, provided herein are techniques for measuring changes in cellular activity within a tissue sample comprising living cells (e.g., a tissue section comprising living cells) during and/or after exposure to a first stimulus (e.g., a control stimulus) at a first time point and during and/or after exposure to a second stimulus (e.g., a non-control stimulus) (e.g., a pharmaceutical stimulus) at a second time point after the first time point.

BACKGROUND

Current methods to measure biomolecules, such as secretory factors and activated caspase species in apoptotic cells, in response to a stimulus entail comparing the biomolecule levels in treated versus untreated conditions. Such comparisons are meaningful when the tissue being queried is homogeneous such that the two treatment arms (untreated and treated) represent similar distribution of cell populations. Fragments of a tumor or sections of a biopsy or portions of or the entirety of a tumor microenvironment (TME) are not homogeneous in terms of constitution (e.g., cellular constitution of regions within and surrounding (e.g., proximity) tumor cells, composition of extracellular matrix (ECM), architecture of cells, tissue composition). Thereby, the two treatment arms (untreated and treated) are confounded by the heterogeneity of the tissue. It is therefore challenging to interpret biomolecule data.

One way to overcome such a tissue heterogeneity problem is to "cut up" the tissue into smaller and smaller pieces, at which point homogeneity can be achieved between treatment groups even when the amount of tissue available is minimal. However, when the tissue is dissociated so extensively the native TME is lost (e.g., architecture, cell neighborhoods and ecotypes). As such, measuring cellular activity changes within a native TME limits the extent to which tumor biopsies can be cut and/or dissociated into smaller and smaller pieces as such would result in a compromised TME.

Alternatively, the problem of measuring cellular activity changes in a heterogeneous sample (e.g., including a native and uncompromised TME) can be overcome, in part, by testing large numbers of samples, in parallel, such that statistical measures are used to compensate for heterogeneity. However, such approaches are resource intensive and are not viable where samples are scarce (e.g., number of samples are scarce; amount of tissue from which sample is obtained is scarce).

Improved methods for measuring cellular activity in heterogeneous tissue samples comprising living cells are needed.

The present invention addresses these needs.

SUMMARY

The systems and methods disclosed herein address methods for measuring cellular activity in heterogeneous biological samples by allowing for a single-sample assay (e.g., the same tissue sample within a well is treated with both control and treatment sequentially as opposed to splitting the same tissue sample into two wells wherein each split tissue sample receives either a control or a treatment) (e.g., allowing for the sample to be assessed without bifurcation of the sample into control and treated arm) wherein the change in biomolecules upon receiving a stimulus is measured over time and compared to the change before receiving the stimulus (baseline) in the same tissue. The change in secretory factor amount, for example, over time is measured as a rate of change or slope, which considers the duration of response and serves as internal normalization of tissue heterogeneity.

Accordingly, provided herein are systems and methods for measuring cellular activity within a biological sample comprising living cells over an extended time period. In particular, provided herein are techniques for measuring changes in cellular activity within a tissue sample comprising living cells (e.g., a tissue section comprising living cells) during and/or after exposure to a first stimulus (e.g., a control stimulus) at a first time point and during and/or after exposure to a second stimulus (e.g., a non-control stimulus) (e.g., a pharmaceutical stimulus) at a second time point after the first time point.

In certain embodiments, the present invention provides a method, comprising obtaining a tissue sample comprising living cells; under culture conditions, exposing the tissue sample to a first stimulus at a first time point; measuring cellular activity in the tissue sample during and/or after exposure to the first stimulus; under culture conditions, exposing the tissue sample to a second stimulus at a second time point after the first time point; measuring cellular activity in the tissue sample during and/or after exposure to the second stimulus; determining changes in cellular activity within the tissue sample based on 1) the cellular activity measurements before the second time point, and during and/or after the first time point, and 2) the cellular activity measurements during and/or after the second time point.

In some embodiments, the "culture conditions" or "under culture conditions" are standard culture conditions. In some embodiments, the "culture conditions" or "under culture conditions" are culture conditions not capable of changing cellular activity within the living cells (e.g., living cells within a tissue sample) (e.g., living cells within a tissue section). In some embodiments, the "culture conditions" or "under culture conditions" are culture conditions suitable for maintaining viability of the living cells (e.g., living cells within a tissue sample) (e.g., living cells within a tissue section). In some embodiments, the "culture conditions" or "under culture conditions" are culture conditions suitable for maintaining viability of the living cells (e.g., living cells within a tissue sample) (e.g., living cells within a tissue section) without changing cellular activity within the living cells.

In some embodiments, the tissue sample comprising living cells comprises one or more tissue sections comprising living cells. In some embodiments, the one or more tissue sections comprising living cells have a thickness of approximately 100 microns to 1 millimeter. In some embodiments, the one or more tissue sections have a three-dimensional size of approximately 300 microns×300 microns×300 microns. In some embodiments, the one or more tissue sections have a three-dimensional size of approximately 900 microns×900 microns×600 microns.

In some embodiments, the tissue sample and/or tissue section comprising living cells (e.g., living tumor cells) has an approximate length between 100 µm to 8.81 mm. In some embodiments, the tissue sample and/or tissue section comprising living cells (e.g., living tumor cells) has an approximate width between approximately 100 µm to 3 mm. In some embodiments, the tissue sample and/or tissue section comprising living cells (e.g., living tumor cells) has an approximate height between approximately 100 µm to 1 mm. In some embodiments, the tissue sample and/or tissue section comprising living cells (e.g., living tumor cells) has an approximate length between 100 µm to 8.81 mm, an approximate width between approximately 100 µm to 3 mm, and an approximate height between approximately 100 µm to 1 mm.

In some embodiments, the tissue sample comprising living cells is selected from one or more of: a tissue needle biopsy longitudinally cut into one or more strips, a tissue needle biopsy longitudinally cut into one or more tissue sections, whole tissue biopsies or tissue biopsies that have been cut longitudinally into one or more strips, a tissue coin cut from a biopsy, a whole biopsy, a bisected biopsy sample, and a living tissue fragment.

In some embodiments, the tissue sample is derived from a biopsy. In some embodiments, the tissue sample is derived from a needle biopsy, or wherein the tissue sample is cut from a needle biopsy. In some embodiments, the tissue sample comprises living tumor cells and/or living non-tumor cells. In some embodiments, the tissue sample comprises living tumor cells and living non-tumor cells. In some embodiments, the tissue sample comprising living cells further comprises non-living cells. In some embodiments, the tissue sample comprising living cells comprises one or more of normal cells, diseased cells, stem cells, endothelial cells, stromal cells, epithelial cells, neuronal cells, connective cells, myocardial cells, hepatocytes, renal cells, tumor cells, liver cells, pancreatic cells, muscle cells, brain cells, kidney cells, and patient-specific cells. In some embodiments, the tissue sample comprises living cells selected from cultured cells, cancer cells, tissue sample cells, tumor cells, tumor cells derived from the biopsy of a cancer patient, normal cells derived from a healthy patient, known cell lines, and combinations thereof. In some embodiments, the tissue sample comprising living cells comprises living immune cells. In some embodiments, the living immune cells are selected from macrophages, B lymphocytes, T lymphocytes, mast cells, monocytes, dendritic cells, eosinophils, natural killer cells, basophils, and neutrophils. In some embodiments, the T lymphocytes are cytotoxic T-cell lymphocytes (CTLs).

In some embodiments, the first stimulus is different than the second stimulus. In some embodiments, the first stimulus is a control stimulus. In some embodiments, the control stimulus is a purified control immunoglobulin, phosphate buffered saline (PBS), and any biological buffer. In some embodiments, the control stimulus are standard culture conditions. In some embodiments, the control stimulus are culture conditions suitable for maintaining viability of the living cells (e.g., living cells within a tissue sample) (e.g., living cells within a tissue section). In some embodiments, the control stimulus are culture conditions suitable for maintaining viability of the living cells (e.g., living cells within a tissue sample) (e.g., living cells within a tissue section) without changing cellular activity within the living cells. In some embodiments, the "under culture conditions" is the first stimulus (e.g., the control stimulus). In some embodiments, the "under culture conditions" is different than the first stimulus (e.g., the control stimulus).

In some embodiments, the second stimulus is a non-control stimulus. In some embodiments, the second stimulus is one or more of an antibody or a fragment thereof, a protein, a nucleic acid (e.g., DNA, RNA, siRNA, shRNA), a small molecule compound, and a virus. In some embodiments, the second stimulus is a pharmaceutical agent. In some embodiments, the second stimulus is one or more immune checkpoint inhibitors (ICIs).

In some embodiments, the second stimulus is selected from atezolizumab, avelumab, bevacizumab, cemiplimab, cetuximab, daratumumab, dinutuximab, durvalumab, elotuzumab, ipilimumab, isatuximab, mogamulizumab, necitumumab, nivolumab, obinutuzumab, ofatumumab, olaratumab, panitumumab, pembrolizumab, pertuzumab, ramucirumab, rituximab, trastuzumab, gemtuzumab ozogamicin, brentuximab vedotin, trastuzumab emtansine, inotuzumab ozogamicin, polatuzumab vedotin, enfortumab vedotin, trastuzumab deruxtecan, Sacituzumab govitecan, moxetumomab pasudotox, ibritumomab tiuxetan, iodine tositumomab, and blatinumomab. In some embodiments, the one or more ICIs is an inhibitor of PD-1, PD-L1, CTLA4, LAG3, TIGIT, TIM3, VISTA, ICOS, BTLA, GITR, NKG2A, CD112R, B7-H3, or CD73.

In some embodiments, the second stimulus is one or more of any pharmaceutical agents capable of or suspected of being capable of treating a disease or condition related atherosclerosis; multiple sclerosis; diabetes; diabetic retinopathy; arthritis; rheumatoid arthritis; a fungal, viral, chlamydial, bacterial, nanobacterial or parasitic infectious disease; HIV causing AIDS; infection with SARS virus (e.g., severe acute respiratory syndrome coronavirus 2 (SARS-CoV-2)), Asian (chicken) flu virus, herpes simplex or herpes zoster; hepatitis; viral hepatitis; a cardiovascular disease; coronary artery stenosis; carotid artery stenosis; intermittent claudication; a dermatological condition; acne; psoriasis; a disease characterized by benign or malignant cellular hyperproliferation or by areas of neovascularization; a benign or malignant tumor; early cancer; cervical dysplasia; soft tissue sarcoma; a germ cell tumor; retinoblastoma; age-related macular degeneration; lymphoma; Hodgkin's lymphoma; head and neck cancer; oral or mouth cancer; or cancer of the blood, prostate, cervix, uterus, vaginal or other female adnexa, breast, naso-pharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin or pancreas.

In some embodiments, one or more cellular activity measurements (e.g., 1, 2, 3, 4, 5, 6, 7, 8, 9, 10, 15, 20, 25, 50, 75, 100, 1000, 10000 cellular activity measurements) are taken during and/or after the first time point and before the second time point; and/or one or more cellular activity measurements (e.g., 1, 2, 3, 4, 5, 6, 7, 8, 9, 10, 15, 20, 25, 50, 75, 100, 1000, 10000 cellular activity measurements) are taken during and/or after the second time point.

In some embodiments, cellular activity measurements (e.g., 1, 2, 3, 4, 5, 6, 7, 8, 9, 10, 15, 20, 25, 50, 75, 100, 1000, 10000 cellular activity measurements) are taken during and/or after the first time point and before the second time point at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1,000, 10,000 days); and/or cellular activity measurements (e.g., 1, 2, 3, 4, 5, 6, 7, 8, 9, 10, 15, 20, 25, 50, 75, 100, 1000, 10000 cellular activity measurements) are taken during and/or after the second time point at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1000, 10000 days).

In some embodiments, cellular activity is measured in the tissue sample continuously during and/or after the first time point but before the second time point; and/or cellular activity is measured in the tissue sample continuously during and/or after the second time point until an end-point.

In some embodiments, measuring cellular activity comprises measuring one or more types of cellular activity selected from: cellular activation, cellular inhibition, cellular interaction, protein expression, protein secretion, metabolite secretion, changes in lipid profiles, microvesicle secretion, exosome secretion, microparticle secretion, changes in cellular mass, cellular proliferation, changes in cellular morphology, cellular motility, cell death, cell cytotoxicity, cell lysis, cell membrane polarization, establishment of a synapse, dynamic trafficking of proteins, granule polarization, calcium activation, metabolic changes, small molecule secretion, proton secretion, secretory factor (e.g., cytokine) activity, and combinations thereof.

In some embodiments, measuring cellular activity comprises measuring one or more types of cellular activity selected from: reproduction, growth, adhesion, death, migration, energy production, oxygen utilization, metabolic activity, cell signaling, response to free radical damage, and any combination thereof.

In some embodiments, measuring cellular activity comprises measuring one or more types of immune cell activity. In some embodiments, the one or more type of immune cell activity is selected from macrophage activity, B lymphocyte activity, T lymphocyte activity, mast cell activity, monocyte activity, dendritic cell activity, eosinophil activity, natural killer cell activity, basophil activity, and neutrophil activity. In some embodiments, the T lymphocyte activity comprises cytotoxic T-cell lymphocyte (CTL) activity.

In some embodiments, determining the changes in cellular activity within the tissue sample comprises determining slope-change of the measured cellular activity, and/or determining fold-change of the measured cellular activity. In some embodiments, determining the changes in cellular activity within the tissue sample comprises calculating a slope-change for 1) the cellular activity measurement before the second time point and after the first time point, and 2) the cellular activity measurement after the second time point. In some embodiments, determining the changes in cellular activity within the tissue sample comprises calculating a fold-change for 1) the cellular activity measurement before the second time point and after the first time point, and 2) the cellular activity measurement after the second time point.

In some embodiments, the cellular activity is measured by one or more of the following: optical coherence microscopy (OCM), dynamic optical coherence microscopy (dOCM), multi-photon microscopy (MPM), fluorescent lifetime imaging microscopy (FLIM), bright field microscopy, and/or fluorescence imaging with dyes, interferometry, or a combination thereof.

In some embodiments, the method further comprises, under culture conditions, exposing the tissue sample to one or more additional stimuli (e.g., a third stimulus, a fourth stimulus, a fifth stimulus, a tenth stimulus, a $20^{th}$ stimulus, etc.), measuring cellular activity in the tissue sample during and/or after each exposure to the one or more additional stimuli, and determining changes in cellular activity in the tissue sample following exposure to each of the one or more additional stimuli based on 1) the cellular activity measurement during and before any or all of the previous stimuli exposure, and 2) the cellular activity measurement during and/or after the most recent stimuli exposure.

In some embodiments, each of the one or more additional stimuli is independently selected from a control stimulus and a non-control stimulus. In some embodiments, each of the one or more additional stimuli is independently selected from an antibody or a fragment thereof, a protein, a nucleic acid (e.g., DNA, RNA, siRNA, shRNA), a small molecule compound, and a virus.

In some embodiments, at least one of the one or more additional stimuli is an ICI. In some embodiments, at least one of the one or more additional stimuli is selected from atezolizumab, avelumab, bevacizumab, cemiplimab, cetuximab, daratumumab, dinutuximab, durvalumab, elotuzumab, ipilimumab, isatuximab, mogamulizumab, necitumumab, nivolumab, obinutuzumab, ofatumumab, olaratumab, panitumumab, pembrolizumab, pertuzumab, ramucirumab, rituximab, trastuzumab, gemtuzumab ozogamicin, brentuximab vedotin, trastuzumab emtansine, inotuzumab ozogamicin, polatuzumab vedotin, enfortumab vedotin, trastuzumab deruxtecan, Sacituzumab govitecan, moxetumomab pasudotox, ibritumomab tiuxetan, iodine tositumomab, blatinumomab. In some embodiments, the ICI is an inhibitor of PD-1, PD-L1, CTLA4, LAG3, TIGIT, TIM3, VISTA, ICOS, BTLA, GITR, NKG2A, CD112R, B7-H3, or CD73.

In some embodiments, each of the one or more additional stimuli is independently selected from any pharmaceutical agent capable of or suspected of being capable of treating a disease or condition related atherosclerosis; multiple sclerosis; diabetes; diabetic retinopathy; arthritis; rheumatoid arthritis; a fungal, viral, chlamydial, bacterial, nanobacterial or parasitic infectious disease; HIV causing AIDS; infection with SARS virus (e.g., severe acute respiratory syndrome coronavirus 2 (SARS-CoV-2)), Asian (chicken) flu virus, herpes simplex or herpes zoster; hepatitis; viral hepatitis; a cardiovascular disease; coronary artery stenosis; carotid artery stenosis; intermittent claudication; a dermatological condition; acne; psoriasis; a disease characterized by benign or malignant cellular hyperproliferation or by areas of neovascularization; a benign or malignant tumor; early cancer; cervical dysplasia; soft tissue sarcoma; a germ cell tumor; retinoblastoma; age-related macular degeneration; lymphoma; Hodgkin's lymphoma; head and neck cancer; oral or mouth cancer; or cancer of the blood, prostate, cervix, uterus, vaginal or other female adnexa, breast, nasopharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin or pancreas.

In certain embodiments, the present invention provides a method, comprising obtaining a tissue sample comprising living cells; providing a processor comprising software that when executed is configured to 1) expose the tissue sample to a first stimulus at a first time point; 2) measure cellular activity in the tissue sample during and/or after exposure to the first stimulus; 3) expose the tissue sample to a second stimulus; 4) measure cellular activity in the tissue sample during and/or after exposure to the second stimulus; 5) determine changes in cellular activity in the tissue sample a) before the before the second stimulus, and during and/or after exposure to the first stimulus, and b) during and/or after exposure to the second stimulus; and 6) report the determined change in cellular activity; executing the software such that under culture conditions the tissue sample is exposed to a first stimulus at a first time point and a second stimulus at a second time point after the first time point;

In some embodiments, executing the software such that cellular activity is measured in the tissue sample during and/or after exposure of the tissue sample to the first stimulus; executing the software such that under culture conditions the tissue sample is exposed to a second stimulus at a second time point after the first time point; executing the software such that cellular activity is measured in the tissue sample during and/or after exposure of the tissue sample to the second stimulus; executing the software such that changes in cellular activity in the tissue sample during and/or after exposure to the first stimulus, and during and/or after exposure to the second stimulus is determined.

In some embodiments, the "culture conditions" or "under culture conditions" are standard culture conditions. In some embodiments, the "culture conditions" or "under culture conditions" are culture conditions not capable of changing cellular activity within the living cells (e.g., living cells within a tissue sample) (e.g., living cells within a tissue section). In some embodiments, the "culture conditions" or "under culture conditions" are culture conditions suitable for maintaining viability of the living cells (e.g., living cells within a tissue sample) (e.g., living cells within a tissue section). In some embodiments, the "culture conditions" or "under culture conditions" are culture conditions suitable for maintaining viability of the living cells (e.g., living cells within a tissue sample) (e.g., living cells within a tissue section) without changing cellular activity within the living cells.

In some embodiments, the tissue sample comprising living cells comprises one or more tissue sections comprising living cells. In some embodiments, the one or more tissue sections comprising living cells have a thickness of approximately 100 microns to 1 millimeter. In some embodiments, the one or more tissue sections have a three-dimensional size of approximately 300 microns×300 microns×300 microns. In some embodiments, the one or more tissue sections have a three-dimensional size of approximately 900 microns×900 microns×600 microns.

In some embodiments, the tissue sample and/or tissue section comprising living cells (e.g., living tumor cells) has an approximate length between 100 μm to 8.81 mm. In some embodiments, the tissue sample and/or tissue section comprising living cells (e.g., living tumor cells) has an approximate width between approximately 100 μm to 3 mm. In some embodiments, the tissue sample and/or tissue section comprising living cells (e.g., living tumor cells) has an approximate height between approximately 100 μm to 1 mm. In some embodiments, the tissue sample and/or tissue section comprising living cells (e.g., living tumor cells) has an approximate length between 100 μm to 8.81 mm, an approximate width between approximately 100 μm to 3 mm, and an approximate height between approximately 100 μm to 1 mm.

In some embodiments, the tissue sample comprising living cells is selected from one or more of: a tissue needle biopsy longitudinally cut into one or more strips, a tissue needle biopsy longitudinally cut into one or more tissue sections, whole tissue biopsies or tissue biopsies that have been cut longitudinally into one or more strips, a tissue coin cut from a biopsy, a whole biopsy, a bisected biopsy sample, and a living tissue fragment.

In some embodiments, the tissue sample is derived from a biopsy. In some embodiments, the tissue sample is derived from a needle biopsy, or wherein the tissue sample is cut from a needle biopsy.

In some embodiments, the tissue sample comprises living tumor cells and/or living non-tumor cells. In some embodiments, the tissue sample comprises living tumor cells and living non-tumor cells. In some embodiments, the tissue sample comprising living cells further comprises non-living cells. In some embodiments, the tissue sample comprising living cells comprises one or more of normal cells, diseased cells, stem cells, endothelial cells, stromal cells, epithelial cells, neuronal cells, connective cells, myocardial cells, hepatocytes, renal cells, tumor cells, liver cells, pancreatic cells, muscle cells, brain cells, kidney cells, and patient-specific cells.

In some embodiments, the tissue sample comprising living cells comprises living immune cells. In some embodiments, the living immune cells are selected from macrophages, B lymphocytes, T lymphocytes, mast cells, monocytes, dendritic cells, eosinophils, natural killer cells, basophils, and neutrophils. In some embodiments, the T lymphocytes are cytotoxic T-cell lymphocytes (CTLs).

In some embodiments, the first stimulus is different than the second stimulus. In some embodiments, the first stimulus is a control stimulus. In some embodiments, the control stimulus is a purified control immunoglobulin, phosphate buffered saline (PBS), and any biological buffer. In some embodiments, the control stimulus are standard culture conditions. In some embodiments, the control stimulus are culture conditions suitable for maintaining viability of the living cells (e.g., living cells within a tissue sample) (e.g., living cells within a tissue section). In some embodiments, the control stimulus are culture conditions suitable for maintaining viability of the living cells (e.g., living cells within a tissue sample) (e.g., living cells within a tissue section) without changing cellular activity within the living cells. In some embodiments, the "under culture conditions" is the first stimulus (e.g., the control stimulus). In some embodiments, the "under culture conditions" is different than the first stimulus (e.g., the control stimulus).

In some embodiments, the second stimulus is a non-control stimulus. In some embodiments, the second stimulus is one or more of an antibody or a fragment thereof, a protein, a nucleic acid (e.g., DNA, RNA, siRNA, shRNA), a small molecule compound, and a virus. In some embodiments, the second stimulus is a pharmaceutical agent. In some embodiments, the second stimulus is one or more immune checkpoint inhibitors (ICIs).

In some embodiments, the one or more pharmaceutical agents are selected from atezolizumab, avelumab, bevacizumab, cemiplimab, cetuximab, daratumumab, dinutuximab, durvalumab, elotuzumab, ipilimumab, isatuximab, mogamulizumab, necitumumab, nivolumab, obinutuzumab, ofatumumab, olaratumab, panitumumab, pembrolizumab, pertuzumab, ramucirumab, rituximab, trastuzumab, gemtuzumab ozogamicin, brentuximab vedotin, trastuzumab emtansine, inotuzumab ozogamicin, polatuzumab vedotin, enfortumab vedotin, trastuzumab deruxtecan, Sacituzumab govitecan, moxetumomab pasudotox, ibritumomab tiuxetan, iodine tositumomab, blatinumomab.

In some embodiments, the one or more ICIs is an inhibitor of PD-1, PD-L1, CTLA4, LAG3, TIGIT, TIM3, VISTA, ICOS, BTLA, GITR, NKG2A, CD112R, B7-H3, or CD73.

In some embodiments, the second stimulus is one or more of any pharmaceutical agents capable of or suspected of being capable of treating a disease or condition related atherosclerosis; multiple sclerosis; diabetes; diabetic retinopathy; arthritis; rheumatoid arthritis; a fungal, viral, chlamydial, bacterial, nanobacterial or parasitic infectious disease; HIV causing AIDS; infection with SARS virus (e.g., severe acute respiratory syndrome coronavirus 2 (SARS-CoV-2)), Asian (chicken) flu virus, herpes simplex or herpes zoster; hepatitis; viral hepatitis; a cardiovascular disease; coronary artery stenosis; carotid artery stenosis; intermittent claudication; a dermatological condition; acne; psoriasis; a disease characterized by benign or malignant cellular hyperproliferation or by areas of neovascularization; a benign or malignant tumor; early cancer; cervical dysplasia; soft tissue sarcoma; a germ cell tumor; retinoblastoma; age-related macular degeneration; lymphoma; Hodgkin's lymphoma; head and neck cancer; oral or mouth cancer; or cancer of the blood, prostate, cervix, uterus, vaginal or other female adnexa, breast, naso-pharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin or pancreas.

In some embodiments, one or more cellular activity measurements (e.g., 1, 2, 3, 4, 5, 6, 7, 8, 9, 10, 15, 20, 25, 50, 75, 100, 1000, 10000 cellular activity measurements) are taken during and/or after the first time point and before the second time point; and/or one or more cellular activity measurements (e.g., 1, 2, 3, 4, 5, 6, 7, 8, 9, 10, 15, 20, 25, 50, 75, 100, 1000, 10000 cellular activity measurements) are taken during and/or after the second time point.

In some embodiments, cellular activity measurements (e.g., 1, 2, 3, 4, 5, 6, 7, 8, 9, 10, 15, 20, 25, 50, 75, 100, 1000, 10000 cellular activity measurements) are taken during and/or after the first time point and before the second time point at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1000, 10000 days); and/or cellular activity measurements (e.g., 1, 2, 3, 4, 5, 6, 7, 8, 9, 10, 15, 20, 25, 50, 75, 100, 1000, 10000 cellular activity measurements) are taken during and/or after the second time point at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1000, 10000 days).

In some embodiments, cellular activity is measured in the tissue sample continuously during and/or after the first time point but before the second time point; and/or cellular activity is measured in the tissue sample continuously during and/or after the second time point until an end-point.

In some embodiments, measuring cellular activity comprises measuring one or more types of cellular activity selected from: cellular activation, cellular inhibition, cellular interaction, protein expression, protein secretion, metabolite secretion, changes in lipid profiles, microvesicle secretion, exosome secretion, microparticle secretion, changes in cellular mass, cellular proliferation, changes in cellular morphology, cellular motility, cell death, cell cytotoxicity, cell lysis, cell membrane polarization, establishment of a synapse, dynamic trafficking of proteins, granule polarization, calcium activation, metabolic changes, small molecule secretion, proton secretion, secretory factor (e.g., cytokine) activity, and combinations thereof.

In some embodiments, measuring cellular activity comprises measuring one or more types of cellular activity selected from: reproduction, growth, adhesion, death, migration, energy production, oxygen utilization, metabolic activity, cell signaling, response to free radical damage, and any combination thereof.

In some embodiments, measuring cellular activity comprises measuring one or more types of immune cell activity. In some embodiments, the one or more type of immune cell activity is selected from macrophage activity, B lymphocyte activity, T lymphocyte activity, mast cell activity, monocyte activity, dendritic cell activity, eosinophil activity, natural killer cell activity, basophil activity, and neutrophil activity. In some embodiments, the T lymphocyte activity comprises cytotoxic T-cell lymphocyte (CTL) activity.

In some embodiments, determining the changes in cellular activity within the tissue sample comprises determining slope-change of the measured cellular activity, and/or determining fold-change of the measured cellular activity.

In some embodiments, determining the changes in cellular activity within the tissue sample comprises calculating a slope-change for 1) the cellular activity measurement before the second time point, and during and/or after the first time point, and 2) the cellular activity measurement during and/or after the second time point.

In some embodiments, determining the changes in cellular activity within the tissue sample comprises calculating a fold-change for 1) the cellular activity measurement before the second time point, and during and/or after the first time point, and 2) the cellular activity measurement during and/or after the second time point.

In some embodiments, the cellular activity is measured by one or more of the following: optical coherence microscopy (OCM), dynamic optical coherence microscopy (dOCM), multi-photon microscopy (MPM), fluorescent lifetime imaging microscopy (FLIM), bright field microscopy, and/or fluorescence imaging with dyes, interferometry, or a combination thereof.

In some embodiments, the software, when executed, is further configured to expose the tissue sample to one or more additional stimuli (e.g., a third stimulus, a fourth stimulus, a fifth stimulus, a tenth stimulus, a $20^{th}$ stimulus, etc.); the software, when executed, is further configured to measure cellular activity in the tissue sample during and/or after each exposure to the one or more additional stimuli; the software, when executed, is further configured to determine changes in cellular activity in the tissue sample during and/or after exposure to each of the one or more additional stimuli based on 1) the cellular activity measurement before any or all of the previous stimuli exposure, and 2) the cellular activity measurement during and/or after the most recent stimuli exposure.

In some embodiments, the method further comprises executing the software such that under culture conditions the tissue sample is exposed to the one or more additional stimuli; executing the software such that cellular activity is measured in the tissue sample during and/or after exposure to the one or more additional stimuli; executing the software such that changes in cellular activity in the tissue sample during and/or after exposure to the one or more additional stimuli is determined. In some embodiments, each of the one or more additional stimuli is independently selected from a control stimulus and a non-control stimulus. In some embodiments, each of the one or more additional stimuli is independently selected from an antibody or a fragment thereof, a protein, a nucleic acid (e.g., DNA, RNA, siRNA, shRNA), a small molecule compound, and a virus.

In some embodiments, at least one of the one or more additional stimuli is an ICI.

In some embodiments, the one or more additional stimuli is selected from atezolizumab, avelumab, bevacizumab, cemiplimab, cetuximab, daratumumab, dinutuximab, durvalumab, elotuzumab, ipilimumab, isatuximab, mogamulizumab, necitumumab, nivolumab, obinutuzumab, ofatumumab, olaratumab, panitumumab, pembrolizumab, pertuzumab, ramucirumab, rituximab, trastuzumab, gemtuzumab ozogamicin, brentuximab vedotin, trastuzumab emtansine, inotuzumab ozogamicin, polatuzumab vedotin, enfortumab vedotin, trastuzumab deruxtecan, Sacituzumab govitecan, moxetumomab pasudotox, ibritumomab tiuxetan, iodine tositumomab, blatinumomab.

In some embodiments, the one or more additional stimuli is an ICI inhibitor selected from PD-1, PD-L1, CTLA4, LAG3, TIGIT, TIM3, VISTA, ICOS, BTLA, GITR, NKG2A, CD112R, B7-H3, and CD73.

In some embodiments, each of the one or more additional stimuli is independently selected from any pharmaceutical agent capable of or suspected of being capable of treating a disease or condition related atherosclerosis; multiple sclerosis; diabetes; diabetic retinopathy; arthritis; rheumatoid arthritis; a fungal, viral, chlamydial, bacterial, nanobacterial or parasitic infectious disease; HIV causing AIDS; infection with SARS virus (e.g., severe acute respiratory syndrome coronavirus 2 (SARS-CoV-2)), Asian (chicken) flu virus, herpes simplex or herpes zoster; hepatitis; viral hepatitis; a cardiovascular disease; coronary artery stenosis; carotid artery stenosis; intermittent claudication; a dermatological condition; acne; psoriasis; a disease characterized by benign or malignant cellular hyperproliferation or by areas of neovascularization; a benign or malignant tumor; early cancer; cervical dysplasia; soft tissue sarcoma; a germ cell tumor; retinoblastoma; age-related macular degeneration; lymphoma; Hodgkin's lymphoma; head and neck cancer; oral or mouth cancer; or cancer of the blood, prostate, cervix, uterus, vaginal or other female adnexa, breast, nasopharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin or pancreas.

In certain embodiments, the present invention provides a system comprising: a tissue sample comprising living cells; and a processor comprising software that when executed is configured to 1) expose the tissue sample to a first stimulus at a first time point; 2) measure cellular activity in the tissue sample during and/or after exposure to the first stimulus; 3) expose the tissue sample to a second stimulus at a second time point after the first time point; 4) measure cellular activity in the tissue sample during and/or after exposure to the second stimulus; 5) determine changes in cellular activity in the tissue sample during and/or after exposure to the first stimulus and during and/or after exposure to the second stimulus; and 6) report the determined change in cellular activity.

In some embodiments, the software, when executed, is further configured to expose the tissue sample to one or more additional stimuli (e.g., a third stimulus, a fourth stimulus, a fifth stimulus, a tenth stimulus, a $20^{th}$ stimulus, etc.); the software, when executed, is further configured to measure cellular activity in the tissue sample during and/or after each exposure to the one or more additional stimuli; the software, when executed, is further configured to determine changes in cellular activity in the tissue sample during and/or after exposure to each of the one or more additional stimuli based on 1) the cellular activity measurement before any or all of the previous stimuli exposure, and 2) the cellular activity measurement during and/or after the most recent stimuli exposure.

In certain embodiments, the present invention provides a method comprising: obtaining a plurality of tissue samples comprising living cells; providing a device that when operated is configured to expose each of the tissue samples to a first stimulus at a first time point, measure cellular activity in each of the tissue samples during and/or after exposure to the first stimulus, expose each of the tissue samples to a second stimulus at a second time point after the first time point, and measure cellular activity in each of the tissue samples during and/or after exposure to the second stimulus, and operating the device such that, under culture conditions, each of the tissue samples is exposed to a first stimulus at a first time point; operating the device such that cellular activity in each of the tissue samples during and/or after exposure to the first stimulus is measured; operating the device such that, under culture conditions, each of the tissue samples is exposed to a second stimulus at a second time point after the first time point; operating the device such that cellular activity in each of the tissue samples during and/or after exposure to the second stimulus is measured; determining changes in cellular activity within each of the tissue samples based on 1) the cellular activity measurement before the second time point, and during and/or after the first time point, and 2) the cellular activity measurement during and/or after the second time point.

In some embodiments, wherein the plurality of tissue samples are arranged in a contained setting. In some embodiments, each of the tissue samples within the contained setting is sequentially positioned within range of the device, wherein positioning of a tissue sample within range of the device permits the device to 1) expose the tissue sample to a first or second stimulus, and/or 2) measure cellular activity. In some embodiments, each of the tissue samples within the contained setting is automatically positioned within range of the device via movement of the device or the contained setting. In some embodiments, each of the tissue samples within the contained setting is manually positioned within range of the device via movement of the device or the contained setting.

In some embodiments, the contained setting is a linear or non-linear array.

In some embodiments, the device, when operated, is further configured to expose each of the tissue samples to one or more additional stimuli (e.g., a third stimulus, a fourth stimulus, a fifth stimulus, a tenth stimulus, a $20^{th}$ stimulus, etc.); and the device, when operated, is further configured to measure cellular activity in the tissue sample during and/or after each exposure to the one or more additional stimuli.

In some embodiments, the method further comprises determining changes in cellular activity in each of the tissue samples during and/or after exposure to each of the one or more additional stimuli based on 1) the cellular activity measurement before any or all of the previous stimuli exposure, and 2) the cellular activity measurement during and/or after the most recent stimuli exposure.

In certain embodiments, the present invention provides a system, comprising a plurality of tissue samples comprising living cells; a device that when operated is configured to expose each of the tissue samples to a first stimulus at a first time point, measure cellular activity in each of the tissue samples during and/or after exposure to the first stimulus, expose each of the tissue samples to a second stimulus at a second time point after the first time point, and measure cellular activity in each of the tissue samples during and/or after exposure to the second stimulus, and operating the device such that, under culture conditions, each of the tissue samples is exposed to a first stimulus at a first time point; operating the device such that cellular activity in each of the tissue samples during and/or after exposure to the first stimulus is measured; operating the device such that, under culture conditions, each of the tissue samples is exposed to a second stimulus at a second time point after the first time point; operating the device such that cellular activity in each of the tissue samples during and/or after exposure to the second stimulus is measured.

In some embodiments, the "culture conditions" or "under culture conditions" are standard culture conditions. In some embodiments, the "culture conditions" or "under culture conditions" are culture conditions not capable of changing cellular activity within the living cells (e.g., living cells within a tissue sample) (e.g., living cells within a tissue section). In some embodiments, the "culture conditions" or "under culture conditions" are culture conditions suitable for maintaining viability of the living cells (e.g., living cells within a tissue sample) (e.g., living cells within a tissue section). In some embodiments, the "culture conditions" or "under culture conditions" are culture conditions suitable for maintaining viability of the living cells (e.g., living cells within a tissue sample) (e.g., living cells within a tissue section) without changing cellular activity within the living cells.

In some embodiments, the plurality of tissue samples are arranged in a contained setting. In some embodiments, each of the tissue samples within the contained setting is sequentially positioned within range of the device, wherein positioning of a tissue sample within range of the device permits the device to 1) expose the tissue sample to a first or second stimulus, and/or 2) measure cellular activity.

In some embodiments, each of the tissue samples within the contained setting is capable of being automatically positioned within range of the device via movement of the device or the contained setting. In some embodiments, each of the tissue samples within the contained setting is capable of being manually positioned within range of the device via movement of the device or the contained setting.

In some embodiments, the contained setting is a linear or non-linear array.

In some embodiments, the device, when operated, is further configured to expose each of the tissue samples to one or more additional stimuli (e.g., a third stimulus, a fourth stimulus, a fifth stimulus, a tenth stimulus, a $20^{th}$ stimulus, etc.); and the device, when operated, is further configured to measure cellular activity in the tissue sample during and/or after each exposure to the one or more additional stimuli.

In some embodiments, the tissue sample comprising living cells comprises one or more tissue sections comprising living cells. In some embodiments, the one or more tissue sections comprising living cells have a thickness of approximately 100 microns to 1 millimeter. In some embodiments, the one or more tissue sections have a three-dimensional size of approximately 300 microns×300 microns×300 microns. In some embodiments, the one or more tissue sections have a three-dimensional size of approximately 900 microns×900 microns×600 microns.

In certain embodiments, the present invention provides a method, comprising obtaining a tissue sample comprising living cells; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point, wherein the second stimulus is a pharmaceutical agent; measuring cellular activity in the tissue sample during and/or after exposure to the second stimulus; determining changes in cellular activity within the tissue sample based on 1) the cellular activity measurement before the second time point, and during and/or after the first time point, and 2) the cellular activity measurement during and/or after the second time point; identifying the pharmaceutical agent as having an acceptable therapeutic effect or an unacceptable therapeutic effect based on comparing the determined change in cellular activity with established norms indicative of an acceptable therapeutic effect and an unacceptable therapeutic effect.

In some embodiments, the tissue sample comprising living cells comprises one or more tissue sections comprising living cells. In some embodiments, the one or more tissue sections comprising living cells have a thickness of approximately 100 microns to 1 millimeter. In some embodiments, the one or more tissue sections have a three-dimensional size of approximately 300 microns×300 microns×300 microns. In some embodiments, the one or more tissue sections have a three-dimensional size of approximately 900 microns×900 microns×600 microns.

In some embodiments, the tissue sample and/or tissue section comprising living cells (e.g., living tumor cells) has an approximate length between 100 μm to 8.81 mm. In some embodiments, the tissue sample and/or tissue section comprising living cells (e.g., living tumor cells) has an approximate width between approximately 100 μm to 3 mm. In some embodiments, the tissue sample and/or tissue section comprising living cells (e.g., living tumor cells) has an approximate height between approximately 100 μm to 1 mm. In some embodiments, the tissue sample and/or tissue section comprising living cells (e.g., living tumor cells) has an approximate length between 100 μm to 8.81 mm, an approximate width between approximately 100 μm to 3 mm, and an approximate height between approximately 100 μm to 1 mm.

In some embodiments, the "culture conditions" or "under culture conditions" are standard culture conditions. In some embodiments, the "culture conditions" or "under culture conditions" are culture conditions not capable of changing cellular activity within the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample) without changing cellular activity within the living cells.

In some embodiments, the first stimulus is different than the second stimulus. In some embodiments, the first stimulus is a control stimulus. In some embodiments, the control stimulus is a purified control immunoglobulin, phosphate buffered saline (PBS), and any biological buffer. In some embodiments, the control stimulus are standard culture conditions. In some embodiments, the control stimulus are culture conditions suitable for maintaining viability of the living cells (e.g., living cells within a tissue sample) (e.g., living cells within a tissue sample). In some embodiments, the control stimulus are culture conditions suitable for maintaining viability of the living cells (e.g., living cells within a tissue sample) (e.g., living cells within a tissue sample) without changing cellular activity within the living cells. In some embodiments, the "under culture conditions" is the first stimulus (e.g., the control stimulus). In some embodiments, the "under culture conditions" is different than the first stimulus (e.g., the control stimulus).

In certain embodiments, the present invention provides a method, comprising obtaining a tissue sample comprising living tumor cells from subject having cancer; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point, wherein the second stimulus is a pharmaceutical agent; measuring cellular activity in the tissue sample during and/or after exposure to the second stimulus; determining changes in cellular activity within the tissue sample based on 1) the cellular activity measurement before the second time point, and during and/or after the first time point, and 2) the cellular activity measurement during and/or after the second time point; identifying the pharmaceutical agent as having an acceptable therapeutic treatment for the subject or an unacceptable therapeutic treatment for the subject based on comparing the determined change in cellular activity with established norms indicative of an acceptable therapeutic effect and an unacceptable therapeutic effect.

In some embodiments, the tissue sample comprising living cells comprises one or more tissue sections comprising living cells. In some embodiments, the one or more tissue sections comprising living cells have a thickness of approximately 100 microns to 1 millimeter. In some embodiments, the one or more tissue sections have a three-dimensional size of approximately 300 microns×300 microns×300 microns. In some embodiments, the one or more tissue sections have a three-dimensional size of approximately 900 microns×900 microns×600 microns.

In some embodiments, the tissue sample and/or tissue section comprising living cells (e.g., living tumor cells) has an approximate length between 100 μm to 8.81 mm. In some embodiments, the tissue sample and/or tissue section comprising living cells (e.g., living tumor cells) has an approximate width between approximately 100 μm to 3 mm. In some embodiments, the tissue sample and/or tissue section comprising living cells (e.g., living tumor cells) has an approximate height between approximately 100 μm to 1 mm. In some embodiments, the tissue sample and/or tissue section comprising living cells (e.g., living tumor cells) has an approximate length between 100 μm to 8.81 mm, an approximate width between approximately 100 μm to 3 mm, and an approximate height between approximately 100 μm to 1 mm.

In some embodiments, the "culture conditions" or "under culture conditions" are standard culture conditions. In some embodiments, the "culture conditions" or "under culture conditions" are culture conditions not capable of changing cellular activity within the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample) without changing cellular activity within the living cells.

In some embodiments, the first stimulus is different than the second stimulus. In some embodiments, the first stimulus is a control stimulus. In some embodiments, the control stimulus is a purified control immunoglobulin, phosphate buffered saline (PBS), and any biological buffer. In some embodiments, the control stimulus are standard culture conditions. In some embodiments, the control stimulus are culture conditions suitable for maintaining viability of the living cells (e.g., living cells within a tissue sample) (e.g., living cells within a tissue sample). In some embodiments, the control stimulus are culture conditions suitable for maintaining viability of the living cells (e.g., living cells within a tissue sample) (e.g., living cells within a tissue sample) without changing cellular activity within the living cells. In some embodiments, the "under culture conditions" is the first stimulus (e.g., the control stimulus). In some embodiments, the "under culture conditions" is different than the first stimulus (e.g., the control stimulus).

In certain embodiments, the present invention provides a method, comprising obtaining a tissue sample comprising living immune cells, wherein the living immune cells are selected from one or more of macrophages, B lymphocytes, T lymphocytes, mast cells, monocytes, dendritic cells, eosinophils, natural killer cells, basophils, and neutrophils; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point; measuring cellular activity in the tissue sample during and/or after exposure to the second stimulus; determining changes in cellular activity within the tissue sample based on 1) the cellular activity measurement before the second time point, and during and/or after the first time point, and 2) the cellular activity measurement after the second time point; wherein the cellular activity is immune cell activity selected from one or more of macrophage activity, B lymphocyte activity, T lymphocyte activity, mast cell activity, monocyte activity, dendritic cell activity, eosinophil activity, natural killer cell activity, basophil activity, and neutrophil activity.

In some embodiments, the tissue sample comprising living cells comprises one or more tissue sections comprising living cells. In some embodiments, the one or more tissue sections comprising living cells have a thickness of approximately 100 microns to 1 millimeter.

In some embodiments, the one or more tissue sections have a three-dimensional size of approximately 300 microns×300 microns×300 microns. In some embodiments, the one or more tissue sections have a three-dimensional size of approximately 900 microns×900 microns×600 microns.

In some embodiments, the tissue sample and/or tissue section comprising living cells (e.g., living tumor cells) has an approximate length between 100 μm to 8.81 mm. In some embodiments, the tissue sample and/or tissue section comprising living cells (e.g., living tumor cells) has an approximate width between approximately 100 μm to 3 mm. In some embodiments, the tissue sample and/or tissue section comprising living cells (e.g., living tumor cells) has an approximate height between approximately 100 μm to 1 mm. In some embodiments, the tissue sample and/or tissue section comprising living cells (e.g., living tumor cells) has an approximate length between 100 μm to 8.81 mm, an approximate width between approximately 100 μm to 3 mm, and an approximate height between approximately 100 μm to 1 mm.

In some embodiments, the tissue sample comprising living cells is selected from one or more of: a tissue needle biopsy longitudinally cut into one or more strips, a tissue needle biopsy longitudinally cut into one or more tissue sections, whole tissue biopsies or tissue biopsies that have been cut longitudinally into one or more strips, a tissue coin cut from a biopsy, a whole biopsy, a bisected biopsy sample, and a living tissue fragment.

In some embodiments, the tissue sample is derived from a biopsy.

In some embodiments, the tissue sample is derived from a needle biopsy, or wherein the tissue sample is cut from a needle biopsy. In some embodiments, the tissue sample comprises living tumor cells and/or living non-tumor cells. In some embodiments, the tissue sample comprises living tumor cells and living non-tumor cells. In some embodiments, the tissue sample comprising living cells further comprises non-living cells. In some embodiments, the T lymphocytes are cytotoxic T-cell lymphocytes (CTLs).

In some embodiments, the first stimulus is a purified control immunoglobulin.

In some embodiments, the control stimulus is a purified control immunoglobulin, phosphate buffered saline (PBS), and any biological buffer. In some embodiments, the control stimulus are standard culture conditions. In some embodiments, the control stimulus are culture conditions suitable for maintaining viability of the living cells (e.g., living cells within a tissue sample) (e.g., living cells within a tissue sample). In some embodiments, the control stimulus are culture conditions suitable for maintaining viability of the living cells (e.g., living cells within a tissue sample) (e.g., living cells within a tissue sample) without changing cellular activity within the living cells. In some embodiments, the "under culture conditions" is the first stimulus (e.g., the control stimulus). In some embodiments, the "under culture conditions" is different than the first stimulus (e.g., the control stimulus).

In some embodiments, the second stimulus is a non-control stimulus. In some embodiments, the second stimulus is one or more of an antibody or a fragment thereof, a protein, a nucleic acid (e.g., DNA, RNA, siRNA, shRNA), a small molecule compound, and a virus. In some embodiments, the second stimulus is a pharmaceutical agent. In some embodiments, the second stimulus is one or more immune checkpoint inhibitors (ICIs).

In some embodiments, the pharmaceutical agent is selected from atezolizumab, avelumab, bevacizumab, cemiplimab, cetuximab, daratumumab, dinutuximab, durvalumab, elotuzumab, ipilimumab, isatuximab, mogamulizumab, necitumumab, nivolumab, obinutuzumab, ofatumumab, olaratumab, panitumumab, pembrolizumab, pertuzumab, ramucirumab, rituximab, trastuzumab, gemtuzumab ozogamicin, brentuximab vedotin, trastuzumab emtansine, inotuzumab ozogamicin, polatuzumab vedotin, enfortumab vedotin, trastuzumab deruxtecan, Sacituzumab govitecan, moxetumomab pasudotox, ibritumomab tiuxetan, iodine tositumomab, blatinumomab.

In some embodiments, the one or more ICIs is an inhibitor of PD-1, PD-L1, CTLA4, LAG3, TIGIT, TIM3, VISTA, ICOS, BTLA, GITR, NKG2A, CD112R, B7-H3, or CD73.

In some embodiments, the second stimulus is one or more of any pharmaceutical agents capable of or suspected of being capable of treating a disease or condition related atherosclerosis; multiple sclerosis; diabetes; diabetic retinopathy; arthritis; rheumatoid arthritis; a fungal, viral, chlamydial, bacterial, nanobacterial or parasitic infectious disease; HIV causing AIDS; infection with SARS virus (e.g., severe acute respiratory syndrome coronavirus 2 (SARS-CoV-2)), Asian (chicken) flu virus, herpes simplex or herpes zoster; hepatitis; viral hepatitis; a cardiovascular disease; coronary artery stenosis; carotid artery stenosis; intermittent claudication; a dermatological condition; acne; psoriasis; a disease characterized by benign or malignant cellular hyperproliferation or by areas of neovascularization; a benign or malignant tumor; early cancer; cervical dysplasia; soft tissue sarcoma; a germ cell tumor; retinoblastoma; age-related macular degeneration; lymphoma; Hodgkin's lymphoma; head and neck cancer; oral or mouth cancer; or cancer of the blood, prostate, cervix, uterus, vaginal or other female adnexa, breast, naso-pharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin or pancreas.

In some embodiments, one or more cellular activity measurements (e.g., 1, 2, 3, 4, 5, 6, 7, 8, 9, 10, 15, 20, 25, 50, 75, 100, 1000, 10000 cellular activity measurements) are taken during and/or after the first time point and before the second time point; and/or one or more cellular activity measurements (e.g., 1, 2, 3, 4, 5, 6, 7, 8, 9, 10, 15, 20, 25, 50, 75, 100, 1000, 10000 cellular activity measurements) are taken during and/or after the second time point.

In some embodiments, cellular activity measurements (e.g., 1, 2, 3, 4, 5, 6, 7, 8, 9, 10, 15, 20, 25, 50, 75, 100, 1000, 10000 cellular activity measurements) are taken during and/or after the first time point and before the second time point at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1000, 10000 days); and/or cellular activity measurements (e.g., 1, 2, 3, 4, 5, 6, 7, 8, 9, 10, 15, 20, 25, 50, 75, 100, 1000, 10000 cellular activity measurements) are taken during and/or after the second time point at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1000, 10000 days).

In some embodiments, cellular activity is measured in the tissue sample continuously during and/or after the first time point but before the second time point; and/or cellular activity is measured in the tissue sample continuously during and/or after the second time point until an end-point.

In some embodiments, determining the changes in cellular activity within the tissue sample comprises determining slope-change of the measured cellular activity, and/or determining fold-change of the measured cellular activity. In some embodiments, determining the changes in cellular activity within the tissue sample comprises calculating a slope-change for 1) the cellular activity measurement before the second time point, and during and/or after the first time point, and 2) the cellular activity measurement during and/or after the second time point. In some embodiments, determining the changes in cellular activity within the tissue sample comprises calculating a fold-change for 1) the cellular activity measurement before the second time point, and during and/or after the first time point, and 2) the cellular activity measurement during and/or after the second time point.

In some embodiments, the cellular activity is measured by one or more of the following: optical coherence microscopy (OCM), dynamic optical coherence microscopy (dOCM), multi-photon microscopy (MPM), fluorescent lifetime imaging microscopy (FLIM), bright field microscopy, and/or fluorescence imaging with dyes, interferometry, or a combination thereof.

In some embodiments, the method further comprises, under culture conditions, exposing the tissue sample to one or more additional stimuli (e.g., a third stimulus, a fourth stimulus, a fifth stimulus, a tenth stimulus, a $20^{th}$ stimulus, etc.), measuring cellular activity in the tissue sample during and/or after each exposure to the one or more additional stimuli, and determining changes in cellular activity in the tissue sample following exposure to each of the one or more additional stimuli based on 1) the cellular activity measurement before any or all of the previous stimuli exposure, and 2) the cellular activity measurement during and/or after the most recent stimuli exposure.

In some embodiments, each of the one or more additional stimuli is independently selected from a control stimulus and a non-control stimulus. In some embodiments, each of the one or more additional stimuli is independently selected from an antibody or a fragment thereof, a protein, a nucleic acid (e.g., DNA, RNA, siRNA, shRNA), a small molecule compound, and a virus.

In some embodiments, the at least one of the one or more additional stimuli is an ICI.

In some embodiments, the at least one of the one or more additional stimuli is selected from atezolizumab, avelumab, bevacizumab, cemiplimab, cetuximab, daratumumab, dinutuximab, durvalumab, elotuzumab, ipilimumab, isatuximab, mogamulizumab, necitumumab, nivolumab, obinutuzumab, ofatumumab, olaratumab, panitumumab, pembrolizumab, pertuzumab, ramucirumab, rituximab, trastuzumab, gemtuzumab ozogamicin, brentuximab vedotin, trastuzumab emtansine, inotuzumab ozogamicin, polatuzumab vedotin, enfortumab vedotin, trastuzumab deruxtecan, Sacituzumab govitecan, moxetumomab pasudotox, ibritumomab tiuxetan, iodine tositumomab, blatinumomab.

In some embodiments, the ICI is an inhibitor of PD-1, PD-L1, CTLA4, LAG3, TIGIT, TIM3, VISTA, ICOS, BTLA, GITR, NKG2A, CD112R, B7-H3, or CD73.

In some embodiments, each of the one or more additional stimuli is independently selected from any pharmaceutical agent capable of or suspected of being capable of treating a disease or condition related atherosclerosis; multiple sclerosis; diabetes; diabetic retinopathy; arthritis; rheumatoid arthritis; a fungal, viral, chlamydial, bacterial, nanobacterial or parasitic infectious disease; HIV causing AIDS; infection with SARS virus (e.g., severe acute respiratory syndrome coronavirus 2 (SARS-CoV-2)), Asian (chicken) flu virus, herpes simplex or herpes zoster; hepatitis; viral hepatitis; a cardiovascular disease; coronary artery stenosis; carotid artery stenosis; intermittent claudication; a dermatological condition; acne; psoriasis; a disease characterized by benign or malignant cellular hyperproliferation or by areas of neovascularization; a benign or malignant tumor; early cancer; cervical dysplasia; soft tissue sarcoma; a germ cell tumor; retinoblastoma; age-related macular degeneration; lymphoma; Hodgkin's lymphoma; head and neck cancer; oral or mouth cancer; or cancer of the blood, prostate, cervix, uterus, vaginal or other female adnexa, breast, nasopharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin or pancreas.

In some embodiments, the "culture conditions" or "under culture conditions" are standard culture conditions. In some embodiments, the "culture conditions" or "under culture conditions" are culture conditions not capable of changing cellular activity within the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample) without changing cellular activity within the living cells.

In certain embodiments, the present invention provides a method, comprising obtaining a tissue sample comprising living tumor cells derived from a biopsy of a human cancer patient, wherein the biopsy is a core needle biopsy and/or a forceps biopsy; obtaining a tissue section from the obtained tissue sample, wherein the tissue section comprises living tumor cells, wherein the tissue section comprising living tumor cells has a length between 100 μm to 8.81 mm, wherein the tissue section comprising living tumor cells has an approximate width between approximately 100 μm to 3 mm; wherein the tissue section comprising living tumor cells has an approximate height between approximately 100 μm to 1 mm; under culture conditions suitable for maintaining viability of the tissue section, exposing the tissue section to a first stimulus at a first time point, wherein the first stimulus is a control stimulus; measuring cellular activity in the tissue section during and/or after exposure to the first stimulus; under culture conditions suitable for maintaining viability of the tissue section, exposing the tissue section to a second stimulus at a second time point after the first time point, wherein the second stimulus is one or more immune checkpoint inhibitors (ICIs); measuring one or more cellular activities in the tissue section during and/or after exposure to the second stimulus; determining changes in cellular activity within the tissue section based on 1) the cellular activity measurements before the second time point, and during and/or after the first time point, and 2) the cellular activity measurements during and/or after the second time point;

wherein the tissue section comprises one or more of cytokines, macrophages, B lymphocytes, T lymphocytes, cytotoxic T-cell lymphocytes, mast cells, monocytes, dendritic cells, eosinophils, natural killer cells, basophils, and neutrophils; wherein measuring one or more cellular activities comprises measuring one or more types of immune cell activity.

In some embodiments, determining the changes in cellular activity within the tissue section comprises determining slope-change of the measured cellular activity, and/or determining fold-change of the measured cellular activity.

In some embodiments, the living tumor cells are living solid tumor cells. In some embodiments, the living tumor cells are living solid tumor cells related to a cancer selected from prostate, cervix, uterus, vaginal or other female adnexa, breast, naso-pharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin and pancreas.

In some embodiments, the culture conditions suitable for maintaining the viability of the tissue section are culture conditions suitable for maintaining viability of the tissue section without changing cellular activity within the tissue section. In some embodiments, the control stimulus is the culture conditions suitable for maintaining viability of the tissue section. In some embodiments, the control stimulus is the culture conditions suitable for maintaining viability of the tissue section without changing cellular activity within the tissue section. In some embodiments, the control stimulus is culture conditions suitable for maintaining viability of the tissue section. In some embodiments, the control stimulus is culture conditions suitable for maintaining viability of the tissue section without changing cellular activity within the tissue section. In some embodiments, the control stimulus is a stimulus that does not induce changes in cellular activity within the tissue section comprising living tumor cells.

In some embodiments, the control stimulus is selected from a purified control immunoglobulin, phosphate buffered saline (PBS), and any biological buffer.

In some embodiments, the one or more ICIs is an inhibitor of PD-1, PD-L1, CTLA4, LAG3, TIGIT, TIM3, VISTA, ICOS, BTLA, GITR, NKG2A, CD112R, B7-H3, or CD73. In some embodiments, the one or more ICIs is selected from nivolumab, pembrolizumab, ipilimumab, atezolizumab, avelumab, durvalumab, tremelimumab, cemiplimab, retifanlimab, dostarlimab, and toripalimab.

In some embodiments, cellular activity is measured in the tissue section continuously during and/or after the first time point but before the second time point; and/or cellular activity is measured in the tissue section continuously during and/or after the second time point until an end-point.

In some embodiments, cellular activity is measured in the tissue section one or more times during and/or after the first time point but before the second time point; and/or cellular activity is measured in the tissue section one or more times during and/or after the second time point until an end-point.

In some embodiments, the one or more type of immune cell activity is selected from cytokine activity, macrophage activity, B lymphocyte activity, T lymphocyte activity, cytotoxic T-cell lymphocyte (CTL) activity, mast cell activity, monocyte activity, dendritic cell activity, eosinophil activity, natural killer cell activity, basophil activity, and neutrophil activity.

In some embodiments, the cellular activity is measured by one or more of the following: optical coherence microscopy (OCM), dynamic optical coherence microscopy (dOCM), multi-photon microscopy (MPM), fluorescent lifetime imaging microscopy (FLIM), bright field microscopy, fluorescence imaging with dyes, interferometry, or a combination thereof.

In some embodiments, the method further comprises under culture conditions suitable for maintaining viability of the tissue section, exposing the tissue section to one or more additional stimuli, measuring cellular activity in the tissue section during and/or after each exposure to the one or more additional stimuli, and determining changes in cellular activity in the tissue sample following exposure to each of the one or more additional stimuli based on 1) the cellular activity measurement during and before any or all of the previous stimuli exposure, and 2) the cellular activity measurement during and/or after the most recent stimuli exposure.

BRIEF DESCRIPTION OF THE FIGURES

FIG. 1A) reports the fold change in the rate of cytokine secretion (slope) between early (4-28 hours) and late (28-48 hours) time periods for SPC1791. FIG. 1B) reports fold change in the difference in cytokine levels between early (4-28 hours) and late (28-48 hours) time periods for SPC1971.

DEFINITIONS

Figure 1A:
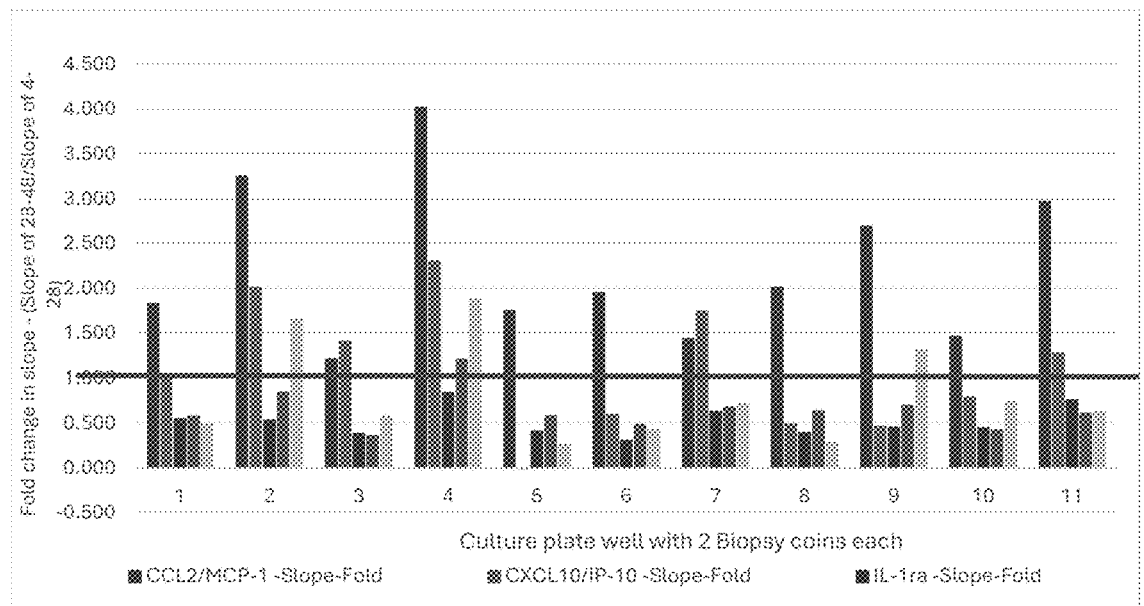
FIG. 1A-B reports the change in cytokine levels between early (4-28 hours) and late (28-48 hours) time points for SPC1791 (internal identifier) treated with anti-Programmed cell Death 1 (PD-1) antibody.

The singular forms "a", "an", and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Unless otherwise indicated, all numbers expressing quantities of ingredients, properties such as molecular weight, reaction conditions, so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least each numerical parameter should at least be construed in light of the number of reported significant digits and by applying ordinary rounding techniques.

The phrase "and/or," as used herein in the specification and in the claims, should be understood to mean "either or both" of the elements so conjoined, e.g., elements that are conjunctively present in some cases and disjunctively present in other cases. For example, "during and/or after" should be understood to mean 1) during alone, 2) after alone, or 3) during and after.

As used herein, the terms "assess", "evaluate", and "characterize" are used interchangeably.

As used herein, the terms "measure", "quantify", "calculate", and "determine" are used interchangeably.

As used herein, the term "change in cellular activity" or "changes in cellular activity" or "cellular activity change" or "cellular activity changes" refers to one or more changes in one or more types of cellular activity.

The term "subject" as used herein is any mammalian or non-mammalian subject. The subject may be a primate or a non-primate subject. In some embodiments, the subject is suspected of or diagnosed with cancer. In some embodiments, the subject is a human subject. The cancer can be any solid or hematologic malignancy. The cancer can be of any stage and/or grade. Non-limiting examples of cancer include cancers of head & neck, oral cavity, breast, ovary, uterus, gastro-intestinal, colorectal, pancreatic, prostate, brain and central nervous system, skin, thyroid, kidney, bladder, lung, liver, bone and other tissues.

The term "biological sample" as used herein refers to any cellular biological material such as a tissue, a tissue section, a tissue fragment, cellular aggregates such as a spheroid or an organoid and the like. In some embodiments, the biological sample is a tissue section comprising living cells. In some embodiments, the biological sample is a live sample (e.g., a live tissue sample) comprising viable cells. In some embodiments, a live biological sample is one which has not been subjected to any tissue fixation techniques (such as formalin fixation). In some embodiments, the biological sample is obtained from a subject (e.g., a human subject). In some embodiments, the biological sample comprises healthy (e.g., not diseased) biological material such as a healthy tissue, a healthy tissue fragment, healthy cellular aggregates such as a spheroid or an organoid and the like. In some embodiments, the biological sample is not a spheroid or an organoid.

As used herein, the term "tissue sample having living cells" refers to a cellular sample that preserves the cross-sectional spatial relationship between the cells as they existed within the subject from which the sample was obtained and further contains living cells. A tissue biopsy or surgical resection may be used to obtain a tissue sample having living cells.

As used herein, the term "cell" or "cells" refers to any eukaryotic cell. Eukaryotic cells include without limitation ovary cells, epithelial cells, immune cells, hematopoietic cells, bone marrow cells, circulating vascular progenitor cells, cardiac cells, chondrocytes, bone cells, beta cells, hepatocytes, and neurons. Moreover, the term includes pluripotent stem cells. Such cells can be ex vivo cells, in vivo cells, in vitro, etc. In some embodiments, the population of cells consists of a homogeneous population of cells. As used herein, the term "homogeneous population of cells" refers to a population of cells comprising one cell type and/or one cell state. In some embodiments, the population of cells consists of a heterogeneous population of cells. As used herein, the term "heterogeneous population of cells" refers to a population of cells comprising two or more different cell types or cell states.

In some embodiments, the tissue (or tissue sample or tissue section, as used interchangeably herein) contains healthy cells (e.g., not cancerous cells) (e.g., not diseased cells). In some embodiments, the tissue (or tissue sample or tissue section, as used interchangeably herein) contains a combination of healthy cells (e.g., not cancerous cells) (e.g., not diseased cells) and non-healthy cells (e.g., cancerous cells) (e.g., diseased cells).

A tissue can be obtained from a subject by any approach known to a person skilled in the art. The tissue can be obtained by needle-biopsy, surgical resection, surgical biopsy, investigational biopsy, bone marrow aspiration or any other therapeutic or diagnostic procedure performed on a subject suspected of or diagnosed with cancer.

In some embodiments, the tissue sample is an ex vivo living tissue sample (e.g., tissue section comprising living cells) that typically results from a biopsy. In some embodiments, the ex vivo living tissue sample is a tumor tissue sample. The term "tumor tissue sample" means any tumor tissue sample derived from a subject (e.g., a human patient) (e.g., human patient having or suspected of having cancer). In some embodiments, the tumor sample may result from the tumor resected from the subject. In some embodiments, the tumor sample may result from a biopsy performed in the primary tumor of the subject or performed in a metastatic sample distant from the primary tumor of the subject. In some embodiments, the tumor tissue sample encompasses (i) a global primary tumor (as a whole), (ii) a tissue sample from the center of the tumor, (iii) lymphoid islets in close proximity with the tumor, (iv) the lymph nodes located at the closest proximity of the tumor, (v) a tumor tissue sample collected prior to surgery (for follow-up of patients after treatment for example (e.g., for purposes of evaluating the effectiveness of a treatment) (e.g., for purposes of testing the sample to identify a desired course of treatment), and (vi) a distant metastasis.

In some embodiments, the tissue sample (e.g., tumor tissue sample) encompasses pieces or slices or sections of tissue that have been removed from the sample, including following a surgical tumor resection or following the collection of a tissue sample for biopsy. The tissue sample can, of course, be subjected to a variety of well-known pre-collection and post-collection preparative and storage techniques while maintaining the viability of the living cells within the tissue.

The term "tissue section comprising living cells" refers to a single portion or piece of a tissue sample, such as a thin slice of tissue cut from a sample of normal tissue or tumor, that further includes only living cells or a mixture of living cells and non-living cells.

As used herein, the term "culture conditions" include any physical or chemical medium in which cells (e.g., living cells within a tissue sample) (e.g., living cells within a tissue section) are isolated and manipulated but suitably the reaction condition is a culture condition to which cells are exposed. Culture conditions include growth media, temperature regimes, substrates, atmospheric conditions, physical cell handling and the like. Growth media comprise natural and synthetic substances that nourish and affect the cells including but not limited to basal media, growth factors, nutrients, buffers, chemicals, drugs and the like.

As used herein, the terms "culture conditions suitable for maintaining viability of the tissue sample" or "culture conditions suitable for maintaining viability of the tissue section" are used interchangeably and refer to the environment which living cells (e.g., living cells within a tissue sample) (e.g., living cells within a tissue section) are placed in or are exposed to in order to maintain the viability (e.g., existence) of the living cells. Thus, the term refers to the medium, temperature, atmospheric conditions, substrate, stirring conditions and the like which may affect such living cell viability maintenance. More particularly, the term refers to specific agents which may be incorporated into culture media and which may influence the maintenance of living cells (e.g., living cells within a tissue sample) (e.g., living cells within a tissue section). For example, in some embodiments, the culture conditions (e.g., suitable for maintaining viability of the tissue section) comprise Dulbecco's Modified Eagle's Medium (DMEM). In some embodiments, the culture conditions comprise a modified DMEM (e.g., modified to contain 4 mM L-glutamine, 4500 mg/L glucose, 1 mM sodium pyruvate, and 1500 mg/L sodium bicarbonate). In some embodiments, the culture conditions comprise a RPMI-1640 stock medium (Invitrogen; Cat. No. 22400-089) (e.g., including the reducing agent glutathione as well as biotin, vitamin B12, para-aminobenzoic acid (PABA), and high concentrations of the vitamins inositol and choline). In some embodiments, the culture conditions (e.g., suitable for maintaining viability of the tissue section) comprise a RPMI-1640 stock medium supplemented with fetal bovine serum (FBS). In some embodiments, the culture conditions comprise "standard conditions." In some embodiments, the culture conditions comprise a pH of approximately 7.0 to 7.4. In some embodiments, the culture conditions comprise a temperature of approximately 37° C. In some embodiments, the culture conditions comprise approximately 5% $CO_2$.

As used herein, the term "processor" (e.g., a microprocessor, a microcontroller, a processing unit, or other suitable programmable device) can include, among other things, a control unit, an arithmetic logic unit ("ALC"), and a plurality of registers, and can be implemented using a known computer architecture (e.g., a modified Harvard architecture, a von Neumann architecture, etc.). In some embodiments the processor is a microprocessor that can be configured to communicate in a stand-alone and/or a distributed environment and can be configured to communicate via wired or wireless communications with other processors, where such one or more processor(s) can be configured to operate on one or more processor-controlled devices that can be similar or different devices.

As used herein, the term "memory" is any memory storage and is a non-transitory computer readable medium. The memory can include, for example, a program storage area and the data storage area. The program storage area and the data storage area can include combinations of different types of memory, such as a ROM, a RAM (e.g., DRAM, SDRAM, etc.), EEPROM, flash memory, a hard disk, a SD card, or other suitable magnetic, optical, physical, or electronic memory devices. The processor can be connected to the memory and execute software instructions that are capable of being stored in a RAM of the memory (e.g., during execution), a ROM of the memory (e.g., on a generally permanent bases), or another non-transitory computer readable medium such as another memory or a disc. In some embodiments, the memory includes one or more processor-readable and accessible memory elements and/or components that can be internal to the processor-controlled device, external to the processor-controlled device, and can be accessed via a wired or wireless network. Software included in the implementation of the methods disclosed herein can be stored in the memory. The software includes, for example, firmware, one or more applications, program data, filters, rules, one or more program modules, and other executable instructions. For example, the processor can be configured to retrieve from the memory and execute, among other things, instructions related to the processes and methods described herein.

As used herein, the term "network" generally refers to any suitable electronic network including, but not limited to, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the network is a cellular network, such as, for example, a Global System for Mobile Communications ("GSM") network, a General Packet Radio Service ("GPRS") network, an Evolution-Data Optimized ("EV-DO") network, an Enhanced Data Rates for GSM Evolution ("EDGE") network, a 3GSM network, a 4GSM network, a 5G New Radio, a Digital Enhanced Cordless Telecommunications ("DECT") network, a digital AMPS ("IS-136/TDMA") network, or an Integrated Digital Enhanced Network ("iDEN") network, etc. In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet).

DETAILED DESCRIPTION

Provided herein are systems and methods for measuring cellular activity within a biological sample comprising living cells over an extended time period. In particular, provided herein are techniques for measuring changes in cellular activity within a tissue sample comprising living cells (e.g., a tissue section comprising living cells) during and/or after exposure to a first stimulus (e.g., a control stimulus) at a first time point and during and/or after exposure to a second stimulus (e.g., a non-control stimulus) (e.g., a pharmaceutical stimulus) at a second time point after the first time point.

In certain embodiments, methods are provided comprising providing/obtaining a tissue sample comprising living cells; under culture conditions, exposing the tissue sample to a first stimulus at a first time point; measuring cellular activity in the tissue sample during and/or after exposure to the first stimulus; exposing the tissue sample to a second stimulus at a second time point after the first time point; measuring cellular activity in the tissue sample during and/or after exposure to the second stimulus; and determining changes in cellular activity within the tissue sample based on 1) the cellular activity measurements before the second time point, and during and/or after the first time point, and 2) the cellular activity measurements during and/or after the second time point.

In some embodiments, the method further comprises, under culture conditions, exposing the tissue sample to one or more additional stimuli (e.g., a third stimulus, a fourth stimulus, a fifth stimulus, a tenth stimulus, a $20^{th}$ stimulus, etc.), measuring cellular activity in the tissue sample during and/or after exposure to each additional stimuli, and determining changes in cellular activity in the tissue sample following exposure to each of the one or more additional stimuli based on 1) the cellular activity measurements before any or all of the previous stimuli exposure, and 2) the cellular activity measurements during and/or after the most recent stimuli exposure.

In certain embodiments, methods are provided comprising:
  obtaining/providing a tissue sample comprising living cells;
  providing a processor comprising software that when executed is configured to 1) expose the tissue sample to a first stimulus at a first time point; 2) measure cellular activity in the tissue sample during and/or after exposure to the first stimulus; 3) expose the tissue sample to a second stimulus; 4) measure cellular activity in the tissue sample during and/or after exposure to the second stimulus; and 5) determine changes in cellular activity within the tissue sample based on a) cellular activity measurements before the second time point, and during and/or after the first time point, and b) cellular activity measurements during and/or after the second time point;
  executing the software such that cellular activity is measured in the tissue sample during and/or after exposure of the tissue sample to the first stimulus;
  executing the software such that under culture conditions the tissue sample is exposed to a second stimulus at a second time point after the first time point;
  executing the software such that cellular activity is measured in the tissue sample during and/or after exposure of the tissue sample to the second stimulus;
  executing the software such that changes in cellular activity within the tissue sample are determined based on 1) the cellular activity measurements before the second time point, and during and/or after the first time point, and 2) the cellular activity measurements during and/or after the second time point.

In some embodiments, the method further comprises executing the software such that the determined changes in cellular activity are reported (e.g., to a user).

In some embodiments, the software, when executed, is further configured to expose the tissue sample to one or more additional stimuli (e.g., a third stimulus, a fourth stimulus, a fifth stimulus, a tenth stimulus, a $20^{th}$ stimulus, etc.). In some embodiments, the software, when executed, is further configured to measure cellular activity in the tissue sample during and/or after each exposure to the one or more additional stimuli. In some embodiments, the software, when executed, is further configured to determine changes in cellular activity in the tissue sample during and/or after exposure to each of the one or more additional stimuli based on 1) the cellular activity measurements before any or all of the previous stimuli exposure, and 2) the cellular activity measurements during and/or after the most recent stimuli exposure.

In certain embodiments, systems are provided comprising a tissue sample comprising living cells; and a processor comprising software that when executed is configured to 1) expose the tissue sample to a first stimulus at a first time point; 2) measure cellular activity in the tissue sample during and/or after exposure to the first stimulus; 3) expose the tissue sample to a second stimulus; 4) measure cellular activity in the tissue sample during and/or after exposure to the second stimulus; 5) determine changes in cellular activity within the tissue sample based on a) cellular activity measurements before the second time point, and during and/or after the first time point, and b) cellular activity measurements during and/or after the second time point; and 6) report the determined changes in cellular activity.

In some embodiments, the software when executed is further configured to expose the tissue sample to additional stimuli (e.g., a third stimulus, a fourth stimulus, a fifth stimulus, a tenth stimulus, a $20^{th}$ stimulus, etc.), measure cellular activity in the tissue sample during and/or after each exposure to the additional stimuli, determine changes in cellular activity in the tissue sample during and/or after exposure to each additional stimulus, and report the determined changes in cellular activity for each successive additional stimuli.

In certain embodiments, methods are provided comprising obtaining a plurality of tissue samples comprising living cells; providing a device that when operated is configured to expose each of the tissue samples to a first stimulus at a first time point, measure cellular activity in each of the tissue samples during and/or after exposure to the first stimulus, expose each of the tissue samples to a second stimulus at a second time point after the first time point, and measure cellular activity in each of the tissue samples during and/or after exposure to the second stimulus; and operating the device such that, under culture conditions, each of the tissue samples is exposed to a first stimulus at a first time point; operating the device such that cellular activity in each of the tissue samples is measured during and/or after exposure to the first stimulus; operating the device such that, under culture conditions, each of the tissue samples is exposed to a second stimulus at a second time point after the first time point; operating the device such that cellular activity in each of the tissue samples is measured during and/or after exposure to the second stimulus; and determining changes in cellular activity within each of the tissue samples based on 1) the cellular activity measurements before the second time point, and during and/or after the first time point, and 2) the cellular activity measurements during and/or after the second time point.

In some embodiments, the plurality of tissue samples are arranged in a contained setting. In some embodiments, the contained setting is a linear or non-linear array.

In some embodiments, each of the tissue samples within the contained setting is sequentially positioned within range of the device, wherein positioning of a tissue sample within range of the device permits the device to 1) expose the tissue sample to a first or second stimulus, and/or 2) measure cellular activity.

In some embodiments, each of the tissue samples within the contained setting is automatically positioned within range of the device via movement of the device or the contained setting. In some embodiments, each of the tissue samples within the contained setting is manually positioned within range of the device via movement of the device or the contained setting.

In some embodiments, the device, when operated, is further configured to expose each of the tissue samples to one or more additional stimuli (e.g., a third stimulus, a fourth stimulus, a fifth stimulus, a tenth stimulus, a $20^{th}$ stimulus, etc.). In some embodiments, the device, when operated, is further configured to measure cellular activity in the tissue sample during and/or after each exposure to the one or more additional stimuli.

In some embodiments, the method further comprises determining changes in cellular activity in each of the tissue samples during and/or after exposure to each of the one or more additional stimuli based on 1) the cellular activity measurements before any or all of the previous stimuli exposure, and 2) the cellular activity measurements during and/or after the most recent stimuli exposure.

In certain embodiments, systems are provided comprising a plurality of tissue samples comprising living cells; a device that when operated is configured to expose each of the tissue samples to a first stimulus at a first time point, measure cellular activity in each of the tissue samples during and/or after exposure to the first stimulus, expose each of the tissue samples to a second stimulus at a second time point after the first time point, and measure cellular activity in each of the tissue samples during and/or after exposure to the second stimulus; and operating the device such that, under culture conditions, each of the tissue samples is exposed to a first stimulus at a first time point; operating the device such that cellular activity in each of the tissue samples is measured during and/or after exposure to the first stimulus; operating the device such that, under culture conditions, each of the tissue samples is exposed to a second stimulus at a second time point after the first time point; operating the device such that cellular activity in each of the tissue samples is measured during and/or after exposure to the second stimulus.

In some embodiments, the plurality of tissue samples are arranged in a contained setting. In some embodiments, the contained setting is a linear or non-linear array.

In some embodiments, each of the tissue samples within the contained setting are capable of being sequentially positioned within range of the device, wherein positioning of a tissue sample within range of the device permits the device to 1) expose the tissue sample to a first or second stimulus, and/or 2) measure cellular activity.

In some embodiments, each of the tissue samples within the contained setting are capable of being automatically positioned within range of the device via movement of the device or the contained setting. In some embodiments, each of the tissue samples within the contained setting are capable of being manually positioned within range of the device via movement of the device or the contained setting.

In some embodiments, the device, when operated, is further configured to expose each of the tissue samples to one or more additional stimuli (e.g., a third stimulus, a fourth stimulus, a fifth stimulus, a tenth stimulus, a $20^{th}$ stimulus, etc.). In some embodiments, the device, when operated, is further configured to measure cellular activity in the tissue sample during and/or after each exposure to the one or more additional stimuli.

In certain embodiments, systems are provided comprising:
a plurality of tissue samples comprising living cells; and
a processor comprising software that when executed is configured to 1) expose the tissue sample to a first stimulus at a first time point; 2) measure cellular activity in the tissue sample during and/or after exposure to the first stimulus; 3) expose the tissue sample to a second stimulus at a second time point after the first time point; 4) measure cellular activity in the tissue sample during and/or after exposure to the second stimulus; 5) determine changes in cellular activity in the tissue sample a) before exposure to the second stimulus, and during and/or after exposure to the first stimulus, and b) during and/or after exposure to the second stimulus; and 6) report the changes in cellular activity. In some embodiments, the plurality of tissue samples is successively arranged in an array. In some embodiments, the array is configured to move (e.g., automatically or manually) such that a first tissue sample is positioned within range of the device configured for detecting cellular activity and cellular activity measured. In some embodiments, the array is configured to move such that after cellular activity is measured for the first tissue sample a second tissue sample is positioned within range of the device configured for detecting cellular activity and cellular activity measured. In some embodiments, the array is configured to move such that after cellular activity is measured for the second tissue sample the cellular activity for any additional tissue samples (if any) are successively measured in a repeating manner. In some embodiments, the device configured for detecting cellular activity is further configured to expose each of the plurality of tissue samples to a stimulus (e.g., a first stimulus, a second stimulus, etc.) simultaneously or successively. In some embodiments, the system further comprising a stimulus application device configured to expose each of the tissue samples to a stimulus (e.g., a first stimulus, a second stimulus, etc.) simultaneously or successively.

In any of the method or system embodiments pertaining to a plurality of tissue samples described herein, a stimulus application device is provided or utilized, wherein the stimulus application device is configured to expose each of the tissue samples to a stimulus (e.g., a first stimulus, a second stimulus, etc.) simultaneously or successively.

In any of the method or system embodiments pertaining to a plurality of tissue samples described herein, each of the plurality of tissue samples are not limited to exposure to particular type or amount or timing of stimulus (e.g., first stimulus, second stimulus, and any additional stimulus). For example, in some embodiments, each of the plurality of tissue samples are exposed to identical first stimuli. In some embodiments, each of the plurality of tissue samples are exposed to different first stimuli. In some embodiments, each of the plurality of tissue samples are exposed to identical second stimuli. In some embodiments, each of the plurality of tissue samples are exposed to identical second stimuli but each tissue sample is exposed to a second stimulus at a different time point (e.g., staggered by different time points (e.g., staggered in seconds, minutes, hours, days, etc.)). In some embodiments, each of the plurality of tissue samples are exposed to identical second stimulus but each tissue sample is exposed to a different amount or concentration of the second stimulus. For example, in an embodiment wherein there are ten tissue samples, each tissue sample is exposed to a different dosage amount and/or a different concentration of the second stimulus. In some embodiments, each of the plurality of tissue samples are exposed to different second stimuli either at identical time points or different time points.

In some embodiments pertaining to a plurality of tissues samples, each of the tissue samples are identical.

In some embodiments pertaining to a plurality of tissue samples (e.g., two or more tissue samples), two or more of the tissue samples are different. For example, in some embodiments wherein there is "tissue sample A" and "tissue sample B", a plurality of tissue samples could pertain to: one of A and one of B; two A and two of B; three of A and one of B; nine of A and one of B; five of A and five of B; 50 of A and 50 of B; 99 of A and one of B; 1000 of A and 1000 of B; etc. For example, in some embodiments wherein there is "tissue sample A", "tissue sample B", and "tissue sample C", a plurality of tissue samples could pertain to: one of A and one of B and one of C; two of A and two of B and 50 of C; three of A and one of B and three of C; nine of A and one of B and 10 of C; five of A and five of B and five of C; 50 of A and 50 of B and 50 of C; 99 of A and one of B and one of C; 1000 of A and 1000 of B and 1000 of C; etc. For example, there can be tens, hundreds, and multiple thousands of different types of tissue arranged in any numerical manner.

In some embodiments pertaining to two or more samples that are not identical, each tissue sample is exposed to the same or different stimuli (e.g., same or different first stimulus; same or different second stimulus; same or different for any additional stimulus). For example, in some embodiments wherein there is a plurality of tissue samples and all are different, each tissue sample is exposed to the same first stimulus and the same second stimulus (and, if present, the same additional stimulus). For example, in some embodiments wherein there is a plurality of tissue samples and all are different, each tissue sample is exposed to a different first stimulus and a different second stimulus (and, if present, different additional stimuli). For example, in some embodiments wherein there is a plurality of tissue samples and all are different, the tissue samples can be exposed to any combination of identical or different first, second, or if present additional stimuli.

In some embodiments pertaining to two or more samples that are not identical, each tissue sample can be exposed to each stimulus simultaneously or at different time points. In some embodiments pertaining to two or more samples that are identical, each tissue sample can be exposed to each stimulus simultaneously or at different time points.

In some embodiments pertaining to two or more samples that are not identical, each tissue sample can be exposed to each stimulus simultaneously or at different time points. In some embodiments pertaining to two or more samples that are identical, each tissue sample can be exposed to each stimulus simultaneously or at different time points.

In some embodiments, the tissue samples can be exposed to any combination of identical or different first, second, or if present additional stimuli at identical time points (e.g., simultaneous exposure to each stimulus) or different time points.

In any of the described system and method embodiments, the tissue sample or at least one of a plurality of tissue samples can be exposed to a cellular monitoring agent. For example, in some embodiments, the tissue sample or at least one of a plurality of tissue samples is exposed to an apoptosis marker (e.g., a caspase selected from the group consisting of caspase 3, 6, 7, 8, and 9, and caspase 3/7) (e.g., a granzyme selected from the group consisting of granzyme A, B, C, D, E, F, G, H, K, and M). In some embodiments, the tissue sample is exposed to such a cellular monitoring agent (e.g., apoptosis marker) prior to exposure to the first stimulus. In some embodiments, the tissue sample is exposed to such a cellular monitoring agent (e.g., apoptosis marker) during or after exposure to the first stimulus but before exposure to the second stimulus. In some embodiments, the tissue sample is exposed to such a cellular monitoring agent (e.g., apoptosis marker) during or after exposure to the second stimulus. In some embodiments, the tissue sample is exposed to such a cellular monitoring agent (e.g., apoptosis marker) during or after exposure to any additional stimulus. In some embodiments, the tissue sample is exposed to more than one cellular monitoring marker. In such embodiments, the cellular monitoring agent can be discreetly monitored or continuously monitored.

In some embodiments, cellular activity for the plurality of tissue samples is measured with one device configured for detecting cellular activity (e.g., a device configured to conduct Optical Coherence Microscopy (OCM) and/or dynamic OCM (dOCM)). In some embodiments, the plurality of tissue samples are successively arranged (e.g., in an array (e.g., automated or manual)) such that each tissue sample is successively positioned within range of the device configured for detecting cellular activity. In some embodiments, the plurality of tissue samples are successively arranged (e.g., in an array (e.g., automated or manual)) in a fixed position and the device is moved within range of a tissue sample and, after cellular activity measured, successively moved within range of a next tissue sample and, after cellular activity measured, the device is moved in a similar manner to the remaining tissue samples. In some embodiments, the array is configured to move (e.g., automatically or manually) such that a first tissue sample is positioned within range of the device configured for detecting cellular activity and cellular activity measured. In some embodiments, the array is configured to move such that after cellular activity is measured for the first tissue sample a second tissue sample is positioned within range of the device configured for detecting cellular activity and cellular activity measured. In some embodiments, the array is configured to move such that after cellular activity is measured for the second tissue sample a third tissue sample is positioned within range of the device configured for detecting cellular activity and cellular activity measured. In some embodiments, the array is configured such that the device can simultaneously measure cellular activity in each of the plurality of tissue samples. For example, in some embodiments wherein the plurality of tissue samples are arranged in an array (e.g., 96 wells each having a separate tissue sample), the device is able to simultaneously measure cellular activity in each of the wells in the array (e.g., simultaneously measure cellular activity in each of the 96 wells). In some embodiments, the array is configured to move such that after cellular activity is measured for the third tissue sample the cellular activity for the remaining tissue samples are successively in a repeating manner. For example, in some embodiments pertaining to a plurality of tissue samples each comprising living cells, one of the tissue samples is separately positioned within range of the device configured for detecting cellular activity, cellular activity for that specific tissue sample is measured, that specific tissue sample is positioned out of range of the device configured for detecting cellular activity, a next tissue sample is positioned within range of the device configured for detecting cellular activity, cellular activity for that specific tissue sample is measured, that specific tissue sample is positioned out of range of the device configured for detecting cellular activity, and the process is successively repeated for each tissue sample. As such, the embodiments described permit the determination of cellular activity change in a plurality of tissue samples utilizing one device configured for detecting cellular activity.

In some embodiments, the device configured for detecting cellular activity is further configured to expose each of the tissue samples to a stimulus (e.g., a first stimulus, a second stimulus, etc.) simultaneously or successively.

The described system and method embodiments are not limited to a particular type of tissue sample comprising living cells. In some embodiments the tissue section comprises living mammalian cells. In some embodiments the tissue section comprises living human cells. In some embodiments, the tissue sample comprising living cells are selected from one or more of normal cells, diseased cells, stem cells, endothelial cells, stromal cells, epithelial cells, neuronal cells, connective cells, myocardial cells, hepatocytes, renal cells, tumor cells, liver cells, pancreatic cells, muscle cells, brain cells, kidney cells, and patient-specific cells. In some embodiments, the tissue sample comprises living cells selected from cultured cells, tumor cells derived from the biopsy of a cancer patient, normal cells derived from a healthy patient, known cell lines, and combinations thereof. In some embodiments, the tissue sample is a live tumor fragment culture. In some embodiments, the tissue sample is a mixture of different types of living cells. In some embodiments, the tissue sample comprises fragments of living tumor tissue, referred to herein as live tumor fragments or LTFs. In some embodiments, the tissue sample is obtained from a solid tumor, and the tumor is from one selected from the group consisting of a bone, bladder, brain, breast, colon, esophagus, gastrointestinal tract, urinary tract, kidney, liver, lung, nervous system, ovary, pancreas, prostate, retina, skin, stomach, testicles, and uterus of a subject.

In some embodiments, the tissue sample comprises living cells obtained (e.g., obtained by tissue biopsy, or obtained by tissue resection) during monitoring or testing of infectious diseases, inflammatory disorders, autoimmune disorders, skin conditions, peptic ulcers, endometriosis, allergy testing, celiac disease, and/or myasthenia gravis.

In some embodiments, the tissue sample comprises living immune cells. The term "immune cell" as used herein refers to lymphocytes (such as B cells and T cells); natural killer cells; myeloid cells (such as monocytes, macrophages and dendritic cells), neutrophils, eosinophils, mast cells, basophils, or granulocytes. The term "immune cell" is inclusive of "tumor infiltrating" immune cells. The term "tumor infiltrating" refers to an immune cell that is located inside a tumor. The term "tumor infiltrating immune cell" is inclusive of "tumor infiltrating lymphocytes", which refer to tumor infiltrating T-cells, B-cells, macrophages, and natural killer (NK) cells.

In some embodiments, the tissue sample comprises living T cells. As used herein, the term "T cell," refers to a type of lymphocyte that play an important role in cell-mediated immunity and are distinguished from other lymphocytes, such as B cells, by the presence of a T-cell receptor on the cell surface. Several subsets of T cells have been described and typically include helper T cells (e.g., Th1, Th2, Th9 and Th17 cells), cytotoxic T cells, memory T cells, regulatory/suppressor T cells (Treg cells), natural killer T cells,

[gamma/delta] T cells, and/or autoaggressive T cells (e.g., Th40 cells), unless otherwise indicated by context. In some embodiments, the term "T cell" refers specifically to a helper T cell. In some embodiments, the term "T cell" refers more specifically to a Th17 cell (i.e., a T cell that secretes IL-17). In some embodiments, the term "T cell" refers to a regulatory T cell or "Treg" cell. In some embodiments, the cells are cytotoxic T-cells. The term "cytotoxic T-cell" is used interchangeably with "killer T-cell" and refers to a subset of T-cells that attack and/or destroy cellular entities when activated by an antigen. Other types of T-cells include helper T-cells and regulatory T-cells. Cytotoxic T-cells are also referred to as CD8+ T-cells. In some embodiments, the cells are cytotoxic T-cell lymphocytes (CTLs).

The systems and methods described herein are not limited to a particular manner of obtaining a tissue sample comprising living cells. A tissue sample can be obtained from a subject by any approach known to a person skilled in the art. The tissue can be obtained by surgical resection, needle biopsy (e.g., core needle biopsy), surgical biopsy, investigational biopsy, bone marrow aspiration or any other therapeutic or diagnostic procedure performed on a subject. In some embodiments, the tissue sample comprises living cells obtained through one or more surgical resection, sputum cytology, pleural fluid analysis, bronchoscopy, core biopsy, small biopsy, a fine-needle aspirate, a cytology specimen, forceps biopsy and percutaneous needle biopsy; or a combination thereof. In some embodiments, the tissue sample comprises tumor cells isolated directly from a non-removed tumor, from a tumor cell biopsy, from circulating tumor cells, or from a tumor that is surgically removed.

In some embodiments, the tissue sample comprising living cells is an ex vivo live sample (e.g., a live tissue sample) or an ex vivo living tissue sample comprising viable cells. In some embodiments, a live tissue sample includes, but is not limited to, an ex vivo tissue sample, an ex vivo biopsy sample, an ex vivo tissue resection, etc. In some embodiments, the live tissue sample contains a mixture of living and dead cells and/or tissue.

As used herein, tissue samples are not limited to particular size dimensions.

For example, in some embodiments tissue samples may have different sizes depending on the gauge of the biopsy needle. For example, some known needles (e.g., 7-gauge needles) result in a thicker tissue sample, while other known needle types (e.g., 21-gauge needles) result in a thinner tissue sample. It is appreciated that other needle types are also contemplated herein (e.g., needle gauge numbers less than 7 and having larger diameters and needle gauge numbers larger than 21 and having smaller diameters).

In some embodiments, the needle may be a 9-gauge needle (e.g., a needle having a 2.997 mm diameter). In some embodiments, the needle may be a 12-gauge needle (e.g., a needle having a 2.2 mm diameter). In some embodiments, the needle may be a 14-gauge needle (e.g., a needle having a 1.6 mm diameter). In some embodiments, the needle may be a 16-gauge needle (e.g., a needle having a 1.2 mm diameter). In some embodiments, the needle may be an 18-gauge needle (e.g., a needle having a 0.84 mm diameter). In some embodiments, the needle may be a 20-gauge needle (e.g., a needle having a 0.60 mm diameter). In some embodiments, the needle may be a 21-gauge needle (e.g., a needle having 0.51 mm diameter).

In some embodiments, the tissue sample comprising living cells is a tissue section comprising living cells. A "tissue section" having living cells refers to a slice of tissue taken from a living organism, where at least a portion of the cells within that slice are still alive and capable of performing their normal functions. Indeed, a tissue section comprising living cells is a sample of tissue that has not been fixed or preserved in a way that kills the cells, allowing for observation of active cellular processes.

In some embodiments, the tissue section comprising living cells is from whole biopsies or biopsies that have been cut (e.g., cut longitudinally; cut horizontally) into one or more strips or slices. The tissue section comprising living cells from whole biopsies or biopsies that have been cut (e.g., cut longitudinally; cut horizontally) into one or more strips or slices are not limited to being cut (e.g., cut longitudinally; cut horizontally) at a specific angle. Indeed, the tissue section comprising living cells from whole biopsies or biopsies that have been cut (e.g., cut longitudinally; cut horizontally) into one or more strips or slices may be cut (e.g., cut longitudinally; cut horizontally) at any desired angle so long as at least a portion of the tissue section remains viable (e.g., living).

In some embodiments, the tissue sample (e.g., tissue section slice) may be a slice of a biopsy obtained from a 9-gauge needle (e.g., a needle having a 2.997 mm diameter) resulting in a tissue sample slice having approximately an 8.81 mm length, approximately a 2.997 mm width, and approximately a 0.3 mm depth. In some embodiments, the tissue sample (e.g., tissue section slice) may be a slice of a biopsy obtained from a 12-gauge needle (e.g., a needle having a 2.2 mm diameter) resulting in a tissue sample slice having approximately a 6.1 mm length, approximately a 2.07 mm width, and approximately a 0.3 mm depth. In some embodiments, the tissue sample may be a slice of a biopsy obtained from a 14-gauge needle (e.g., a needle having a 1.6 mm diameter) resulting in a tissue sample slice having approximately a 4.4 mm length, approximately a 1.51 mm width, and approximately a 0.3 mm depth. In some embodiments, the tissue sample may be a slice of a biopsy obtained from a 16-gauge needle (e.g., a needle having a 1.2 mm diameter) resulting in a tissue sample slice having approximately a 3.3 mm length, approximately a 1.13 mm width, and approximately a 0.3 mm depth. In some embodiments, the tissue sample may be a slice of a biopsy obtained from an 18-gauge needle (e.g., a needle having a 0.84 mm diameter) resulting in a tissue sample slice having approximately a 2.3 mm length, approximately a 0.80 mm width, and approximately a 0.3 mm depth. In some embodiments, the tissue sample may be a slice of a biopsy obtained from a 20-gauge needle (e.g., a needle having a 0.60 mm diameter) resulting in a tissue sample slice having approximately a 1.7 mm length, approximately a 0.56 mm width, and approximately a 0.3 mm depth.

In some embodiments, the tissue sample is a "biopsy coin" or a "tissue coin" of a biopsy obtained from any type or size of needle resulting in a biopsy coin or tissue coin having approximately a 0.3 mm depth.

In some embodiments, the tissue sample comprising living cells and/or tissue section comprising living cells is a whole biopsy sample. In some embodiments, the tissue sample comprising living cells and/or tissue section comprising living cells is a bisected biopsy tissue sample (horizontal or longitudinal cuts that can range from 100-700 micron (μm) thick or bisected cuts that can range from 100 μm to 1 mm thick or combinations therein). In some embodiments, the tissue sample comprising living cells and/or tissue section comprising living cells is a living tissue fragment.

In some embodiments, the tissue sample and/or tissue section as used in any of the embodiments described herein (e.g., method embodiments and/or system embodiments) is not limited to any size dimension or obtained through any type of cutting manner so long as the tissue sample and/or tissue section (e.g., resulting in a tissue fragment, tissue slice, or tissue coin) comprises at least a portion of living cells.

In some embodiments, the tissue sample comprising living cells and/or tissue section comprising living cells has a thickness of approximately 100 µm to 1 mm. In some embodiments, the tissue sample comprising living cells and/or tissue section comprising living cells has a three-dimensional size of approximately 300 µm×300 µm×300 µm. In some embodiments, the tissue sample comprising living cells and/or tissue section comprising living cells has a three-dimensional size of approximately 900 µm×900 µm×600 µm.

In some embodiments, the tissue sample and/or tissue section comprising living cells (e.g., living tumor cells) has an approximate length between 100 µm to 8.81 mm. In some embodiments, the tissue sample and/or tissue section comprising living cells (e.g., living tumor cells) has an approximate width between approximately 100 µm to 3 mm. In some embodiments, the tissue sample and/or tissue section comprising living cells (e.g., living tumor cells) has an approximate height between approximately 100 µm to 1 mm. In some embodiments, the tissue sample and/or tissue section comprising living cells (e.g., living tumor cells) has an approximate length between 100 µm to 8.81 mm, an approximate width between approximately 100 µm to 3 mm, and an approximate height between approximately 100 µm to 1 mm.

As described herein, the "culture conditions" or "under culture conditions" as recited herein are standard culture conditions. In some embodiments, the "culture conditions" or "under culture conditions" are culture conditions not capable of changing cellular activity within the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample). In some embodiments, the "culture conditions" or "under culture conditions" are culture conditions suitable for maintaining viability of the living cells (e.g., living cells within a tissue sample) (e.g., living cells within a tissue sample) without changing cellular activity within the living cells.

As described herein, the systems and methods are related to determining within a tissue section comprising living cells changes in cellular activity in the tissue section following exposure to a first stimulus at a first time point and following exposure to a second stimulus at a second time point after the first time point.

The systems and methods described herein are not limited to exposing the tissue sample comprising living cells to a particular type of first stimulus and second stimulus. In some embodiments, the first stimulus and second stimulus are different types of stimuli. In some embodiments, the first and second stimuli are identical. In some embodiments, the first and second stimuli are identical but provided in different manners (e.g., different intensities, concentrations, strengths, etc.).

The systems and methods described herein are not limited to a specific type of first stimulus.

In some embodiments, the first stimulus is a control stimulus. In some embodiments, the first stimulus is a control stimulus that does not induce changes in cellular activity within the tissue sample comprising living cells. As such, in such embodiments wherein the first stimulus is a control stimulus, a baseline level of cellular activity can be measured prior to exposure to a second stimulus. In some embodiments, the control stimulus is a purified control immunoglobulin (e.g., IgG). In some embodiments, the control stimulus is phosphate buffered saline (PBS). In some embodiments, the control stimulus is dimethylsulfoxide (DMSO). In some embodiments, the control stimulus is any biological buffer. In some embodiments, the control stimulus is serum albumin. In some embodiments, the control stimulus is any type or kind of stimulus that affects the tissue sample in a manner which provides a baseline measurement for cellular activity.

In some embodiments, the control stimulus are culture conditions suitable for maintaining viability of the living cells (e.g., living cells within a tissue sample) (e.g., living cells within a tissue sample). In some embodiments, the control stimulus are culture conditions suitable for maintaining viability of the living cells (e.g., living cells within a tissue sample) (e.g., living cells within a tissue sample) without changing cellular activity within the living cells. In some embodiments, the "under culture conditions" is the first stimulus (e.g., the control stimulus). In some embodiments, the "under culture conditions" is different than the first stimulus (e.g., the control stimulus).

In some embodiments, the first stimulus is not a control stimulus (e.g., first stimulus is a treatment stimulus) (e.g., first stimulus is selected from the described second stimuli).

The systems and methods described herein are not limited to a specific type of second stimulus and additional stimuli (e.g., a third stimulus, a fourth stimulus, a fifth stimulus, a tenth stimulus, a $20^{th}$ stimulus, etc.). In some embodiments, the second stimulus and any additional stimulus are identical. In some embodiments, the second stimulus and at least one additional stimulus are identical. In some embodiments, the second stimulus and any additional stimulus are different. In some embodiments, there is only a second stimulus and no additional stimuli. In some embodiments, the second stimulus (and any additional stimulus) is one stimulus. In some embodiments, the second stimulus (and any additional stimulus) is a combination of different stimuli (e.g., a combination of different pharmaceutical interventions) (e.g., a cocktail of pharmaceutical agents) simultaneously exposed to the tissue sample comprising living cells.

In some embodiments, the second stimulus is a non-control stimulus (e.g., a pharmaceutical agent), and the third stimulus is a control stimulus.

In some embodiments, the second stimulus (and any additional stimulus) is a non-control stimulus. In some embodiments, the second stimulus (and any additional stimulus) is any type of stimulus that is capable of or is suspected of being capable of inducing changes in cellular activity within the tissue sample comprising living cells. In some embodiments, the second stimulus (and any additional stimulus) is a pharmaceutical agent. In some embodiments, the second stimulus (and any additional stimulus) is selected from a radiotherapy, a monoclonal antibody therapy, a small molecule therapy, a chemotherapy, an immunotherapy or other anticancer drug therapy or intervention.

Examples of second stimuli include, but are not limited to, potential therapeutic agents, potential non-therapeutic agents (e.g., deleterious agents), apoptosis markers (e.g., a caspase selected from the group consisting of caspase 3, 6, 7, 8, and 9, and caspase 3/7) (e.g., a granzyme selected from the group consisting of granzyme A, B, C, D, E, F, G, H, K, and M), an apoptosis inducing agent (e.g., staurosporine), a necroptosis inducing agent (e.g., sorafenib), cell fractions from unhealthy tissue, cell fractions from healthy tissue, viruses, bacteria, pathogens, food and food products or components, endogenous molecules (e.g., gene expression products or hormones that are artificially induced), metabolites, radiation, heat, cold, oxygen or other gases, and the like.

In some embodiments, the second stimulus (and any additional stimulus) is a potential therapeutic agent or combination of potential therapeutic agents. The term "potential therapeutic agent" or "agent" refers to any compound, material, substance, or condition that provides a potential therapeutic benefit, either alone, or in combination with other therapeutic approaches. Agents need not be drugs. Agents include, but are not limited to, food and food products or components, endogenous molecules (e.g., gene expression products or hormones that are artificially induced), metabolites, radiation, heat, cold, oxygen or other gases, and the like. In some embodiments, the "agent" is a biological agent such as an oncolytic virus or a cellular therapy (such as chimeric antigen receptor (CAR)-T cell). In some embodiments, the agent is a cell or a plurality of cells, such as one or more leukocytes (e.g., white blood cells). For example, in some embodiments the potential therapeutic agent is a leukocyte, such as a B-cell, NK-cell, T-cell, macrophage, neutrophil, eosinophil, basophil, etc. In some embodiments, the potential therapeutic agent is an activated cell (e.g., an activated T-cell). In some embodiments, the potential therapeutic agent comprises multiple cell types.

In some embodiments, the second stimulus (and any additional stimulus) is a drug. As used herein, the term "drug" is used in the broadest sense and refers to any agent or medicine with potential use as a therapeutic. For example, a drug can be an antibody or a fragment thereof, an aptamer, a protein, a nucleic acid (e.g., DNA, RNA, small interfering RNA (siRNA), short/small hairpin RNA (shRNA)), a small molecule, a compound, an oncolytic virus, and the like. In some embodiments, the drug is an anti-cancer drug. In some embodiments, the anti-cancer drug is a targeted anti-cancer agent, such as a targeted antibody (such as anti-Human Epidermal growth factor Receptor 2 (HER2) antibody), an antibody fragment, bispecific antibody (such as bispecific T cell engager (BiTe)), antibody-drug conjugates (such as trastuzumab emtansine) or a targeted small molecule (e.g., protein inhibitor, such as kinase inhibitor). In some embodiments, the anti-cancer drug is a cytostatic or cytotoxic agent, non-limiting examples of which include adriamycin, gemcitabine, palbociclib, docetaxel, fulvestrant, alpelisib, trametinib, cisplatin, carboplatin, oxaliplatin, exemestane, everolimus, vinorelbine, olaparib, capecitabine, cyclophosphamide, methotrexate, fluorouracil, mitomycin C, temozolomide, cetuximab, trastuzumab, leucovorin, topotecan, irinotecan and any combination thereof. In some embodiments, the anti-cancer drug is an immunotherapeutic agent or drug, non-limiting examples of which include an immune checkpoint inhibitor or an immunostimulatory agent. In some embodiments, the drug is an interfering RNA, such as siRNA or shRNA.

In some embodiments, the second stimulus (and any additional stimulus) is an immune checkpoint inhibitor. In some embodiments, the immune checkpoint inhibitor comprises an inhibitor of Cytotoxic T-Lymphocyte Associated protein 4 (CTLA-4), Programmed cell Death protein 1 (PD-1), Programmed Death Ligand 1 (PD-L1), or Lymphocyte-Activation Gene 3 (LAG3). In some embodiments, the immune checkpoint inhibitor comprises an anti-CTLA-4 antibody, an anti-PD-1 antibody, an anti-PD-L1 antibody, or an anti-LAG3 antibody. In some embodiments, the immune checkpoint inhibitor is selected from nivolumab, pembrolizumab, ipilimumab, atezolizumab, avelumab, durvalumab, tremelimumab, cemiplimab, retifanlimab, dostarlimab, toripalimab. In some embodiments, the target of the immune checkpoint inhibitor is selected from PD-1, PD-L1, CTLA4, LAG3, TIGIT, TIM3, VISTA, ICOS, BTLA, GITR, NKG2A, CD112R, B7-H3, and CD73.

As another example, the second stimulus (and any additional stimulus) is a therapeutic selected from atezolizumab, avelumab, bevacizumab, cemiplimab, cetuximab, daratumumab, dinutuximab, durvalumab, elotuzumab, ipilimumab, isatuximab, mogamulizumab, necitumumab, nivolumab, obinutuzumab, ofatumumab, olaratumab, panitumumab, pembrolizumab, pertuzumab, ramucirumab, rituximab, trastuzumab, gemtuzumab ozogamicin, brentuximab vedotin, trastuzumab emtansine, inotuzumab ozogamicin, polatuzumab vedotin, enfortumab vedotin, trastuzumab deruxtecan, Sacituzumab govitecan, moxetumomab pasudotox, ibritumomab tiuxetan, iodine tositumomab, and blatinumomab.

In some embodiments, the second stimulus (and any additional stimulus) is, for example, selected from an apoptotic agent, a mitotic inhibitor (e.g., monomethyl auristatin E (MMAE), monomethyl auristatin F (MMAF), mertansine (DM1), and ravtansine (DM4)), an anti-tumor antibiotic, an immunomodulating agent, a nucleic acid for gene therapy, an anti-angiogenic agent, an anti-metabolite, a boron-containing agent, a chemoprotective agent, a hormone agent, an anti-hormone agent, a DNA damaging agent (e.g., psilocybin, gliclazomycin, streptomycin, pyrrolobenzodiazepine (PBD), doxorubicin, and adrianmycin), a corticosteroid, a photoactive therapeutic agent, an oligonucleotide, a radionuclide agent, a radiosensitizer, a topoisomerase inhibitor, and a tyrosine kinase inhibitor.

In some embodiments, the second stimulus (and any additional stimulus) is, for example, selected from a disease-modifying antirheumatic drug (e.g., leflunomide, methotrexate, sulfasalazine, hydroxychloroquine), a biologic agent (e.g., rituximab, infliximab, etanercept, adalimumab, golimumab), a nonsteroidal anti-inflammatory drug (e.g., ibuprofen, celecoxib, ketoprofen, naproxen, piroxicam, diclofenac), an analgesic (e.g., acetaminophen, tramadol), an immunomodulator (e.g., anakinra, abatacept), and a glucocorticoid (e.g., prednisone, methylprednisone).

In some embodiments, the second stimulus (and any additional stimulus) is, for example, selected from a chemotherapeutic agent. Examples of chemotherapeutic agents include, but are not limited to, abiraterone acetate, methotrexate, paclitaxel albumin-stabilized nanoparticle formulation, ABVD (doxorubicin hydrochloride, bleomycin, vinblastine sulfate, dacarbazine combination), ABVE (doxorubicin hydrochloride, bleomycin, vinblastine sulfate, etoposide combination), ABVE-PC (doxorubicin hydrochloride, bleomycin, vinblastine sulfate, etoposide, prednisone, cyclophosphamide combination), AC (doxorubicin hydrochloride and cyclophosphamide combination), AC-T (doxorubicin hydrochloride, cyclophosphamide, paclitaxel combination), brentuximab vedotin, ADE (cytarabine, daunorubicin hydrochloride, etoposide combination), ado-trastuzumab emtansine, doxorubicin hydrochloride, fluorouracil, afatinib dimaleate, everolimus, imiquimod, aldesleukin, alemtuzumab, pemetrexed disodium, palonosetron hydrochloride, chlorambucil, aminolevulinic acid, anastrozole, aprepitant, pamidronate disodium, exemestane, nelarabine, arsenic trioxide, ofatumumab, asparaginase *Erwinia chrysanthemi*, bevacizumab, axitinib, azacitidine, BEACOPP (bleomycin, etoposide, doxorubicin hydrochloride, cyclophosphamide, vincristine sulfate, procarbazine hydrochloride, prednisone combination), carmustine, belinostat, bendamustine hydrochloride, BEP (bleomycin, etoposide, cisplatin combination), bevacizumab, bexarotene, tositumomab, I 131 Iodine tositumomab, bicalutamide, carmustine, bleomycin, bortezomib, bosutinib, busulfan, cabazitaxel, cabozantinib-S-malate, CAF (cyclophosphamide, doxorubicin hydrochloride, fluorouracil combination), irinotecan hydrochloride, capecitabine, CAPOX (capecitabine, oxaliplatin combination), carboplatin, carboplatin-taxol combination, carfilzomib, carmustine implant, lomustine, ceritinib, daunorubicin hydrochloride, recombinant HPV bivalent vaccine, cetuximab, chlorambucil, chlorambucil-prednisone combination, CHOP (cyclophosphamide, doxorubicin hydrochloride, vincristine sulfate, prednisone combination), cisplatin, cyclophosphamide, clofarabine, CMF (cyclophosphamide, methotrexate, fluorouracil combination), COPP (cyclophosphamide, vincristine sulfate, procarbazine hydrochloride, prednisone combination), COPP-ABV (cyclophosphamide, vincristine sulfate, procarbazine hydrochloride, prednisone, doxorubicin hydrochloride, bleomycin, vinblastine sulfate combination), dactinomycin, crizotinib, CVP (cyclophosphamide, vincristine sulfate, prednisone combination), ifosfamide, ramucirumab, cytarabine, liposomal cytarabine, dabrafenib, dacarbazine, decitabine, dactinomycin, dasatinib, degarelix, denileukin diftitox, denosumab, dexrazoxane hydrochloride, docetaxel, doxorubicin hydrochloride liposome, fluorouracil, rasburicase, epirubicin hydrochloride, oxaliplatin, eltrombopag olamine, enzalutamide, EPOCH (etoposide, prednisone, vincristine sulfate, cyclophosphamide, doxorubicin hydrochloride combination), eribulin mesylate, vismodegib, erlotinib hydrochloride, etoposide phosphate, etoposide, everolimus, raloxifene hydrochloride, toremifene, fulvestrant, FEC (fluorouracil, epirubicin hydrochloride, cyclophosphamide combination), letrozole, filgrastim, fludarabine phosphate, fluorouracil, FOLFIRI (leucovorin calcium, fluorouracil, irinotecan hydrochloride combination), FOLFIRI-bevacizumab combination, FOLFIRI-cetuximab combination, FOLFIRINOX (leucovorin calcium, fluorouracil, irinotecan hydrochloride, oxaliplatin combination), FOLFOX (leucovorin calcium, fluorouracil, oxaliplatin combination), pralatrexate, FU-LV (fluorouracil, leucovorin calcium combination), recombinant HPV quadrivalent vaccine, obinutuzumab, gefitinib, gemcitabine hydrochloride, gemcitabine-cisplatin combination, gemcitabine-oxaliplatin combination, gemtuzumab ozogamicin, imatinib mesylate, glucarpidase, goserelin acetate, trastuzumab, topotecan hydrochloride, hyper-CVAD (cyclophosphamide, vincristine sulfate, doxorubicin hydrochloride, dexamethasone combination), ibritumomab tiuxetan, ibrutinib, ICE (ifosfamide, carboplatin, etoposide combination), ponatinib hydrochloride, idarubicin hydrochloride, idelalisib, ifosfamide, axitinib, recombinant interferon α-2b, ipilimumab, irinotecan hydrochloride, romidepsin, ixabepilone, ruxolitinib phosphate, palifermin, pembrolizumab, lapatinib ditosylate, lenalidomide, letrozole, leucovorin calcium, leuprolide acetate, vincristine sulfate liposome, procarbazine hydrochloride, mechlorethamine hydrochloride, megestrol acetate, trametinib, mercaptopurine, mesna, temozolomide, mitomycin C, mitoxantrone hydrochloride, MOPP (mechlorethamine hydrochloride, vincristine sulfate, procarbazine hydrochloride, prednisone combination), plerixafor, vinorelbine tartrate, nelarabine, sorafenib tosylate, nilotinib, tamoxifen citrate, romiplostim, obinutuzumab, ofatumumab, omacetaxine mepesuccinate, pegaspargase, OEPA (vincristine sulfate, etoposide, prednisone, doxorubicin hydrochloride combination), OFF (oxaliplatin, fluorouracil, leucovorin calcium combination), OPPA (vincristine sulfate, procarbazine hydrochloride, prednisone, doxorubicin hydrochloride combination), paclitaxel, PAD (bortezomib, doxorubicin hydrochloride, dexamethasone combination), palifermin, palonosetron hydrochloride, pamidronate e disodium, panitumumab, pazopanib hydrochloride, peginterferon α-2b, pembrolizumab, pemetrexed disodium, pertuzumab, plerixafor, pomalidomide, ponatinib hydrochloride, pralatrexate, prednisone, procarbazine hydrochloride, sipuleucel-T, radium 223 dichloride, R-CHOP (rituximab, cyclophosphamide, doxorubicin hydrochloride, vincristine sulfate, prednisone combination), R-CVP (rituximab, cyclophosphamide, vincristine sulfate, prednisone combination), regorafenib, rituximab, romidepsin, ruxolitinib phosphate, talc, siltuximab, sipuleucel-T, sorafenib tosylate, STANFORD V (mechlorethamine hydrochloride, doxorubicin hydrochloride, vinblastine sulfate, vincristine sulfate, bleomycin, etoposide, prednisone combination), sunitinib malate, thalidomide, TAC (docetaxel, doxorubicin hydrochloride, cyclophosphamide combination), temozolomide, temsirolimus, topotecan hydrochloride, toremifene, TPF (docetaxel, cisplatin, fluorouracil combination), trametinib, trastuzumab, vandetanib, VAMP (vincristine sulfate, doxorubicin hydrochloride, methotrexate, prednisone combination), VelP (vinblastine sulfate, ifosamide, cisplatin combination), vinblastine sulfate, vemurafenib, vincristine sulfate, vincristine sulfate liposome, vinorelbine tartrate, VIP (etoposide, ifosfamide, cisplatin combination), vismodegib, vorinostat, XELOX (capecitabine, oxaliplatin combination), ziv-aflibercept, zoledronic acid, QBECO, QBKPN, QBSAU, QBECP, and combinations thereof.

In some embodiments, the second stimulus (and any additional stimulus) is any pharmaceutical agent capable of or suspected of being capable of treating a disease or condition related to atherosclerosis; multiple sclerosis; diabetes; diabetic retinopathy; arthritis; rheumatoid arthritis; a fungal, viral, chlamydial, bacterial, nanobacterial or parasitic infectious disease; Human Immunodeficiency Virus (HIV) causing acquired immunodeficiency syndrome (AIDS); infection with severe acute respiratory syndrome (SARS) virus (preferably coronavirus 2 (SARS-CoV-2)), Asian (chicken) flu virus, herpes simplex or herpes zoster; hepatitis; viral hepatitis; a cardiovascular disease; coronary artery stenosis; carotid artery stenosis; intermittent claudication; a dermatological condition; acne; psoriasis; a disease characterized by benign or malignant cellular hyperproliferation or by areas of neovascularization; a benign or malignant tumor; early cancer; cervical dysplasia; soft tissue sarcoma; a germ cell tumor; retinoblastoma; age-related macular degeneration; lymphoma; Hodgkin's lymphoma; head and neck cancer; oral or mouth cancer; or cancer of the blood, prostate, cervix, uterus, vaginal or other female adnexa, breast, naso-pharynx, trachea, larynx, bronchi, bronchioles, lung, hollow organs, esophagus, stomach, bile duct, intestine, colon, colorectum, rectum, bladder, ureter, kidney, liver, gall bladder, spleen, brain, lymphatic system, bones, skin or pancreas.

In some embodiments, the second stimulus (and any additional stimulus) is any pharmaceutical agent capable of or suspected of being capable of treating a disease or condition related to a neoplastic disease, selected from, but not limited to, leukemia, acute leukemia, acute lymphocytic leukemia, acute myelocytic leukemia, myeloblastic, promyelocytic, myelomonocytic, monocytic, erythroleukemia, chronic leukemia, chronic myelocytic, (granulocytic) leukemia, chronic lymphocytic leukemia, Polycythemia vera, lymphoma, Hodgkin's disease, non-Hodgkin's disease, Multiple myeloma, Waldenstrom's macroglobulinemia, Heavy chain disease, solid tumors, sarcomas and carcinomas, fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, uterine cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, meningioma, melanoma, neuroblastoma, and retinoblastoma. In some embodiments, the disease is an inflammatory disease selected from the group consisting of, but not limited to, eczema, inflammatory bowel disease, rheumatoid arthritis, asthma, psoriasis, ischemia/reperfusion injury, ulcerative colitis and acute respiratory distress syndrome.

In some embodiments, the second stimulus (and any additional stimulus) is any pharmaceutical agent capable of or suspected of being capable of treating a disease or condition related to a viral disease selected from the group consisting of, but not limited to, viral disease caused by DNA viruses such as hepatitis type B, hepatitis type C virus; RNA viruses, such as human immunodeficiency virus type I (HIV-I), human immunodeficiency virus type II (HIV-II), human T-cell lymphotropic virus type I (HTLV-I), human T-cell lymphotropic virus type II (HTLV-II); rotavirus; parvoviruses, such as adeno-associated virus and cytomegalovirus; papovaviruses such as papilloma virus, polyoma viruses, and SV40; adenoviruses; herpes viruses such as herpes simplex type I (HSV-I), herpes simplex type II (HSV-II), and Epstein-Barr virus; poxviruses, such as variola (smallpox) and vaccinia virus; influenza virus; measles virus; rabies virus; Sendai virus; picornaviruses, such as poliomyelitis virus, coxsackieviruses, rhinoviruses, reoviruses, togaviruses such as rubella virus (German measles) and Semliki forest virus, arboviruses, and hepatitis type A virus.

In some embodiments, the second stimulus (and any additional stimulus) is any pharmaceutical agent capable of or suspected of being capable of treating a disease or condition related to Gram-positive and/or Gram-negative bacteria and/or drug resistant Gram-positive and/or Gram-negative bacteria. Examples of such diseases or conditions include, but are not limited to, pneumonia, endocarditis, bacteremia, sepsis and other forms of toxemia caused by Gram-positive and/or Gram-negative bacteria.

In some embodiments, the second stimulus (and any additional stimulus) is any pharmaceutical agent capable of or suspected of being capable of treating a disease or condition related to an autoimmune disorder and/or inflammatory disease. Examples of autoimmune disorders and/or inflammatory diseases include, but are not limited to, arthritis, rheumatoid arthritis, psoriatic arthritis, osteoarthritis, degenerative arthritis, polymyalgia rheumatic, ankylosing spondylitis, reactive arthritis, gout, pseudogout, inflammatory joint disease, systemic lupus erythematosus, polymyositis, and fibromyalgia. Additional types of arthritis include achilles tendinitis, achondroplasia, acromegalic arthropathy, adhesive capsulitis, adult onset Still's disease, anserine bursitis, avascular necrosis, Behcet's syndrome, bicipital tendinitis, Blount's disease, brucellar spondylitis, bursitis, calcaneal bursitis, calcium pyrophosphate dihydrate deposition disease (CPPD), crystal deposition disease, Caplan's syndrome, carpal tunnel syndrome, chondrocalcinosis, chondromalacia patellae, chronic synovitis, chronic recurrent multifocal osteomyclitis, Churg-Strauss syndrome, Cogan's syndrome, corticosteroid-induced osteoporosis, costosternal syndrome, CREST syndrome, cryoglobulinemia, degenerative joint disease, dermatomyositis, diabetic finger sclerosis, diffuse idiopathic skeletal hyperostosis (DISH), discitis, discoid lupus erythematosus, drug-induced lupus, Duchenne's muscular dystrophy, Dupuytren's contracture, Ehlers-Danlos syndrome, enteropathic arthritis, epicondylitis, erosive inflammatory osteoarthritis, exercise-induced compartment syndrome, Fabry's disease, familial Mediterranean fever, Farber's lipogranulomatosis, Felty's syndrome, Fifth's disease, flat feet, foreign body synovitis, Freiberg's disease, fungal arthritis, Gaucher's disease, giant cell arteritis, gonococcal arthritis, Goodpasture's syndrome, granulomatous arteritis, hemarthrosis, hemochromatosis, Henoch-Schonlein purpura, Hepatitis B surface antigen disease, hip dysplasia, Hurler syndrome, hypermobility syndrome, hypersensitivity vasculitis, hypertrophic osteoarthropathy, immune complex disease, impingement syndrome, Jaccoud's arthropathy, juvenile ankylosing spondylitis, juvenile dermatomyositis, juvenile rheumatoid arthritis, Kawasaki disease, Kienbock's disease, Legg-Calve-Perthes disease, Lesch-Nyhan syndrome, linear scleroderma, lipoid dermatoarthritis, Lofgren's syndrome, Lyme disease, malignant synovioma, Marfan's syndrome, medial plica syndrome, metastatic carcinomatous arthritis, mixed connective tissue disease (MCTD), mixed cryoglobulinemia, mucopolysaccharidosis, multicentric reticulohistiocytosis, multiple epiphyseal dysplasia, mycoplasmal arthritis, myofascial pain syndrome, neonatal lupus, neuropathic arthropathy, nodular panniculitis, ochronosis, olecranon bursitis, Osgood-Schlatter's disease, osteoarthritis, osteochondromatosis, osteogenesis imperfecta, osteomalacia, osteomyelitis, osteonecrosis, osteoporosis, overlap syndrome, pachydermoperiostosis, Paget's disease of bone, palindromic rheumatism, patellofemoral pain syndrome, Pellegrini-Stieda syndrome, pigmented villonodular synovitis, piriformis syndrome, plantar fasciitis, polyarteritis nodus, Polymyalgia rheumatic, polymyositis, popliteal cysts, posterior tibial tendinitis, Pott's disease, prepatellar bursitis, prosthetic joint infection, pseudoxanthoma elasticum, psoriatic arthritis, Raynaud's phenomenon, reactive arthritis/ Reiter's syndrome, reflex sympathetic dystrophy syndrome, relapsing polychondritis, retrocalcaneal bursitis, rheumatic fever, rheumatoid vasculitis, rotator cuff tendinitis, sacroiliitis, salmonella osteomyelitis, sarcoidosis, saturnine gout, Scheuermann's osteochondritis, scleroderma, septic arthritis, seronegative arthritis, shigella arthritis, shoulder-hand syndrome, sickle cell arthropathy, Sjogren's syndrome, slipped capital femoral epiphysis, spinal stenosis, spondylolysis, staphylococcus arthritis, Stickler syndrome, subacute cutaneous lupus, Sweet's syndrome, Sydenham's chorea, syphilitic arthritis, systemic lupus erythematosus (SLE), Takayasu's arteritis, tarsal tunnel syndrome, tennis elbow, Tietze's syndrome, transient osteoporosis, traumatic arthritis, trochanteric bursitis, tuberculosis arthritis, arthritis of Ulcerative colitis, undifferentiated connective tissue syndrome (UCTS), urticarial vasculitis, viral arthritis, Wegener's granulomatosis, Whipple's disease, Wilson's disease, and Yersinia arthritis.

In some embodiments, the tissue sample is exposed to a final stimulus (e.g., a stimulus after the second stimulus and any additional stimulus). In some embodiments, the final stimulus is a control stimulus (as described for the first stimulus). In some embodiments, the final stimulus affects, changes, and/or destroys the tissue sample.

In some embodiments, the first stimulus is a negative control, the second stimulus (and, if present, additional stimuli) is a treatment stimulus, and there is a final stimulus that is a negative control. In some embodiments, the final stimulus alters the biological state of the tissue sample (e.g., renders the tissue sample non-viable). In some embodiments, the final stimulus renders the tissue sample no longer suitable for live culture. In some embodiments, the final stimulus renders the tissue sample capable for one or more of the following types of analysis and/or measurement: histological, RNA extraction, cell lysis, protein isolation or extraction, DNA extraction, RNA sequencing, DNA sequencing, protein sequencing, protein identification and characterization.

In some embodiments, the final stimulus is a control stimulus different than the first stimulus (e.g., a different control stimulus). For example, in some embodiments involving three or more stimuli, the first stimulus is IgG (e.g., a control stimulus), the second stimulus is a treatment stimulus (e.g., anti-PD-1 antibody), the third stimulus is anti-CD3/anti-CD28 antibody (e.g., a control stimulus different than the first stimulus), and a fourth/final stimulus is a stimulus that damages the tissue sample in a way that it is no longer suitable for live culture and renders it capable for one or more of the following types of analysis and/or measurement: histological, RNA extraction, cell lysis, protein isolation or extraction, DNA extraction, RNA sequencing, DNA sequencing, protein sequencing, protein identification and characterization.

In some embodiments wherein there is a first stimulus and a second stimulus, the first stimulus is removed from the tissue sample prior to exposing the tissue sample to the second stimulus. In some embodiments wherein there is a first stimulus and a second stimulus, the first stimulus is not removed from the tissue sample prior to exposing the tissue sample to the second stimulus. In some embodiments, a stimulus (e.g., a first stimulus, second stimulus, third stimulus, tenth stimulus, etc.) is removed from the tissue sample prior to exposing the tissue sample to an additional stimulus. In some embodiments, a stimulus (e.g., a first stimulus, second stimulus, third stimulus, tenth stimulus, etc.) is not removed from the tissue sample prior to exposing the tissue sample to an additional stimulus. measuring secretory factors (cytokines) also The systems and methods described herein are not limited to measuring a particular type of cellular activity in the tissue sample comprising living cells. In some embodiments, the type of cellular activity to be measured is any kind of cellular activity that can be measured without damaging/altering/changing the tissue sample. In some embodiments, the measured cellular activity is selected from one or more of cellular activation, cellular inhibition, cellular interaction, protein expression, protein secretion, metabolite secretion, changes in lipid profiles, microvesicle secretion, exosome secretion, microparticle secretion, changes in cellular mass, cellular proliferation, changes in cellular morphology, motility, cell death, cell cytotoxicity, cell lysis, cell membrane polarization, establishment of a synapse, dynamic trafficking of proteins, granule polarization, calcium activation, metabolic changes, small molecule secretion, proton secretion, or combinations thereof. In some embodiments, the measured cellular activity is measuring secretory factor (e.g., cytokine) activity. In some embodiments, the measured cellular activity is selected from reproduction, growth, adhesion, death, migration, energy production, oxygen utilization, metabolic activity, cell signaling, response to free radical damage, or any combination thereof.

In some embodiments, the measured cellular activity is related to immune cell activity. For example, in some embodiments, the measured cellular activity is related to an immunological response within the tissue sample comprising living cells. In some embodiments, measuring cellular activity includes measuring the activity of various types of immune cells within a tissue sample comprising living cells (e.g., motility of T cells, B cells, etc.). For example, the measured cellular activity may comprise evaluating T-cells (e.g., activated T-cells, CD8+ T-cells, CD4+ T cells) B-cells, and/or NK cells. In some embodiments, the measured cellular activity may involve detecting the activity (e.g., motility) of T-cells (e.g., activated T-cells, CD8+ T-cells, CD4+ T cells) B-cells, and/or NK cells within the tissue sample. In some embodiments, the measured cellular activity is related to T-cell activation state, T-cell-mediated cytotoxicity, and T-cell motility and density. In some embodiments, the measured cellular activity is related to CTL activation state, CTL cell-mediated cytotoxicity, and CTL motility and density.

In some embodiments, measuring cellular activity comprises measuring one or more types of immune cell activity. In some embodiments, one or more types of immune cell activity is selected from macrophage activity, B lymphocyte activity, T lymphocyte activity, mast cell activity, monocyte activity, dendritic cell activity, eosinophil activity, natural killer cell activity, basophil activity, and neutrophil activity. In some embodiments, the T lymphocyte activity comprises cytotoxic T-cell lymphocyte (CTL) activity.

The described systems and methods are not limited to a specific time-point for measuring cellular activity during and/or after exposure of the tissue sample comprising living cells to the first stimulus. In some embodiments, cellular activity of the tissue sample is measured during exposure to the first stimulus. In some embodiments, cellular activity of the tissue sample is continuously measured until exposure to the second stimulus. In some embodiments, cellular activity of the tissue sample is measured once until exposure to the second stimulus. In some embodiments, cellular activity of the tissue sample is measured at multiple time points (e.g., 1, 2, 3, 4, 5, 6, 7, 8, 9, 10, 15, 20, 50, 75, 100, 1000, 10000, etc.) until exposure to the second stimulus.

The described systems and methods are not limited to a specific time-point for measuring cellular activity during and/or after exposure of the tissue sample comprising living cells to the second stimulus (and any additional stimulus). In some embodiments, cellular activity is measured immediately following exposure to the second stimulus (and any additional stimulus). In some embodiments, cellular activity is during exposure to the second stimulus (and any additional stimulus). In some embodiments, cellular activity is continuously measured following exposure to the second stimulus (and any additional stimulus) until a user deems the measurement complete. In some embodiments, cellular activity is measured for an extended period of time following exposure to the second stimulus (and any additional stimulus). For example, the extended period of time can be from seconds (e.g., 0.01 seconds, 1 second, 2, 3, 4, 5, 10, 20, 30, 45 seconds, etc.) or minutes (1, 2, 3, 4, 5, 6, 7, 8, 9, 10, 15, 30, 45 minutes, etc.) following exposure to the second stimulus (and any additional stimulus) or hours (e.g., 1, 2, 3, 4, 5, 6, 7, 8, 9, 10, 15, 20, 23 hours, etc.) or days (e.g., 1, 2, 4, 5, 6, 7, 8, 9, 10, 15, 20, 30, 50 days, etc.).

In some embodiments, one or more cellular activity measurements (e.g., 1, 2, 3, 4, 5, 6, 7, 8, 9, 10, 15, 20, 25, 50, 75, 100, 1000, 10000 cellular activity measurements) are taken after the first time point and before the second time point; and/or one or more cellular activity measurements (e.g., 1, 2, 3, 4, 5, 6, 7, 8, 9, 10, 15, 20, 25, 50, 75, 100, 1000, 10000 cellular activity measurements) are taken after the second time point (and any additional time point related to an additional stimulus).

In some embodiments, cellular activity measurements (e.g., 1, 2, 3, 4, 5, 6, 7, 8, 9, 10, 15, 20, 25, 50, 75, 100, 1000, 10000 cellular activity measurements) are taken after the first time point and before the second time point at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1000, 10000 days); and/or cellular activity measurements (e.g., 1, 2, 3, 4, 5, 6, 7, 8, 9, 10, 15, 20, 25, 50, 75, 100, 1000, 10000 cellular activity measurements) are taken after the second time point (and any additional time point related to an additional stimulus) at a frequency selected from approximately every second (e.g., every 0.01, 0.1, 1, 2, 3, 4, 5, 10, 15, 20, 30, 35, 40, 50, 55, 58, 59, 59.9 seconds), approximately every minute (e.g., 0.1, 1, 2, 3, 4, 5, 10, 15, 20, 30, 35, 40, 50, 55, 58, 59, 59.9 minutes), approximately every hour (e.g., 0.1, 1, 2, 3, 4, 5, 10, 15, 20, 30, 35, 40, 50, 55, 58, 59, 59.9 hours), approximately every day (e.g., 0.1, 1, 2, 3, 4, 5, 10, 15, 20, 28, 30, 35, 40, 50, 100, 1000, 10000 days).

In some embodiments, the frequency of cellular activity measurements (e.g., during and/or after exposure to the first stimulus, and during and/or after exposure to the second stimulus) is not consistent (e.g., the time period between measurements is different from measurement to measurement).

In some embodiments, the frequency of cellular activity measurements (e.g., during and/or after exposure to the first stimulus, and during and/or after exposure to the second stimulus) is consistent (e.g., the time period between measurements is identical measurement to measurement).

In some embodiments, cellular activity measurements (e.g., 1, 2, 3, 4, 5, 6, 7, 8, 9, 10, 15, 20, 25, 50, 75, 100, 1000, 10000 cellular activity measurements) are taken after the first time point and before the second time point at a frequency selected from approximately every second.

In some embodiments, the cellular activity is measured in the tissue sample continuously during and/or after the first time point but before the second time point; and/or cellular activity is measured in the tissue sample continuously during and/or after the second time point (and any additional time point related to an additional stimulus) until an end-point.

In some embodiments, the cellular activity is measured in the tissue sample continuously following the first time point but before the second time point; and/or cellular activity is measured in the tissue sample continuously following the second time point (and any additional time point related to an additional stimulus) until an end-point.

The systems and methods described herein are not limited to the particular manner of measuring a particular type of cellular activity in the tissue sample comprising living cells. In some embodiments, the cellular activity is measured by a qualitative assay, a quantitative assay, or a combination thereof.

Quantitative and/or qualitative measurements of cellular activity within a tissue sample comprising living cells can be obtained, for example, by technologies that do not alter, change, and/or destroy the tissue sample. In some embodiments, quantitative and/or qualitative measurements of cellular activity within a tissue sample comprising living cells can be obtained, for example, by Optical Coherence Microscopy (OCM)/Optical Coherence Tomography (OCT), Multi-Photon Microscopy (MPM), Fluorescence Lifetime Imaging Microscopy (FLIM), bright field microscopy, atomic force microscopy, interferometry, fluorescence imaging with dyes and/or conductivity. In some embodiments, quantitative and/or qualitative measurements of cellular activity within a tissue sample comprising living cells can be obtained, for example, by technologies that measure cytokines, chemokines, metabolites, pH, and oxygen in conditioned media.

In some embodiments, measuring cellular activity within a tissue sample comprising living cells is accomplished with one or more imaging modalities. In some embodiments, at least one imaging modality of the one or more imaging modalities is configured for imaging with spatial resolution equal to or less than 20 μm (such about 20 μm, 10 μm, 5 μm, 2 μm, 1 μm, 0.5 μm, 0.2 μm, 0.1 μm and the like) in a 3-dimensional array of points (voxels). In some embodiments, at least one imaging modality is configured for imaging with spatial resolution less than or equal to 2 μm. In some embodiments, at least one imaging modality is configured for imaging with submicron level spatial resolution (such as 0.1 to 0.999 μm) in a 3-dimensional array of points. In some embodiments, at least one imaging modality is configured to image at different depths of the tissue sections or fragments. In some embodiments, at least one imaging modality is configured for non-destructive imaging of the tissue sample comprising living cells. In some embodiments, one or more imaging modalities are part of an imaging system. In some embodiments, the imaging system comprises at least two imaging modalities.

In some embodiments, at least one imaging modality of the one or more imaging modalities is OCM and/or dOCM. OCM and dOCM are enhanced interferometric techniques employing principals of OCT (Huang D et al. Optical coherence tomography, Science 254, 1178-1181 (1991)) to provide cross-sectional images of tissue based upon intrinsic contrasting of back-scattered light. OCT employs a raster scanned near IR beam in the lateral plane to obtain three-dimensional (3D) images of tissue structure. OCT contrast originates from back scattering between tissue layers due to difference in refractive indices. Therefore, unlike techniques which rely on fluorescent endogenous or exogenous molecules, OCT provides a label free method for contrast imaging.

The lateral resolution of traditional OCT is typically above 10 μm. However, OCM, a microscopic variant of OCT, can visualize cellular structures and achieve 1-3 μm lateral resolution by incorporating high numerical aperture objective lenses. The typical optical resolution of OCM is 1-3 μm laterally and ~1 μm axially. Unlike other imaging techniques such as confocal microscopy, OCM is a non-invasive imaging approach that provides sample imaging at a high resolution without requiring fluorescent markers and high laser power, and thus avoids the possibility of causing short and long-term photodamage to the tissue.

Dynamic-OCM (dOCM) utilizes OCM technology to capture a time series of tissue dynamics (C. Apelian, F. Harms, O. Thouvenin, and A. C. Boccara, "Dynamic full field optical coherence tomography: subcellular metabolic contrast revealed in tissues by interferometric signals temporal analysis," Biomed. Opt. Express 7(4), 1511 (2016)). Intracellular organelles (e.g., mitochondria) are highly dynamic in live cells and their metabolic activities give rise to the intracellular dynamics in live tissues. In contrast, dead tissues lack intracellular dynamics due to the absence of metabolic activities. Therefore, the dynamics in back scattered light from live and dead tissues exhibit different signatures. By analyzing the frequency components in the power spectrum of a time series of OCM images, specific frequency bands (such as 0.14 Hz-1 Hz) can be used to yield dOCM contrast for live cells. Moreover, since OCM provides high-resolution depth-resolved images, dOCM can be used to highlight live cells in 3D volumes.

In some embodiments, the systems and methods provided herein comprise imaging a tissue sample comprising living cells with OCM and/or dOCM to identify a live cell fraction within the tissue sample. In some embodiments, identifying the "live cell fraction" or "live cell portion" or "live cell region" of the sample implies that a majority of cells in the given region of the tissue sample are live, such as more than 50% of the cells are live, such as more than 55% of the cells are live, such as more than 60% of the cells are live, such as more than 70% of the cells are live, such as more than 75% of the cells are live, such as more than 80% of the cells are live, such as more than 90% of the cells are live and so on. Live cells have higher magnitudes of fluctuations at 0.14 Hz-1 Hz than dead cells, which can be detected by dOCM. Without wishing to be bound by theory, it is possible that metabolic processes occurring in live cells result in organelle movement within these living cells, which yields contrast in the dOCM image in sections of tissue having a high percentage of living cells. In contrast, these metabolic processes are absent in dead cells, and therefore dead cells lack fluctuation at 0.14 Hz-1 Hz and thus generate less contrast (e.g. a darker) in an image obtained by OCM/dOCM. Accordingly, in some embodiments the live cell fraction of the tissue sample is identified as a portion of an image obtained by OCM and/or dOCM having a higher level of contrast, whereas the dead cell fraction of the image is darker (e.g. has less contrast).

In some embodiments, the methods provided herein comprise imaging a tissue sample with OCM and/or dOCM to identify tissue types with different refractive indices, such as tissue type, cell density in the tissue, and tumorous/normal regions. In some embodiments, the methods provided herein comprise imaging a tissue sample with OCM and/or dOCM, thereby identifying a live cell fraction in the tissue sample as described above, and imaging the tissue sample with multi-channel FLIM to classify cell state within the live cell fraction of the tissue sample. In some embodiments, at least one imaging modality is configured for fluorescence imaging. In some embodiments, the imaging modality is configured for multiphoton excitation (either 2 or 3 photon excitation) of fluorescent molecules. In some embodiments, the imaging modality is configured to accomplish three-dimensional imaging using confocal fluorescence imaging or multi-photon imaging employing the use of a scanned plane of light (using 1, 2, or 3 photon excitation of fluorescent molecules). In some embodiments, the imaging modalities configured for fluorescence imaging comprises a light source (e.g., laser such as a pulsed laser employing a Titanium Sapphire gain medium and optics to generate an ultrafast pulse, or a picosecond pulsed laser emitting light in the visible spectral region of 380-700 nanometers (nm), a picosecond laser emitting light in the near Infrared (NIR) region of 700-2500 nm, or any ultrafast pulsed laser of pulse duration 30 to 500 femtoseconds (fs)), a scanner (e.g. one or more galvanometer mirror(s), or a rotating polygon mirror, or a resonant galvanometer mirror, and the like), and a detector (e.g., a charge coupled device (CCD), a complementary metal-oxide semiconductor (CMOS) based detector, an avalanche photodiode or a photomultiplier tube (PMT, or a hybrid PMT) and the like). In some embodiments, the fluorescence imaging modality comprises a light source configured to excite with an excitation wavelength in the range of preferably between 600 to 1700 nm. In some embodiments, the fluorescence imaging modality is configured for imaging with micron (e.g., 1 to 20 µm) and/or submicron (e.g., 100-999 nm, that is 0.1 to 0.999 µm) level spatial resolution in a 3-dimensional array of points (voxels). In some embodiments, the fluorescence imaging modality is configured to detect intrinsic emission (such as autofluorescence of molecules naturally present in biological tissue, such as intrinsic fluorophores). In some embodiments, the imaging modality is configured to detect second harmonic scattered light generated by components in the tissue fragments. In some embodiments, second harmonic scattered light is generated as the components interact with ultrafast pulsed laser light (30 to 500 fs) or pulsed laser light of picosecond pulse duration which subsequently propagate both through the sample and which are scattered back towards the excitation laser source.

In some embodiments, cellular activity is measured with multi-photon microscopy (MPM) and/or fluorescent lifetime imaging microscopy (FLIM).

MPM is an imaging technique that uses pulsed near infrared laser light to excite various endogenous fluorophores or exogenous fluorescent molecules to elucidate physical three-dimensional structure and perform spectroscopic measurements on voxels in the image field in three dimensions. MPM can be used to image endogenous fluorophores, which include molecules ranging from retinol to connective tissue (e.g., elastin, or collagen), to molecules involved in metabolic processes in the cell.

The ultrafast pulsed laser source employed in MPM enables a technique called FLIM. FLIM is a technique that does not rely on the absolute amount of light emitted through fluorescence to make determinations about the state of a molecule, but rather, on the amount of time an electron stays in an excited state before emitting light. This means that the technique is not dependent on the number of photons present and is uniquely suited to some of the issues encountered in traditional intensity imaging of tissue samples. However, in tissue samples with large degrees of heterogeneity due to the presence of many cell types or metabolic states associated with healthy stromal tissue, immune cells, and cancer tissue, the use of multi-channel FLIM reaches a limit due to the initial presence of many cellular metabolic states as well as molecules and complex features associated with connective tissue which also contribute to observed FLIM parameters. Primary human live tumor fragments derived from excised tumors, resections, and biopsies, and patient derived xenografts typically display high heterogeneity, and accordingly methods employing FLIM alone are not sufficient to evaluate cell state with a high degree of accuracy within such heterogenous samples.

In some embodiments the imaging modality is configured to measure the fluorescence lifetime of intrinsic fluorophore labels using one or more approaches (hereafter Fluorescent Lifetime Imaging or FLIM) (e.g., time correlated single photon counting, frequency domain methods, gated detection of photons, and the like). In some embodiments the imaging modality is configured to detect the polarization of emitted and scattered fluorescent light. In some embodiments, excitation light, which is circularly or elliptically polarized is used to perform Mueller matrix imaging. In some embodiments the generated images are deconvolved to enhance image resolution.

In some embodiments, the methods described herein involve imaging a tissue sample comprising living cells using FLIM. In some embodiments, FLIM comprises multi-channel FLIM. In some embodiments, multi-channel FLIM provides a signal from a first intrinsic fluorophore and a signal from a second intrinsic fluorophore. In some embodiments, the "signal" provided by multi-channel FLIM comprises a set of fluorescence parameters for the first intrinsic fluorophore and the second intrinsic fluorophore. In some embodiments, the set of fluorescence parameters includes one or more of fluorescence intensity (e.g., photon counts), fluorescence lifetimes parameters (e.g., individual lifetimes of the fluorescence lifetime components, mean lifetime etc.) or fluorescence lifetime composition (e.g., relative amplitudes of the fluorescence lifetime components etc.) of one or more fluorophores (such as intrinsic fluorophores). In some embodiments a set of fluorescence parameters comprises, photon counts from the intrinsic fluorophore, a weighted mean ($\tau_m$) of the lifetimes of a plurality of fluorescence lifetime components of the intrinsic fluorophore and the amplitude ($a_n$) of at least one fluorescence lifetime component relative to the plurality of fluorescence lifetime components. In some embodiments, the set of fluorescence parameters further comprises individual lifetimes of at least two fluorescence lifetime components of the plurality of fluorescence lifetime components.

In some embodiments, additional imaging modalities can be utilized along with OCM/dOCM and FLIM within methods for measuring cellular activity within tissue samples comprising living cells. For example, in some embodiments, methods are provided for assessing cell state within a tissue sample through use of OCM/dOCM and FLIM, and optionally, one or more additional imaging modalities. Non-limiting examples of additional imaging modalities include for example mass spectrometry (MS), nuclear magnetic resonance (NMR) spectroscopy, magnetic resonance imaging (MRI), light sheet microscopy, lattice light sheet microscopy, proton magnetic resonance spectroscopy, holographic microscopy, interference phase microscopy, quantitative phase microscopy, polarized phase microscopy, contrast phase microscopy, time-lapse imaging microscopy, surface enhanced Raman spectroscopy, videography, manual visual analysis, automated visual analysis, traction force microscopy, optical coherent tomography (OCT), intravascular ultra sound (IVUS), photoacoustics (PA), near-infra-red spectroscopy, impedance spectroscopy, SLOT (scanning laser optical tomography), SPIM (single plane illumination microscopy), optical projection tomography (OPT), widefield microscopy, transmission microscopy, confocal fluorescence microscopy, coherent anti-Stokes Raman scattering (CARS), nonlinear microscopy (e.g., two or three photon microscopy or microscopy using high harmonics generation (HHG)), confocal theta microscopy, stimulated emission detection microscopy (STED), structured illumination microscopy (SIM), localization microscopy (PALM/STORM), x-ray microscopy, x-ray tomography, an imaging ultrasound method, radioprobes, or combinations thereof.

As described herein, the systems and methods are related to determining cellular activity change within a tissue sample comprising living cells following exposure to a first stimulus at a first time point and following exposure to a second stimulus at a second time point after the first time point. The systems and methods described herein are not limited to a particular manner of determining cellular activity changes within a tissue sample comprising living cells following exposure to a first stimulus at a first time point and following exposure to a second stimulus at a second time point after the first time point.

In some embodiments, change in cellular activity is determined through quantifying the amount of change in one or more types of cellular activity during and/or after exposure to the first stimulus, and during and/or after exposure to the second stimulus (and any additional stimulus). In some embodiments, change in cellular activity is determined through quantifying the fold-change in one or more types of cellular activity. In some embodiments, the cellular activity change is determined through quantifying the slope-change in one or more types of cellular activity.

In some embodiments, the change in cellular activity is a rate of cellular activity change (e.g., cellular activity change over time). In some embodiments, rate of change in cellular activity is determined through quantifying the fold-change in one or more types of cellular activity over a period of time. In some embodiments, rate of change in cellular activity is determined through quantifying the slope-change in one or more types of cellular activity over a period of time.

In some embodiments, determining change in cellular activity within the tissue sample comprises determining slope-change of the measured cellular activity, and/or determining fold-change of the measured cellular activity.

In some embodiments, determining change in cellular activity within the tissue sample comprises calculating a slope-change for 1) the cellular activity measurement before the second time point, and during and/or after the first time point, and 2) the cellular activity measurement during and/or after the second time point. In some embodiments, determining change in cellular activity within the tissue sample comprises calculating a slope-change for 1) the cellular activity measurement before the second time point, and during and/or after the first time point, and 2) the cellular activity measurement during and/or after the second time point (and any additional time points related to additional stimuli).

In some embodiments, determining change in cellular activity within the tissue sample comprises calculating a fold-change for 1) the cellular activity measurement before the second time point, and during and/or after the first time point, and 2) the cellular activity measurement during and/or after the second time point. In some embodiments, determining change in cellular activity within the tissue sample comprises calculating a fold-change for 1) the cellular activity measurement before the second time point, and during and/or after the first time point, and 2) the cellular activity measurement during and/or after the second time point (and any additional time points related to additional stimuli).

The described systems and methods are not limited to a specific time-period comparison for determining change in cellular activity during and/or after exposure of the second stimulus (and any additional stimulus) to the tissue sample comprising living cells. For example, in some embodiments, a change in cellular activity levels is determined between early time points (e.g., 4 and 28 hours) and later time points (e.g., 28 and 48 hours).

In some embodiments, determining change in cellular activity within the tissue sample comprises determining slope-change of the measured cellular activity, and/or determining fold-change of the measured cellular activity. In some embodiments, determining change in cellular activity within the tissue sample comprises calculating a slope-change for 1) the cellular activity measurements before the second time point, and during and/or after the first time point, and 2) the cellular activity measurements during and/or after the second time point. In some embodiments, determining change in cellular activity within the tissue sample comprises calculating a fold-change for 1) the cellular activity measurements before the second time point, and during and/or after the first time point, and 2) the cellular activity measurements during and/or after the second time point.

In certain embodiments, the present invention provides a method, comprising obtaining a tissue sample comprising living tumor cells derived from a biopsy of a human cancer patient, wherein the biopsy is a core needle biopsy and/or a forceps biopsy; obtaining a tissue section from the obtained tissue sample, wherein the tissue section comprises living tumor cells, wherein the tissue section comprising living tumor cells has a length between 100 µm to 8.81 mm, wherein the tissue section comprising living tumor cells has an approximate width between approximately 100 µm to 3 mm; wherein the tissue section comprising living tumor cells has an approximate height between approximately 100 µm to 1 mm; under culture conditions suitable for maintaining viability of the tissue section, exposing the tissue section to a first stimulus at a first time point, wherein the first stimulus is a control stimulus; measuring cellular activity in the tissue section during and/or after exposure to the first stimulus; under culture conditions suitable for maintaining viability of the tissue section, exposing the tissue section to a second stimulus at a second time point after the first time point, wherein the second stimulus is one or more immune checkpoint inhibitors (ICIs); measuring one or more cellular activities in the tissue section during and/or after exposure to the second stimulus; determining changes in cellular activity within the tissue section based on 1) the cellular activity measurements before the second time point, and during and/or after the first time point, and 2) the cellular activity measurements during and/or after the second time point; wherein the tissue section comprises one or more of cytokines, macrophages, B lymphocytes, T lymphocytes, cytotoxic T-cell lymphocytes, mast cells, monocytes, dendritic cells, eosinophils, natural killer cells, basophils, and neutrophils; wherein measuring one or more cellular activities comprises measuring one or more types of immune cell activity.

In some embodiments, determining the changes in cellular activity within the tissue section comprises determining slope-change of the measured cellular activity, and/or determining fold-change of the measured cellular activity.

In some embodiments, the living tumor cells are living solid tumor cells. In some embodiments, the living tumor cells are living solid tumor cells related to a cancer selected from prostate, cervix, uterus, vaginal or other female adnexa, breast, naso-pharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin and pancreas.

In some embodiments, the culture conditions suitable for maintaining the viability of the tissue section are culture conditions suitable for maintaining viability of the tissue section without changing cellular activity within the tissue section. In some embodiments, the control stimulus is the culture conditions suitable for maintaining viability of the tissue section. In some embodiments, the control stimulus is the culture conditions suitable for maintaining viability of the tissue section without changing cellular activity within the tissue section. In some embodiments, the control stimulus is culture conditions suitable for maintaining viability of the tissue section. In some embodiments, the control stimulus is culture conditions suitable for maintaining viability of the tissue section without changing cellular activity within the tissue section. In some embodiments, the control stimulus is a stimulus that does not induce changes in cellular activity within the tissue section comprising living tumor cells.

In some embodiments, the control stimulus is selected from a purified control immunoglobulin, phosphate buffered saline (PBS), and any biological buffer.

In some embodiments, the one or more ICIs is an inhibitor of PD-1, PD-L1, CTLA4, LAG3, TIGIT, TIM3, VISTA, ICOS, BTLA, GITR, NKG2A, CD112R, B7-H3, or CD73. In some embodiments, the one or more ICIs is selected from nivolumab, pembrolizumab, ipilimumab, atezolizumab, avelumab, durvalumab, tremelimumab, cemiplimab, retifanlimab, dostarlimab, and toripalimab.

In some embodiments, cellular activity is measured in the tissue section continuously during and/or after the first time point but before the second time point; and/or cellular activity is measured in the tissue section continuously during and/or after the second time point until an end-point.

In some embodiments, cellular activity is measured in the tissue section one or more times during and/or after the first time point but before the second time point; and/or cellular activity is measured in the tissue section one or more times during and/or after the second time point until an end-point.

In some embodiments, the one or more type of immune cell activity is selected from cytokine activity, macrophage activity, B lymphocyte activity, T lymphocyte activity, cytotoxic T-cell lymphocyte (CTL) activity, mast cell activity, monocyte activity, dendritic cell activity, eosinophil activity, natural killer cell activity, basophil activity, and neutrophil activity.

In some embodiments, the cellular activity is measured by one or more of the following: optical coherence microscopy (OCM), dynamic optical coherence microscopy (dOCM), multi-photon microscopy (MPM), fluorescent lifetime imaging microscopy (FLIM), bright field microscopy, fluorescence imaging with dyes, interferometry, or a combination thereof.

In some embodiments, the method further comprises under culture conditions suitable for maintaining viability of the tissue section, exposing the tissue section to one or more additional stimuli, measuring cellular activity in the tissue section during and/or after each exposure to the one or more additional stimuli, and determining changes in cellular activity in the tissue sample following exposure to each of the one or more additional stimuli based on 1) the cellular activity measurement during and before any or all of the previous stimuli exposure, and 2) the cellular activity measurement during and/or after the most recent stimuli exposure.

The described systems and methods can be used for any purpose related to determining cellular activity change in a tissue sample comprising living cells. For example, in some embodiments, the described systems and methods are used for detecting the effect of a pharmaceutical intervention on a specific type of cellular activity within a tissue sample. In some embodiments, the systems and methods described are used for evaluating the effectiveness of a pharmaceutical intervention in inducing a desired change in cellular activity (e.g., an increase in immune response). In some embodiments, the systems and methods described are used for evaluating the effectiveness of a pharmaceutical intervention in inducing an undesired change in cellular activity (e.g., a decrease in immune response) (e.g., an undetectable change in immune response). In some embodiments, the systems and methods described are used for evaluating the effectiveness of a pharmaceutical intervention in inducing a desired change in cellular activity in a tissue sample comprising living cancer cells (e.g., an increase in immune response) (e.g., an increase in cytotoxicity in the cancer cells). In some embodiments, the described systems and methods are used for evaluating the effectiveness or ineffectiveness of a pharmaceutical intervention in inducing an undesired change in cellular activity in a tissue sample comprising living cancer cells (e.g., a decrease in immune response) (e.g., an undetectable change in immune response) (e.g., an undetectable amount of cytotoxicity). In some embodiments, the systems and methods described are used for evaluating the effect of a pharmaceutical intervention in inducing a change in cellular activity in a tissue sample comprising living non-diseased cells. In some embodiments, the described systems and methods are used for evaluating the safety of a pharmaceutical intervention on non-diseased cells (e.g., measuring deleterious effects on the living cells).

In some embodiments, the systems and methods described are used for evaluating the effect of a pharmaceutical intervention on the change in T-cell enumeration (e.g., change in the number/amount of cytotoxic T-cells in tissue sample before, during and/or after exposure to a second stimulus (and any additional stimulus).

In some embodiments, the described systems and methods are used for evaluating the effect of a pharmaceutical intervention on the change in metabolic state (e.g., change in glycolytic activity) in a tissue sample before and after exposure to a second stimulus (and any additional stimulus).

In some embodiments, the described systems and methods are used for evaluating the effect of a pharmaceutical intervention on T cell activity (e.g., change in glycolytic shift in activated T cells) in a tissue sample before and after exposure to a second stimulus (and any additional stimulus).

In some embodiments, the described systems and methods are used for evaluating the effect of a pharmaceutical intervention on the change in cellular activity in a tissue sample comprising living cells, wherein the cellular activity is selected from cellular activation, cellular inhibition, cellular interaction, protein expression, protein secretion, metabolite secretion, changes in lipid profiles, microvesicle secretion, exosome secretion, microparticle secretion, changes in cellular mass, cellular proliferation, changes in cellular morphology, motility, cell death, cell cytotoxicity, cell lysis, cell membrane polarization, establishment of a synapse, dynamic trafficking of proteins, granule polarization, calcium activation, metabolic changes, small molecule secretion, proton secretion, secretory factor (e.g., cytokine) activity, and combinations thereof. In some embodiments, the measured cellular activity is selected from reproduction, growth, adhesion, death, migration, energy production, oxygen utilization, metabolic activity, cell signaling, response to free radical damage, or any combination thereof.

In some embodiments, the described systems and methods are used for evaluating the effect of a pharmaceutical intervention on the change in cellular activity in a tissue sample comprising living cells, wherein the cellular activity comprises cellular activity of various types of immune cells within the tissue section comprising living cells (e.g., motility of T cells, B cells, etc.).

In some embodiments, the described systems and methods are used for determining the presence or absence of a disease or condition in a subject (e.g., a human patient). For example, in some embodiments, change in cellular activity of one or more cellular activities within a tissue sample obtained from the subject is determined, the determined change in one or more cellular activities is compared with established norms indicative of the presence or absence of the disease or condition, and a determination made regarding the presence or absence of the disease or condition in the subject.

In some embodiments, the systems and methods described are used for identifying a course of treatment for a patient suffering from a disease or condition. For example, in some embodiments, change in one or more cellular activities before and after exposure to a potential therapeutic agent within a tissue sample obtained from the subject (e.g., a tissue sample comprising living tumor cells) (e.g., a tissue sample comprising living diseased cells) is determined, the determined change in the one or more cellular activities is compared with established norms indicative of the presence or absence of a desired therapeutic effect (e.g., increase in immune response) (e.g., cytotoxicity directed toward desired cells) (e.g., increase in healthy cell development) (e.g., decrease in diseased cell development), and a determination made regarding a course of treatment for the subject. In some embodiments, the method further comprises administering the potential therapeutic agent to the subject if it is deemed an appropriate course of treatment. In some embodiments, the method further comprises not administering the potential therapeutic agent to the subject if it is not deemed an appropriate course of treatment.

As noted, in some embodiments, the tissue sample comprising living cells, after being obtained from a subject (e.g., a human patient), is first cut into tissue sections or tissue fragments. In some embodiments, the tissue sample comprising living cells, after being obtained from a subject (e.g., a human patient), is not cut into tissue sections or tissue fragments. In some embodiments, the tissue sample comprising living cells, after being obtained from a subject (e.g., a human patient), is not cut into tissue sections or tissue fragments (e.g., tissue sample obtained from core needle biopsy or forceps biopsy). In some embodiments, the tissue sections or fragments are placed in a suitable medium for extended preservation of cell viability, such as for transportation to a laboratory, where further processing of the tissue fragments takes place (such as sorting, imaging, culture etc.). In some embodiments, the tissue sections or fragments are preserved under hypothermic preservation conditions. The term "hypothermic preservation" or "hypothermal preservation" mean preservation at a temperature below the physiological temperature (which is about 37° C.) but above the temperature of freezing, wherein biological processes are slowed down, thus allowing prolonged storage of a biological material. In some embodiments, hypothermic preservation is performed at temperatures between about 0° C. and about 10° C. A "hypothermally preserved tissue" or a "hypothermally preserved tissue fragment" refers to a tissue or a tissue sections or fragments respectively, that has been preserved under hypothermic conditions. The terms "hypothermic preservation" and "cold preservation" have been used interchangeably. Similarly, the terms "hypothermic transport" and "cold transport" have been used interchangeably.

In some embodiments, the tissue sections or fragments are preserved under cryopreservation conditions (such as at sub-zero temperature). The term "cryopreservation" means preservation of a biological material (such as tissue or tissue fragment) at a temperature below the freezing temperature (such as at sub-zero temperature). A "cryopreserved tissue" or a "cryopreserved tissue fragment" refers to a tissue or a tissue fragment respectively, that has been preserved at temperature below the freezing temperature (such as at sub-zero Celsius temperature). A sub-zero Celsius temperature (or sub-zero temperature) is any temperature below 0° C., such as less than about −10° C., less than about-20° C., less than about −50° C., less than about −100° C., less than about −120° C., less than about −150° C. and so on. In some embodiments, sub-zero temperature is a temperature of liquid nitrogen, such as the boiling temperature of liquid nitrogen at atmospheric pressure. In some embodiments, sub-zero temperature is a temperature between about 0° C. and about-200° C. In some embodiments, sub-zero temperature is a temperature of about −196° C.

In some embodiments, the tissue sections or fragments are thawed for subsequent processing on reaching the destination site, such as a laboratory, where subsequent processing of the tissue fragments take place. In some embodiments, the tissue sections or fragments are preserved under conditions, wherein after thawing, the viability of cells in the tissue sections or fragments is not significantly reduced. In some embodiments, preservation of the tissue sections or fragments under cryopreservation or hypothermic preservation conditions allows the tissue fragments to be stored for extended periods of time without significant reduction in cell viability or alterations in its metabolic profile. This allows great flexibility in the workflow and logistics. For example, it obviates any restriction of distance between the source site of tissue (such as a hospital) and the destination site (such as a laboratory) or of time elapsed between excision of the tissue and initiation of culture.

For any of the embodiments described herein, cutting the tissue sample into tissue sections or fragments can be performed manually, or it can be semi-automated or automated. Various suitable cutting devices may be employed for cutting the tissue. In some embodiments, the cutting device is configured to cut the tissue sample precisely and with minimal mechanical damage to the tissue or the tissue sections or fragments. In non-limiting examples, cutting devices comprise a knife, a blade, a wire, a scalpel, a laser, and the like. In some embodiments, the cutting device comprises a plurality of blades. In some embodiments, the cutting device comprises a coated wire, such as a diamond particle coated steel wire (such as a diamond wire). In some embodiments, the cutting device comprises uniformly spaced wires (such as diamond wires or naked steel wired). In some embodiments, the cutting device comprises a cutting component. In some embodiments, the cutting component comprises at least one cutting member such as a knife, a blade, a wire, a scalpel, a laser, and the like. In some embodiments, the cutting device comprises three cutting components to cut the tissue in three dimensions, wherein each cutting component cuts the tissue in one dimension. In some embodiments, the tissue sample can be rotated 90 degrees relative to a single cutting component to make two of the three dimensional cuts. In some embodiments, the single cutting component can be rotated to make two of the three dimensional cuts. The cutting device is configured to accurately and precisely cut a tissue into tissue sections or fragments of a defined size. In some embodiments, the cutting device is configured to cut the tissue into tissue sections or fragments based on a size input received from the user (user-defined). In some embodiments, the user-defined size input is based on physical properties of the tissue such as mechanical stiffness, frangibility and the like. In some embodiments, the cutting device is configured to cut the tissue into tissue sections or fragments based on a pre-defined size input. In some embodiments, the cutting device is configured to cut the tissue into tissue sections or fragments automatically and repeatedly until the entire tissue is cut into tissue sections or fragments. In some embodiments, the cutting device is configured to cut the tissue into tissue sections or fragments that are equal in size. As used herein, equal means substantially equal wherein the sizes of the tissue sections or fragments are within +20% of one another, in at least one dimension. In some embodiments, depending on the firmness of the tissue, the cutting device or components thereof are vibrated or rotated at user-defined or pre-defined frequency. The fragmentation settings of the cutting device such as thickness of tissue fragment, frequency, amplitude, speed etc. are user-defined or pre-defined.

In some embodiments, the tissue sample is cut under conditions of high oxygen concentration, that is an oxygen concentration greater than ambient oxygen concentration (such as greater than 21% or greater than 30% or greater than 50% or greater than 70%, or greater than 90% and the like). In some embodiments, the tissue sample is cut into tissue sections or fragments in an oxygenated cutting medium.

In some embodiments, the tissue sample is prepared before cutting. For example, in some embodiments, the tissue sample is contained within a sacrificial casing and/or gel matrix (e.g., agarose). While the gel matrix, the sacrificial casing, or both help to hold and stabilize the tissue during cutting, it is preferable not to have any trace of either during culture of the tissue fragments since residual gel matrix or residual sacrificial casing can interfere with nutrient availability, drug response and/or downstream analysis of the tissue fragments. In some embodiments, residual gel matrix, residual sacrificial casing or both are removed before the tissue fragments are contacted with the therapeutic agent(s). In some embodiments, the step of cutting comprises driving the sacrificial casing containing the tissue towards the cutting component of the cutting device or driving the cutting component of the cutting device towards the sacrificial casing containing the tissue, wherein the cutting device cuts the tissue into tissue sections or fragments by cutting through the sacrificial casing. In some embodiments, the sacrificial casing is formed of a material that can be cut with a cutting mechanism. Non-limiting examples of materials of the sacrificial casing include polypropylene, wax, silicone (such as Polydimethylsiloxane (PDMS)) and various thermoplastic elastomers. The material should preferably be biocompatible and non-toxic to avoid damaging or altering the tissue properties. In some embodiments, the sacrificial casing comprises a hollow cavity to house the tissue within. In some embodiments, the sacrificial casing comprises a groove to hold the tissue.

Tissue sections or tissue fragments comprising living cells are obtained by cutting a tissue sample obtained from a subject. In some embodiments, the size of each tissue section comprising living cells is equal to or less than 1000 µm (such as 1000 µm, 500 µm, 450 µm, 400 µm, 350 µm, 300 µm, 250 µm, 200 µm, 100 µm or 50 µm) in at least one dimension. In some embodiments, the size of each tissue section is between 50 μm and 1000 μm in least one dimension. In some embodiments, the size of each tissue section is between 100 μm and 500 μm in at least one dimension. In some embodiments, the size of each tissue section is between 150 μm and 350 μm in at least one dimension. In some embodiments, the size of each tissue section is between 50 μm and 1000 μm in at least two dimensions. In some embodiments, the size of each tissue section is between 150 μm and 350 μm in two dimensions. In some embodiments, the size of each tissue section is between 50 μm and 500 μm in all three dimensions. In some embodiments, the size of each tissue section is between 150 μm and 350 μm in all three dimensions. In some embodiments, the size of each tissue section is about 300 μm in any two dimensions and about 100 μm in the third dimension. In some embodiments, the size of each tissue section is about 300 μm in all three dimensions. In some embodiments, the tissue sections are substantially cubical in shape. In some embodiments, the tissue sections are uniform in size. As used herein, uniform means substantially uniform wherein the size of the tissue sections are within +20% of one another, in at least one dimension.

In some embodiments, the tissue sample is from whole biopsies or biopsies that have been cut longitudinally into one or more strips of tissue sections. In some embodiments, the tissue sample includes "tissue coins" cut from a tissue biopsy. In some embodiments, the tissue sample includes "tissue coins" cut from a tissue biopsy having a size of approximately 900 μm×900 μm×600 μm.

In some embodiments, the tissue section comprising living cells is a whole biopsy sample. In some embodiments, the tissue section comprising living cells is a bisected biopsy tissue sample (either longitudinal cuts that can range from 100-700 μm thick or bisected cuts that can range from 100 μm to 1 mm thick or combinations therein). In some embodiments, the tissue section comprising living cells is a living tissue fragment.

In some embodiments, the tissue section comprising living cells has a thickness of approximately 100 μm to 1 mm. In some embodiments, the tissue section comprising living cells has a three-dimensional size of approximately 300 μm×300 μm×300 μm. In some embodiments, the tissue section comprising living cells has a three-dimensional size of approximately 900 μm×900 μm×600 μm.

In some embodiments, the tissue section comprising living cells (e.g., whole biopsy; bisected biopsy tissue sample; living tissue fragment(s)) is maintained in suitable culture conditions within a culture platform. A culture platform is any suitable culture device or system for culturing tissue fragments. Non-limiting examples of a culture platform include a well-plate or a fluidic device. In some embodiments, the culture platform comprises an oxygen-permeable material. Various types of oxygen-permeable materials may be employed. In some embodiments, the oxygen-permeable material comprises a fluoropolymer, non-limiting examples of which include FEP (fluorinated ethylene-propylene), TFE (tetrafluoroethylene), PFA (perfluoroalkoxy), PVF (polyvinylfluoride), PVDF (polyvinylidene fluoride), PTFE (polytetrafluoroethylene), PCTFE (polychlorotrifluoroethylene), ETFE (ethylene tetrafluoroethylene), ECTFE (ethylene-chlorotrifluoroethylene), FFPM/FFKM (perfluoroelastomer), FPM/FKM/Viton® (fluoro elastomer; chlorotrifluoroethylenevinylidene fluoride), PFPE (perfluoropolyether), MFA (TFE (tetrafluoroethylene) and perfluoromethyl vinyl-ether copolymer), CTFE/VDF (chlorotrifluoroethylene-vinylidene fluoride copolymer), and TFE/HFP (tetrafluoroethylene-hexafluoropropylene copolymer), or mixtures thereof. In some embodiments, the oxygen-permeable material comprises cyclic olefin polymer (COP) and cyclic olefin copolymers (COC). In some embodiments, the oxygen-permeable material comprises a silicone material (e.g., polydimethylsiloxane (PDMS)). In some embodiments, the culture platform is formed of extremely thin sections of one or more oxygen-permeable material. In some embodiments, regions of culture platform include chambers of the culture platform. Chambers of the culture platform can be wells of a well-plate or channels of a fluidic device. In some embodiments, the culture platform is configured for perfusion culture. In some embodiments, the culture platform is configured for non-perfused, static culture. In some embodiments, the culture platform is formed of a material that is optically transparent, thereby allowing optical investigation of the tissue fragments while the tissue fragments are within the chambers of the culture platform.

In some embodiments, the tissue sample is prepared before culturing. For example, in some embodiments, the tissue sample is encapsulated in a gel matrix. A gel matrix can comprise a synthetic, a semi-synthetic or a natural component. In some embodiments, a gel matrix comprises at least one synthetic polymer or co-polymer, non-limiting examples of which includes polyethylene glycol (PEG), poly(2-hydroxyethyl methacrylate) (PHEMA), polyvinyl alcohol (PVA), polyacrylic acid (PAA), polylactic acid (PLA), polycaprolactone (PCL), polyethyl methacrylate (PMMA), poly(lactic-co-glycolic) acid (PLGA), poly(3-hydroxybutyric acid-co-β-hydroxyvaleric acid) (PHBV), polyethylene glycol diacrylate (PEGDA), polyethylene glycol-vinyl sulfone and the likes. In some embodiments, the polymers or co-polymers are further functionalized. In some embodiments, the tissue sample is contacted with a gel precursor. A gel precursor is a component that forms the gel matrix under suitable conditions of gelation. The gel precursor can be in any physical form such as in liquid or in solid form. In some embodiments, the gel matrix is formed by a covalent cross-linking of the gel precursors, while in some other embodiments the gel matrix is formed by a physical aggregation of the gel precursors. In some embodiments, depending upon the tissue type the percentages of the gel precursors and/or gelation conditions can be varied to obtain gel matrices of varying mechanical stiffness. In some embodiments, a gel matrix is formed when the gel precursor is irradiated with a light source. In some embodiments a gel matrix is formed when the gel precursor is subjected to a temperature change. While a skilled artisan can envisage multiple types of suitable gel matrices and gelation conditions, preferably the process of gelation to form the gel matrix should be fast and under conditions that cause minimal damage to the tissue or tissue sections or fragments and that are inert to biological molecules. Further, the process of gelation and/or the gel matrix should not significantly alter the biological behavior of the cells in the tissue fragment. In some embodiments, gelation to form the gel matrix happens in less than 5 min (such as 4 min, 3 min, 2 min, 1 min or 30 second).

In some embodiments, the gel precursor is a PEG polymer such as a linear or a branched PEG polymer. A particularly suitable functionalized polymer can be, for example, a multi-arm, branched PEG polymer, such as a four-arm or an eight-arm PEG with terminal hydroxyl (—OH) groups that is functionalized with norbornene. In some embodiments, gelation to form the gel matrix happens in the presence of a suitable cross-linker such as a di-thiolated molecule (e.g., bi-functional PEG-dithiol). In some embodiments gel formation happens when the norbornene-functionalized multi-arm PEG polymer and bi-functional PEG-dithiol are irradiated with a light source.

In certain embodiments, methods are provided for obtaining a tissue sample comprising living cells; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point, wherein the second stimulus is a pharmaceutical agent; measuring cellular activity in the tissue sample during and/or after exposure to the second stimulus; determining changes in cellular activity within the tissue sample based on 1) the cellular activity measurements before the second time point, and during and/or after the first time point, and 2) the cellular activity measurement during and/or after the second time point; identifying the pharmaceutical agent as having an acceptable therapeutic effect or an unacceptable therapeutic effect based on comparing the determined changes in cellular activity with established norms indicative of an acceptable therapeutic effect and an unacceptable therapeutic effect.

In certain embodiments, methods are provided comprising obtaining a tissue sample comprising living tumor cells from subject having cancer; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point, wherein the second stimulus is a pharmaceutical agent; measuring cellular activity in the tissue sample during and/or after exposure to the second stimulus; determining changes in cellular activity within the tissue sample based on 1) the cellular activity measurements before the second time point, and during and/or after the first time point, and 2) the cellular activity measurements during and/or after the second time point; identifying the pharmaceutical agent as being an acceptable therapeutic treatment for the subject or an unacceptable therapeutic treatment for the subject based on comparing the determined changes in cellular activity with established norms indicative of an acceptable therapeutic effect and an unacceptable therapeutic effect.

In certain embodiments, methods are provided comprising obtaining a tissue sample comprising living immune cells, wherein the living immune cells are selected from one or more of macrophages, B lymphocytes, T lymphocytes, mast cells, monocytes, dendritic cells, eosinophils, natural killer cells, basophils, and neutrophils; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point; measuring cellular activity in the tissue sample during and/or after exposure to the second stimulus; determining changes in cellular activity within the tissue sample based on 1) the cellular activity measurements before the second time point, and during and/or after the first time point, and 2) the cellular activity measurements during and/or after the second time point; wherein the cellular activity is immune cell activity selected from one or more of macrophage activity, B lymphocyte activity, T lymphocyte activity, mast cell activity, monocyte activity, dendritic cell activity, eosinophil activity, natural killer cell activity, basophil activity, and neutrophil activity.

In certain embodiments, methods are provided comprising obtaining a tissue sample comprising living cells; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point, wherein the second stimulus is a pharmaceutical agent at a specific dosage; measuring cellular activity in the tissue sample during and/or after exposure to the second stimulus; under culture conditions, exposing the tissue sample to a third stimulus at a third time point after the second time point, wherein the third stimulus is the same pharmaceutical agent as used in the second stimulus but at a different dosage (e.g., higher or lower); measuring cellular activity in the tissue sample during and/or after exposure to the third stimulus; determining changes in cellular activity within the tissue sample based on 1) the cellular activity measurements before the second time point, and during and/or after the first time point, 2) the cellular activity measurements before the third time point, and during and/or after the second time point; and 3) the cellular activity measurements during and/or after the third time point. Such methods permit the detecting of cellular activity changes with varying dosage levels for a specific pharmaceutical agent.

In certain embodiments, methods are provided comprising obtaining a tissue sample comprising living cells; under culture conditions, exposing the tissue sample to a first stimulus at a first time point, wherein the first stimulus is a control stimulus; measuring cellular activity in the tissue sample during and/or after exposure to the first stimulus; under culture conditions, exposing the tissue sample to a second stimulus at a second time point after the first time point, wherein the second stimulus is a pharmaceutical agent; measuring cellular activity in the tissue sample during and/or after exposure to the second stimulus; under culture conditions, exposing the tissue sample to a third stimulus at a third time point after the second time point, wherein the third stimulus is a pharmaceutical agent different than the second stimulus; measuring cellular activity in the tissue sample during and/or after exposure to the third stimulus; determining changes in cellular activity within the tissue sample based on 1) the cellular activity measurements before the second time point, and during and/or after the first time point, 2) the cellular activity measurements before the third time point, and during and/or after the second time point; and 3) the cellular activity measurements during and/or after the third time point. In some embodiments, additional stimuli are exposed to the tissue sample wherein each additional stimulus is a different pharmaceutical agent. Such methods permit the detecting of cellular activity changes with varying pharmaceutical agents.

In some aspects, the systems and methods described herein are performed at least in part using machine learning. In some embodiments a machine learning classifier is used to measure changes in cellular activity within a tissue sample comprising living cells as described herein. In some embodiments, a machine learning classifier is used to determine changes in cellular activity (e.g., as a result of contacting the tissue section with a control stimulus followed by a non-control second stimulus (or additional stimulus) (e.g., potential therapeutic agent)). Non-limiting examples of machine learning classifiers include, a gradient boosting classifier, a random forest classifier, or a deep learning classifier, including a convolutional neural network (CNN).

EXAMPLES

The following examples are intended only to illustrate methods and embodiments in accordance with the invention, and as such should not be construed as imposing limitations upon the claims.

Example 1

This example describes changes in cytokine levels over time in response to a treatment for tumor samples.

For FIG. 1, tumor samples from Core Needle Biopsies (CNB) were coined at the dimensions of 900 μm×900 μm×600 μm. A set of two coins per well was encapsulated with VitroGel-3 (The Well® Biosciences) and treated with anti-PD-1 antibody diluted in 150 μL RPMI-1640 (supplemented with human serum, hereafter referred to as "complete media") for 3 days. Thirty microliters of the supernatant were removed from each sample well and assayed for cytokines using a 30-plex Luminex Human Cytokine panel.

Figure 1B:
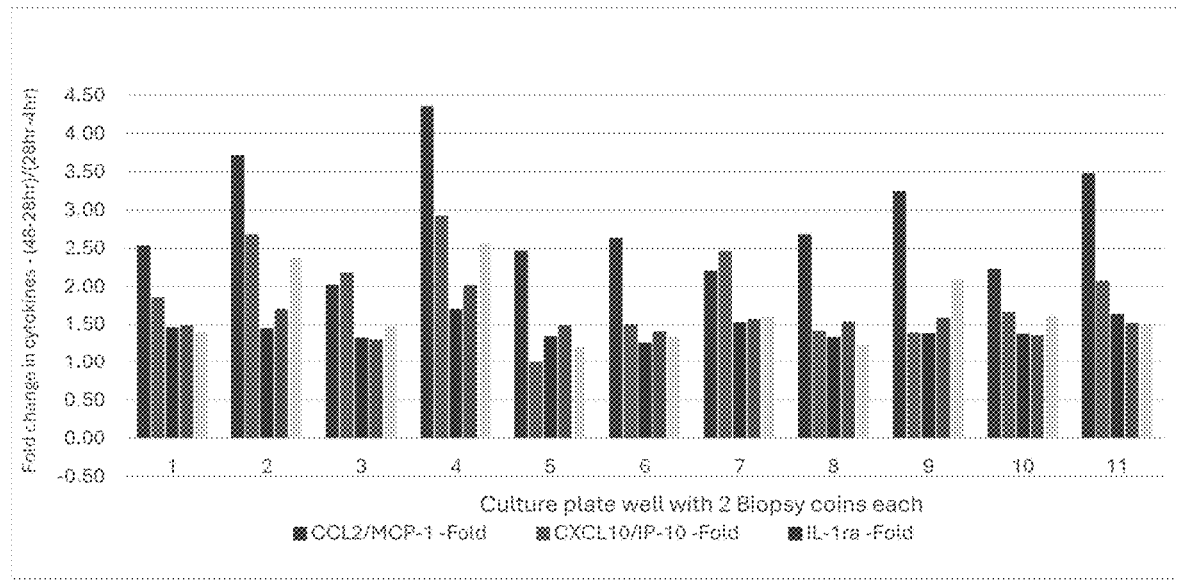

Experiments were conducted evaluating changes in cytokine levels over time in response to anti-PD-1 in coin replicates from a human melanoma sample (SPC1791 is an identifier). Change in cytokine levels between early time points (4 and 28 hours) and later time points (28 and 48 hours) was either computed as fold change in slope between 28 hours and 48 hours (late) versus 4 hours and 28 hours (early) (FIG. 1A) or as fold change in the difference in cytokine concentrations between the late (amount at 48 hours minus amount at 28 hours) and early timepoints (amount at 28 hours minus amount at 4 hours) (FIG. 1B). The graphs show certain cytokines, such as Chemokine (C-C motif) Ligand 2 (CCL2) and CXCL10, changed more significantly than other cytokines. The horizontal line represents no change in slope (value of 1.0).

Example 2

This example describes "Treatment-Switch" experiments whereby tumor fragments were exposed to a first stimulus (e.g., control) followed at a later time with exposure to a second stimulus (e.g., treatment), and measuring cellular activity (e.g., cytokine activity) after exposure to the first and second stimuli.

A pool of randomized fragments of 300 μm×300 μm×300 μm in size from a human tumor resection was sorted into approximately 200 fragments per well and encapsulated with VitroGel-3. The pool of approximately 200 fragments mitigates the heterogeneity of the tissue and allows for comparison across treatment groups. Tumor fragments were treated in triplicates with either IgG isotype control (negative control group) or anti-CD3/anti-CD28 ImmunoCult™ T cell activator cocktail (positive control group) diluted in RPMI-1640 complete media for up to 28 hours. An experimental group (Treatment-Switch) was set up whereby the tumor fragments first received the IgG isotype control for 20 hours before collecting supernatant and adding the anti-CD3/anti-CD28 antibody mixture into the wells for an additional 8 hours. Ten percent by volume of the supernatant was sampled from each sample well at different time points and assayed for cytokine amounts using a 30-plex Luminex Human Cytokine panel.

Figure 2:
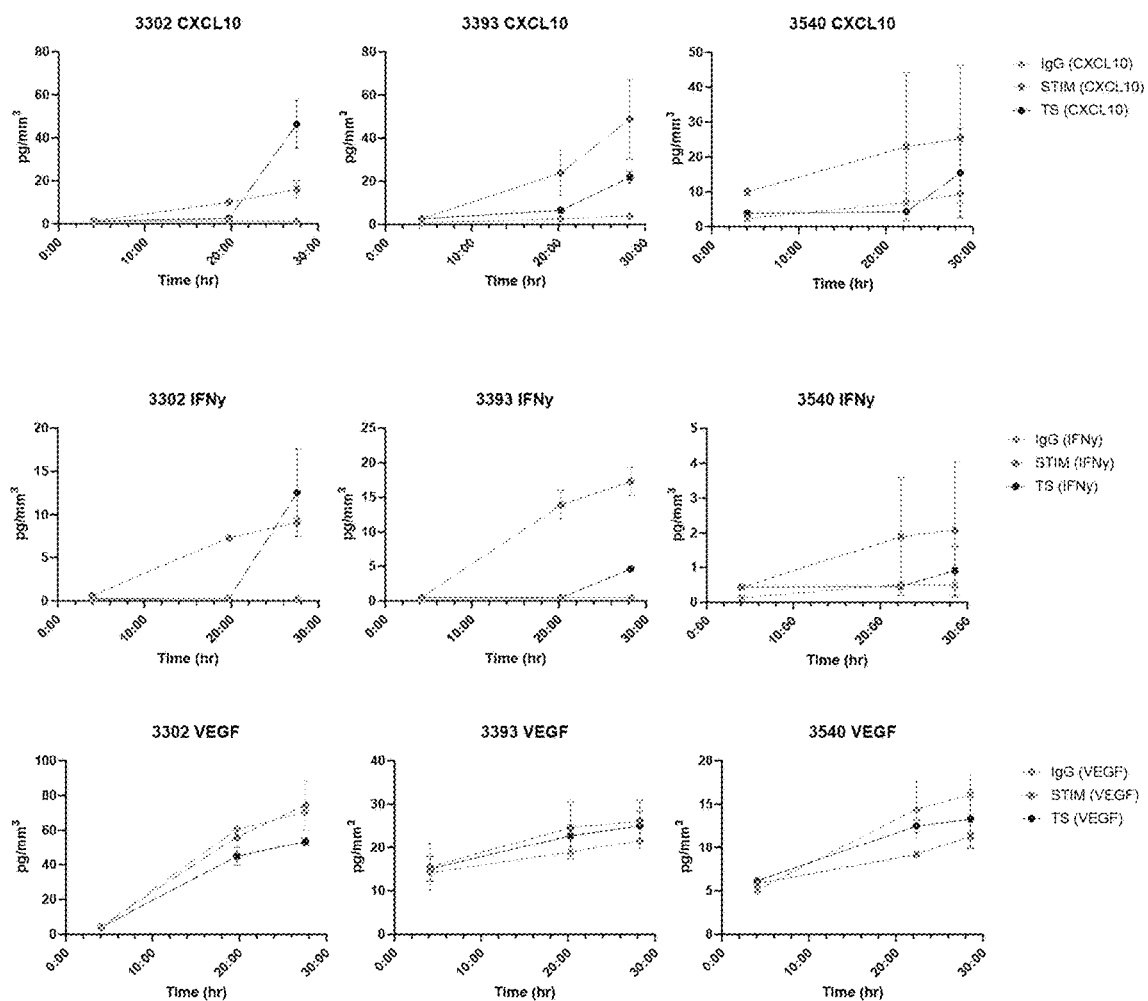
FIG. 2 reports changes in levels of three cytokines, C-X-C motif chemokine Ligand (CXCL10), Interferon-gamma (IFNγ), and Vascular Endothelial Growth Factor (VEGF), over time in response to each treatment regimen in 3 human tumor resection samples (3302, 3393, 3540 are identifiers). The IgG (Immunoglobulin type G) regimen involves exposing the tissue to IgG isotype control antibody for 28 hours. The STIM (Stimulated) regimen involves exposing the tissue to anti-CD3/anti-CD28 antibody cocktail for 28 hours. The TS (Treatment-Switch) regimen received IgG control antibody for 20-22 hours, followed by anti-CD3/anti-CD28 antibody cocktail for an additional 6-8 hours.

FIG. 2 shows changes in cytokine levels (CXCL10, IFNγ, and vascular endothelial growth factor (VEGF) over time in response to each treatment regimen in 3 human tumor resection samples (3302, 3393, 3540 are identifiers). Cytokine concentrations were normalized to tissue volume and adjusted for the total media volume. Each data point and error bar represent the mean of values from 3 replicates and the standard deviation, respectively. IgG=isotype control. STIM=anti-CD3/anti-CD28 T cell activator. TS=Treatment-Switch from IgG to anti-CD3/anti-CD28 T cell activator at approximately 20 hours after initial treatment with IgG. CXCL10 and Interferon-gamma show an increase in slope and therefore a change in cytokine level in response to the anti-CD3/anti-CD28 antibody cocktail at ~20 hours whereas VEGF does not show an increase in slope and therefore not respond to the stimulus. Change in slope between baseline and treatment is indicative of change in cytokine.

Figure 3:
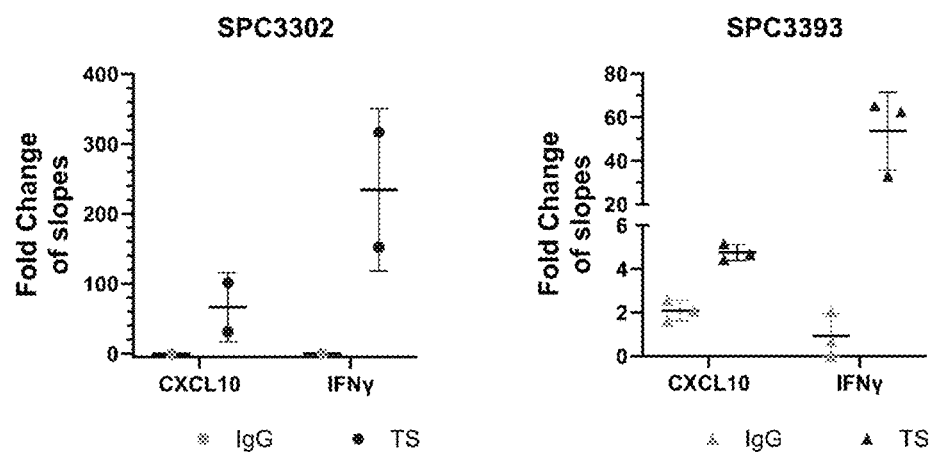
FIG. 3 reports fold changes in the rate of cytokine secretion (slope) between early (4-28 hours) and late (28-48 hours) time points for two T cell-response cytokines, CXCL10 and IFNγ, in two human tumor resection samples (3302 and 3393 are identifiers).

FIG. 3 shows fold changes in slope of two T-cell-response cytokines, CXCL10 and IFNγ, in two human tumor resection samples (3302 and 3393 are identifiers). The fold change was calculated by dividing the slope of cytokine amount during the 20-28-hour period by the slope during the 4-20-hour period. In the IgG-treated group, the treatment was added immediately after plating and remained in the wells with tumor fragments throughout the duration of the experiment. In the Treatment-Switch group, IgG was added after plating, but the treatment was switched to anti-CD3/anti-CD28 antibody cocktail at 20-hour timepoint. Each data point represents the fold change from a single culture well or replicate. Lines and error bars represent the means of values and the standard deviation.

Figure 4:
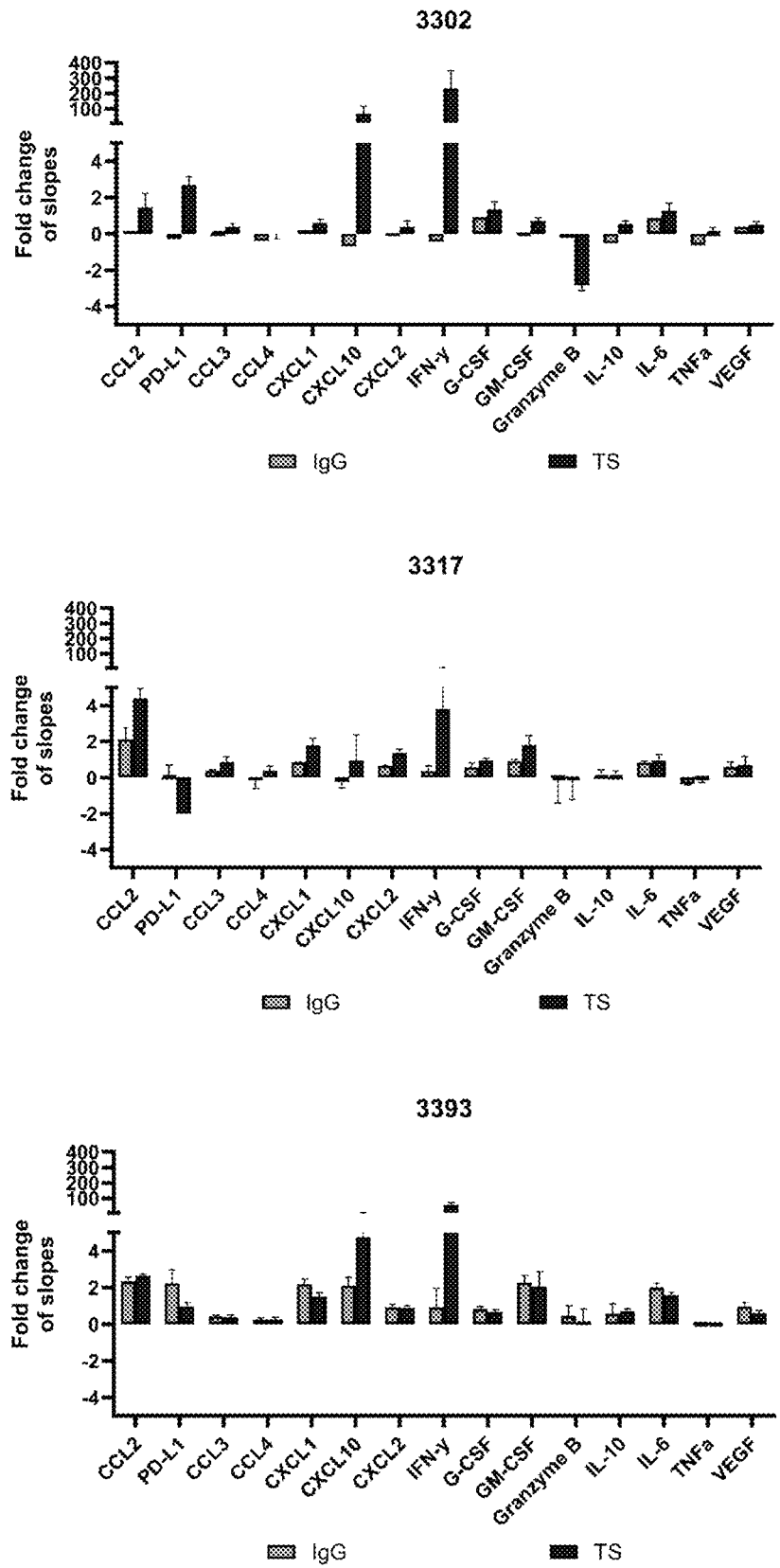
FIG. 4 reports fold changes in slope profile of 15 immune-related cytokines of IgG-treated and Treatment-Switch (TS) groups from each human tumor sample.

FIG. 4 shows changes in slope profile of 15 immune-related cytokines of IgG-treated and Treatment-Switch (TS) groups. Each data point represents the average fold change in slope of each cytokine, as described in FIG. 3, from each sample. The error bar shows the standard deviation of these averages from 3 different human tumor resection samples.

FIGS. 3 and 4 demonstrate that T-cell responses can be detected in the treatment-switch group and are distinguishable from the IgG-treated group.

Figure 5:
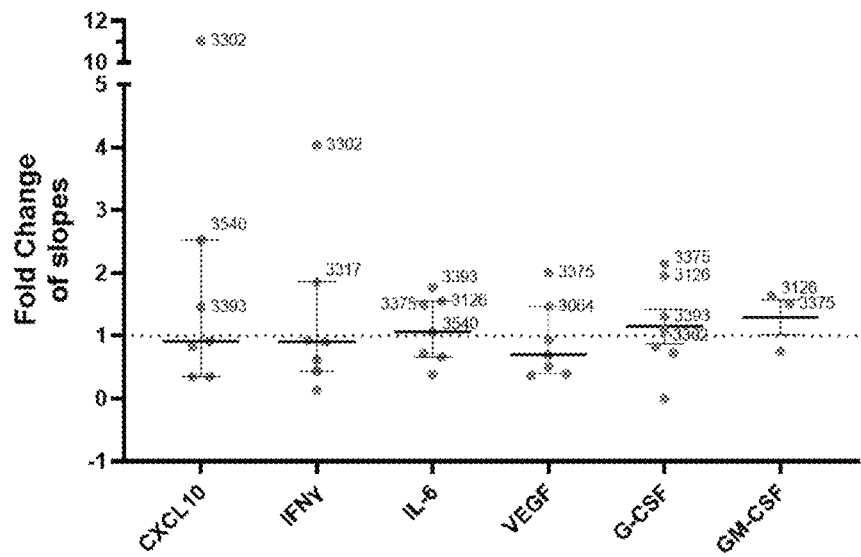
FIG. 5 reports fold changes of slopes for 9 immune-related cytokines in the Treatment-Switch group after treatment switching (during 20-28-hour period) over the slopes of the same cytokines in the positive control group when fragments were initially exposed to anti-CD3/anti-CD28 antibody cocktail (during 0-20-hour period).

FIG. 5 shows fold changes of slopes of six immune-related cytokines in the Treatment-Switch group after treatment switching (during 20-28-hour period) over the slopes of the same cytokines in the positive control group when fragments were initially exposed to anti-CD3/anti-CD28 antibody cocktail (during 0-20-hour period). Individual data points are labeled with sample identifiers. The plot depicts the median and interquartile range of values of each cytokine from 7 different human tumor resection samples.

FIG. 5 demonstrates that the T-cell response observed in the Treatment-Switch group after treatment switching was comparable to that observed in the positive-control group during initial exposure.

Figure 6:
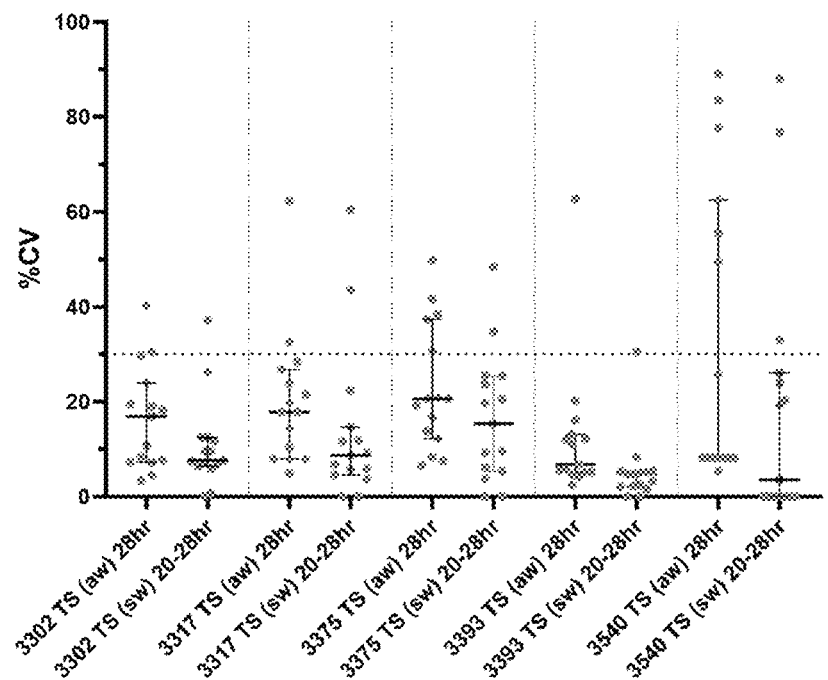
FIG. 6 shows variability of fold changes in concentrations of 15 immune-related cytokines calculated in two different ways. Each dot represents % CV (Coefficient of Variation) for an individual cytokine. The across-well (aw) approach calculated the % CV of the fold change in concentration of a cytokine in the Treatment-Switch wells at 28 hours (after the treatment switch) compared to the averaged cytokine concentration in the IgG-only wells at 28 hours. Same-well (sw) approach calculated the % CV of the fold change in cytokine concentration in the Treatment-Switch well at the timepoint after the switch (at 28 hours) over the concentration at the timepoint before the switch (at 20 hours) within the same wells. The variability decreases when comparing fold changes in the same well versus across wells. The small reduction in % CV is possibly due to the low variability in tissue constitution from randomization process.

FIG. 6 shows variability of fold changes in concentrations of 15 immune-related cytokines calculated in two different ways. Each dot represents % CV (Coefficient of Variation) of each cytokine. The across-well (aw) comparison calculated the % CV by first calculating the standard deviation of fold changes in the concentration of a cytokine in the Treatment-Switch wells at 28 hours over the averaged cytokine concentration in the IgG-only wells at 28 hours. The standard deviation was then divided by the average of the fold changes in cytokine concentration of the Treatment-Switch wells over the IgG-only wells. The ratio was then converted into a percentage point. The number of replicates in each group of each specimen (with identifiers in parentheses) is listed as followed: (3302) 1 well of IgG-only and 2 wells of TS; (3317) 2 wells of IgG-only and 3 wells of TS; (3375) 3 wells of IgG-only and 3 wells of TS; (3393) 3 wells of IgG-only and 3 wells of TS; (3540) 2 wells of IgG-only and 2 wells of TS.

Same-well (sw) comparison calculated the % CV by first calculating the fold changes of cytokine concentration in the Treatment-Switch well at the timepoint after the switch (at 28 hours) over the concentration at the timepoint before the switch (at 20 hours) within the same wells. Next, the standard deviation of the fold changes was divided by the average of the fold changes, and the ratio was converted into a percentage point.

FIG. 6 shows the reduced variability observed when comparing fold changes in the same well versus across wells. The reduction in % CV is small, possibly due to the low variability in tissue constitution from randomization during the plating process. Lower variability is observed when comparing within well (within tissue sample) as opposed to across wells (between tissue sample).

Example 3

This example describes an additional "treatment-switch" experiment.

Figure 7:
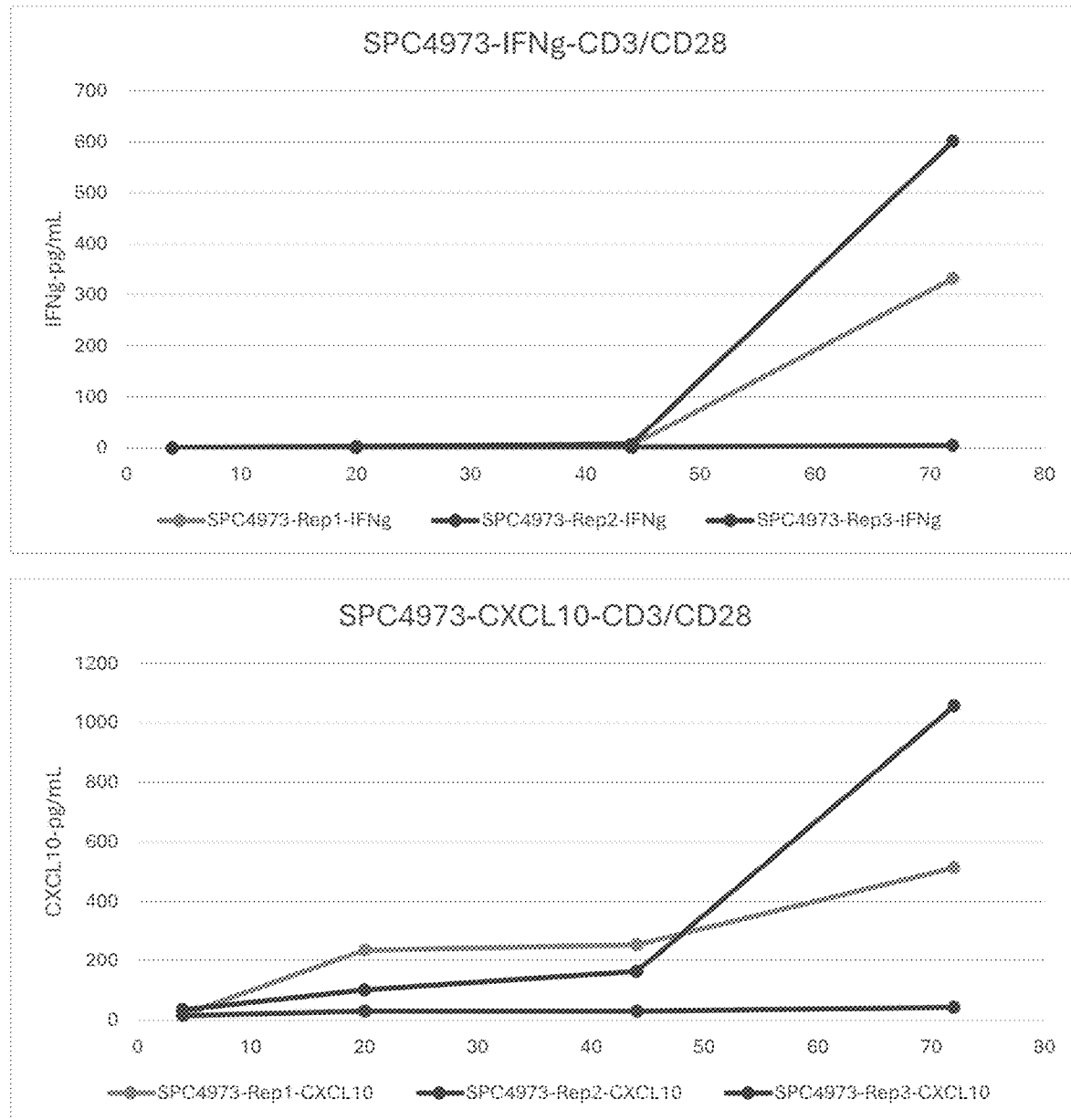
FIG. 7 shows "treatment-switch" experiments. Breast tissue samples (SPC4973) comprising living cells were obtained by needle-biopsy. Three replicate wells, each containing three slices from a 14-gauge core needle biopsy, were treated with IgG at hour 0. Conditioned media were collected at 4 hours and 20 hours. Fresh media containing IgG antibody of the same amount as collected conditioned media was replenished in each well. At 44 hours, conditioned media was collected from all wells and tissue was then treated with anti-CD3/anti-CD28 antibody cocktail (positive control). Two of the three reps showed induction of IFNγ and CXCL10 when stimulated with anti-CD3/anti-CD28 antibody cocktail at 44 hours. Interleukin-1 receptor antagonist (IL-1ra) is not expected to change specifically with anti-CD3/anti-CD28 stimulation. The IL-1ra concentrations increased in all 3 replicates, suggesting that the tissues were viable throughout the course of the experiment.
Figure 7:
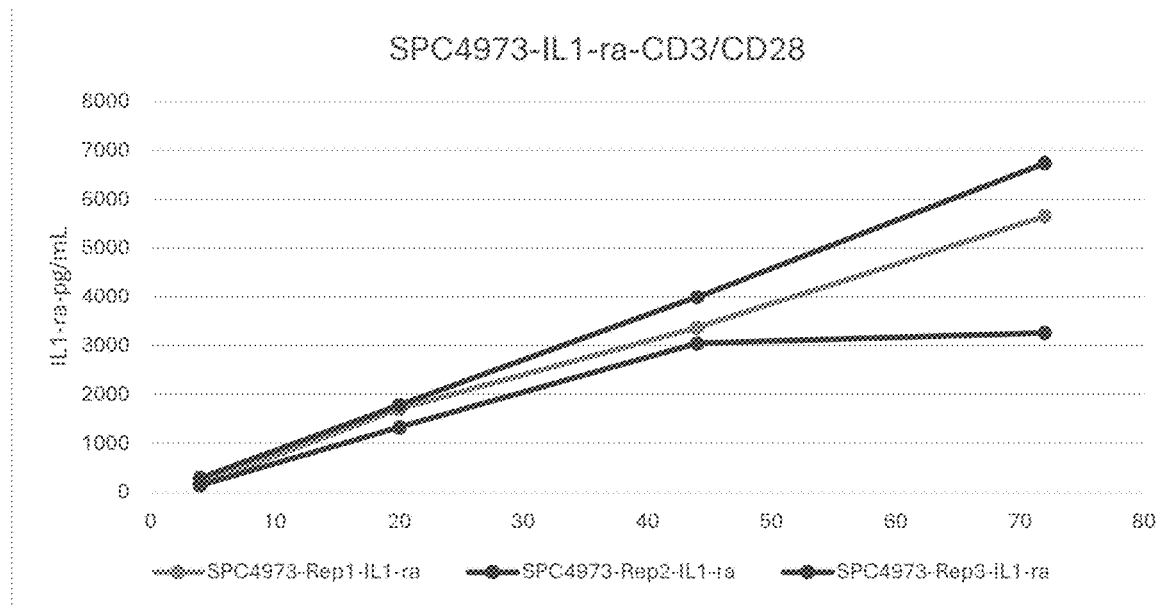

FIG. 7 shows breast tumor samples (SPC4973 is an identifier) comprising living cells that were obtained by needle-biopsy. Three replicate wells, each containing three oblong slices cut from a 14-gauge core needle biopsy, were treated with IgG at hour 0. Conditioned media were collected at 4 hours and 20 hours. Fresh media containing IgG antibody of the same amount as collected conditioned media was replenished in each well. At 44 hours, conditioned media was collected from all wells and tissue was treated with anti-CD3/anti-CD28 antibody cocktail (positive control). Two of the three reps showed induction of IFNγ and CXCL10 when stimulated with anti-CD3/anti-CD28 antibody cocktail at 44 hours. Interleukin-1 receptor antagonist (IL-1ra) is a cytokine secreted by various types of cells in response to inflammatory stimuli and inherent IgG. It has been observed to increase over time in viable tissues and can serve as an internal control in these experiments. IL-1ra is not expected to change specifically with anti-CD3/anti-CD28 stimulation. The IL-1ra concentrations increased consistently in all 3 replicates, suggesting that the tissues were viable throughout the course of the experiment.

FIG. 7 reports result from an experiment where a positive control for T cell activation, anti-CD3/anti-CD28, was used following treatment with IgG. The three replicates from the core needle biopsy are heterogeneous and therefore do not all contain T cells capable of being stimulated. In this example two of the three replicates contain T cells capable of stimulation, as inferred from induction of IFNγ.

Example 4

This example describes an additional "treatment-switch" experiment.

Figure 8:
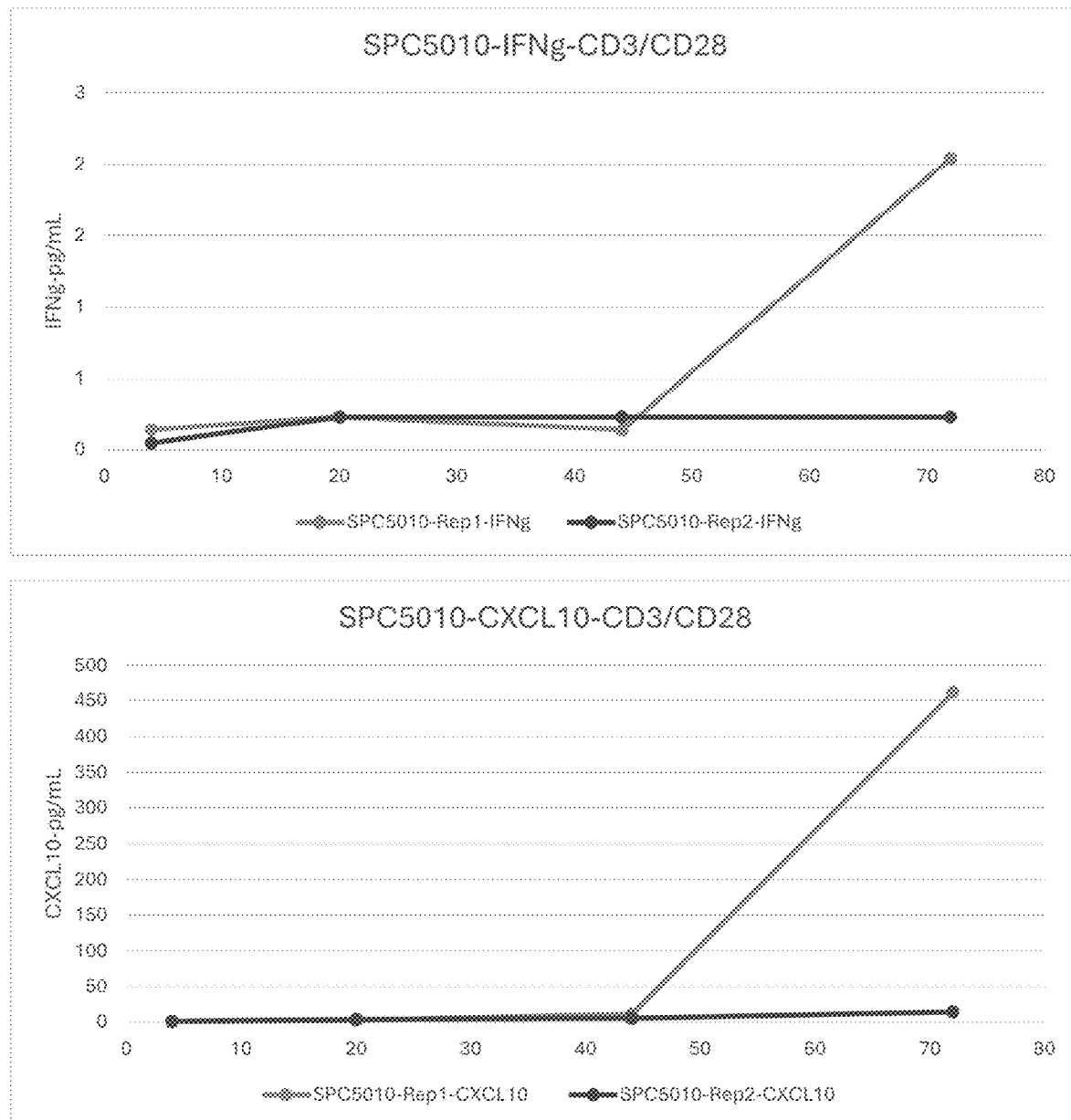
FIG. 8 shows "treatment-switch" experiments. Ovary tissue samples (SPC5010) comprising living cells were obtained by tissue resection. Two 18-gauge biopsies were taken from the same tumor resection, cut into 24 oblong slices and plated twelve slices into each of the two wells. Tissue slices were treated with IgG at hour 0. Conditioned media were collected at 4 hours and 20 hours. Fresh media containing IgG antibody of the same amount as collected conditioned media was replenished in each well. At 44 hours, conditioned media was collected from all wells and tissue was then treated with anti-CD3/anti-CD28 antibody cocktail (positive control). One of the two replicates shows induction of IFNγ and CXCL10 when stimulated with anti-CD3/anti-CD28 antibody cocktail at 44 hours. Interleukin-1 receptor agonist (IL-1Ra) was expressed in all replicates, suggesting that the tissues were viable throughout the course of the experiment.
Figure 8:
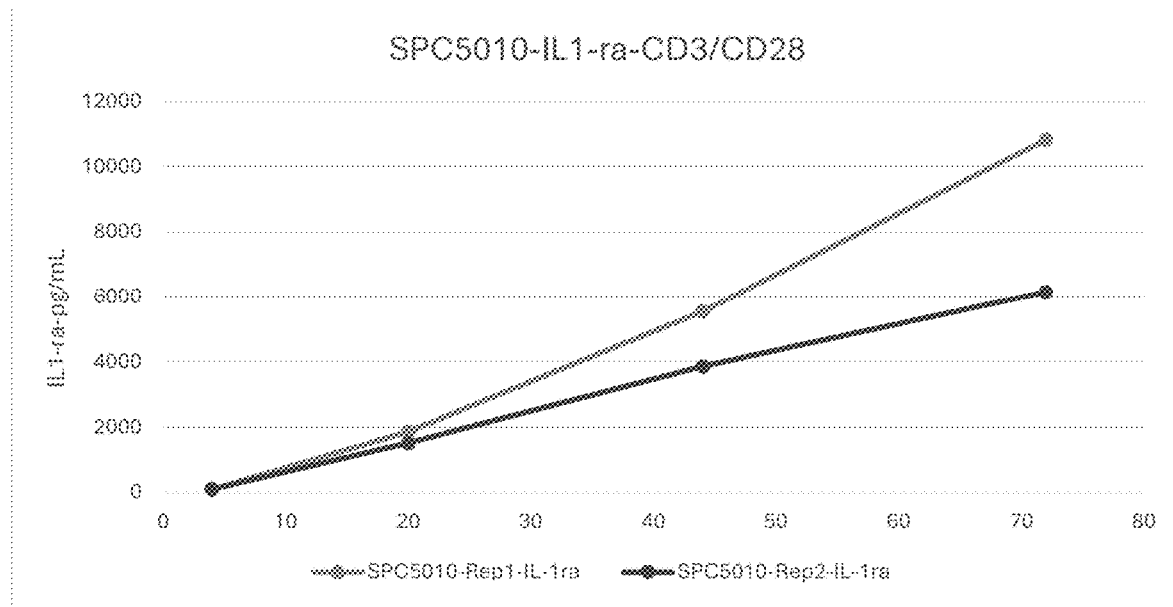

For FIG. 8, an ovarian tumor sample (SPC5010 is an identifier) comprising living cells was obtained by tumor resection. Two 18-gauge biopsies were taken from the same tumor resection, cut into 24 oblong slices and plated twelve slices into each of the two wells. Tissue slices were treated with IgG at hour 0. Conditioned media were collected at 4 hours and 20 hours. Fresh media containing IgG antibody of the same amount as collected conditioned media was replenished in each well. At 44 hours, conditioned media was collected from all wells and tissue was then treated with anti-CD3/anti-CD28 antibody cocktail (positive control). One of the two replicates shows induction of IFNγ and CXCL10 when stimulated with anti-CD3/anti-CD28 antibody cocktail at 44 hours. IL-1ra was expressed in all replicates, suggesting that the tissues were viable throughout the course of the experiment.

FIG. 8 reports result from an experiment where a positive control for T cell activation, anti-CD3/anti-CD28, was used following treatment with IgG. The two replicates from the core needle biopsy are heterogeneous and therefore do not all contain T cells capable of being stimulated. In this example one of the two replicates contain T cells capable of stimulation, as inferred from induction of IFNγ and CXCL10.

Example 5

This example describes additional treatment switch experiments. This is an example of the treatment switch concept where a first stimulus (e.g., treatment 1) is followed by a second stimulus (e.g., treatment 2) and then a third stimulus (e.g., treatment 3). In this example, treatment 1 is IgG, treatment 2 is an anti-PD-1 antibody, and treatment 3 is anti-CD3/anti-CD28 antibody cocktail (a positive control for T cell activation).

The tissue sample was cut into fragments of 300 μm×300 μm×300 μm in size and approximately 200 fragments were plated into each well. Live tumor fragments were encapsulated by a hydrogel, treated with different stimuli, and the supernatant was collected at 4-hour, 20-hour, 44-hour, and 72-hour time points. One group was treated with IgG at hour 0, and then at 44 hours treated with anti-CD3/anti-CD28 antibody cocktail (positive control) (shown in green). One group was first treated with IgG at hour 0, then treated with anti-PD1 antibody at hour 20, then treated with anti-CD3/anti-CD28 antibody cocktail (positive control) at the 44-hour timepoint (shown in purple). One group was treated with anti-CD3/anti-CD28 antibody cocktail beginning at the 0-hour time point (shown in red).

Figure 9A:
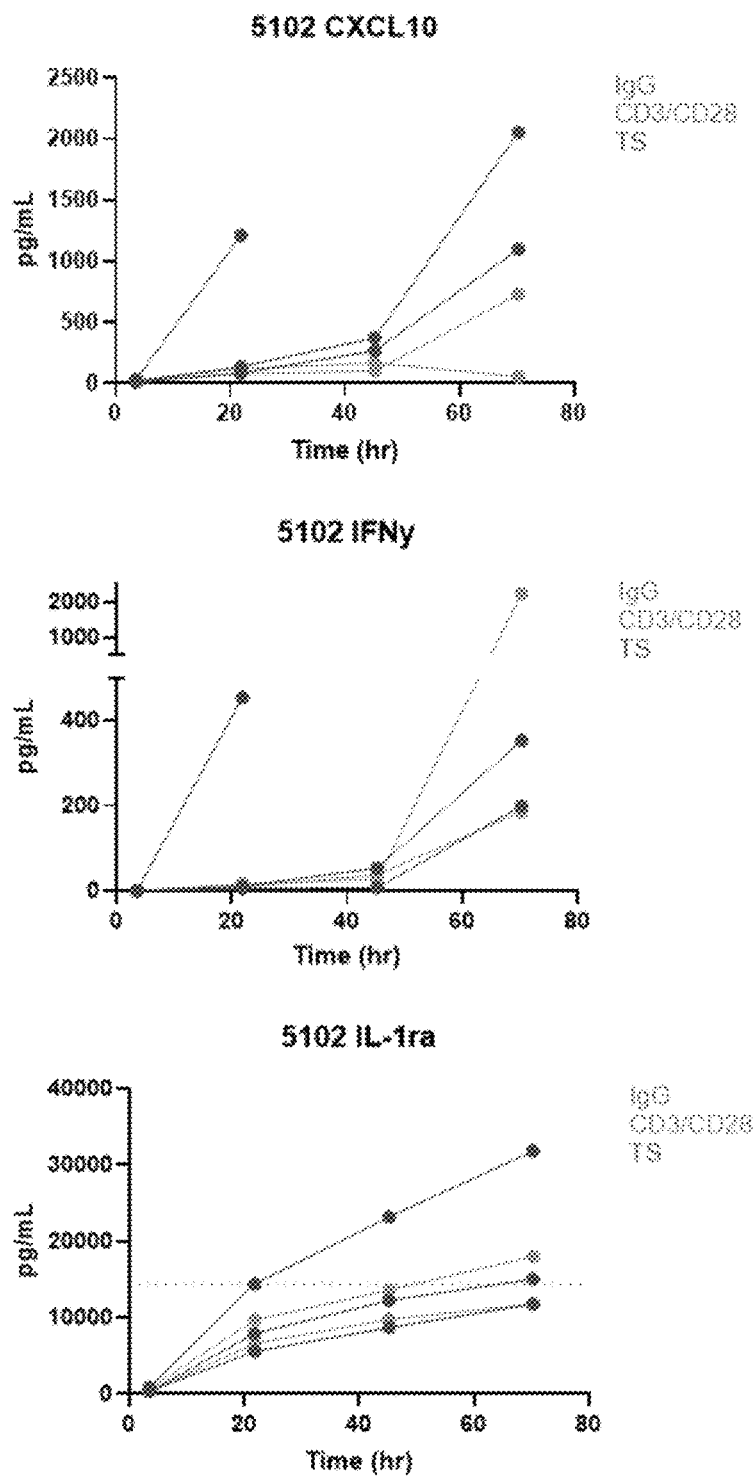
FIG. 9A-C reports treatment-switch experiments. For FIG. 9A, a cervical tumor comprising living cells was obtained by tissue resection (5102 is an identifier). The tissue sample was cut into fragments of 300 μm×300 μm×300 μm in size and approximately 200 fragments were plated into each well. Live tumor fragments were encapsulated by a hydrogel, treated with different stimuli, and the supernatant was collected at 4-hour, 20-hour, 44-hour, and 72-hour time points. One group was treated with IgG at hour 0, and then at 44 hours treated with anti-CD3/anti-CD28 antibody cocktail (positive control). One group was first treated with IgG at hour 0, then treated with anti-PD1 antibody at hour 20, then treated with anti-CD3/anti-CD28 antibody cocktail (positive control) at the 44-hour timepoint. One group was treated with anti-CD3/anti-CD28 antibody cocktail beginning at the 0-hour time point. The group treated with anti-PD1 antibody shows a small response over IgG control at an earlier time. Both IgG and Treatment-Switch (TS) groups show significant induction of IFNγ and CXCL10 when stimulated with anti-CD3/anti-CD28 antibody cocktail at 44 hours. IL-1ra was expressed in all replicates. For FIG. 9B, a triple-negative breast tumor comprising living cells was obtained by tissue resection (5100 is an identifier). T cell response to anti-PD-1 was not observed as there was no increase in the rate of IFNγ and CXCL10 production in the second time period (anti-PD-1 phase) compared to the first time period (IgG phase). For FIG. 9C, a kidney tumor comprising living cells was obtained by tissue resection (5131 is an identifier). T cell response to anti-PD-1 was not observed as there was no increase in the rate of IFNγ and CXCL10 production in the second time period (anti-PD-1 phase) compared to the first time period (IgG phase).

For FIG. 9A, a cervical tumor comprising living cells was obtained by tissue resection (5102 is an identifier). The group treated with anti-PD1 antibody shows a small response over IgG control at an earlier time. Both IgG and Treatment-Switch (TS) groups show significant induction of IFNγ and CXCL10 when stimulated with anti-CD3/anti-CD28 antibody cocktail at 44 hours. IL-1ra was expressed in all replicates. The orange dash line indicates the upper limit of quantification of the assay for IL-1ra. The black dash line indicates the lower limit of quantification of the assay for each of the cytokines shown.

The T cell response to anti-PD-1 treatment (as demonstrated by the increases in production of IFNγ and CXCL10) in the second time period (anti-PD-1 phase) compared to the first time period (IgG phase), is further confirmed by increase in the rate of IFNγ and CXCL10 production upon stimulation with anti-CD3/anti-CD28 antibody cocktail during the third time period.

Figure 9B:
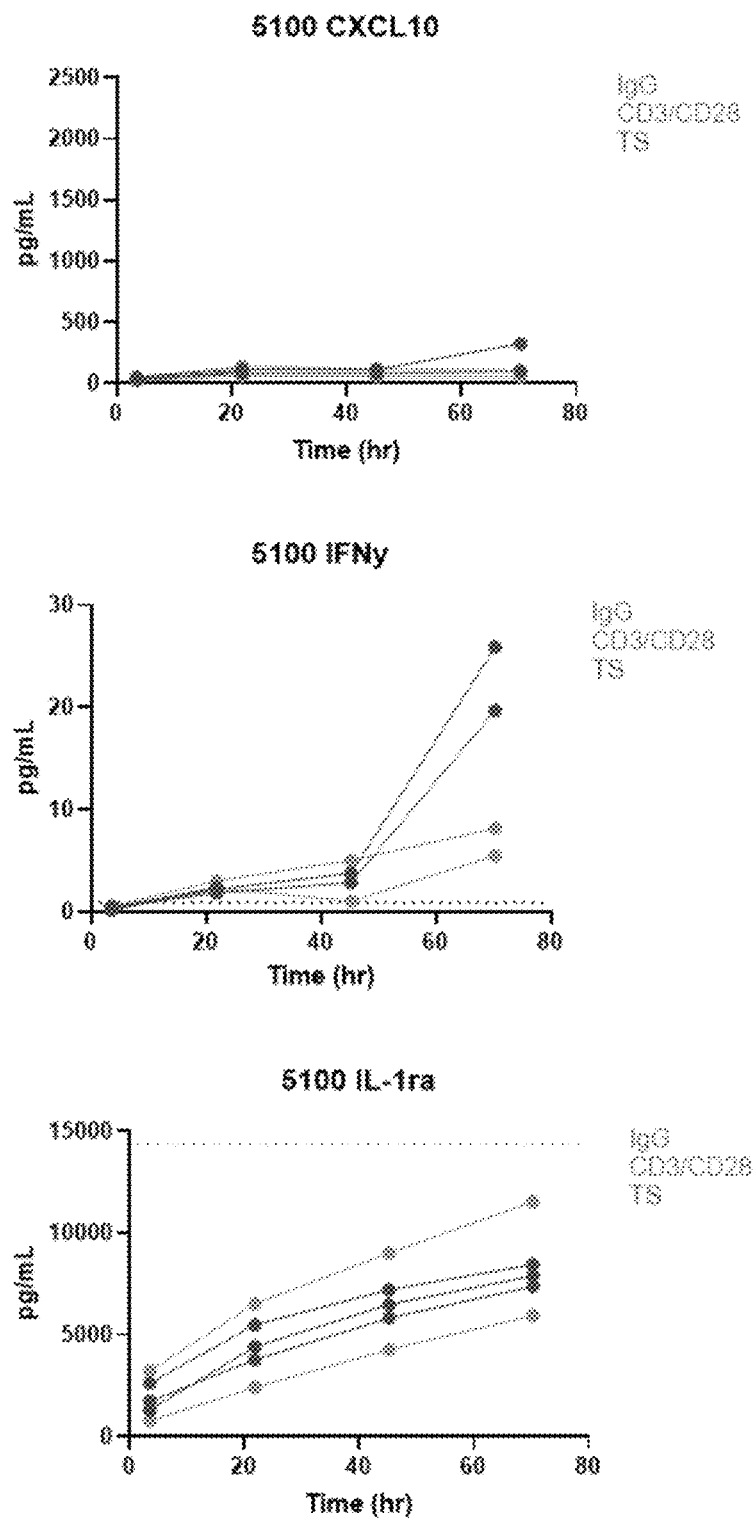

For FIG. 9B a triple negative breast tumor comprising living cells was obtained by tissue resection (5100 is an identifier). T cell response to anti-PD-1 treatment was not observed as there was no increase in the rate of IFNγ and CXCL10 production in the second time period (anti-PD-1 phase) compared to the first time period (IgG phase). This could be due to the T cells not responding to anti-PD-1 but remaining responsive to stimulation with anti-CD3/anti-CD28 antibody cocktail as observed by increase in production rate of IFNγ.

Figure 9C:
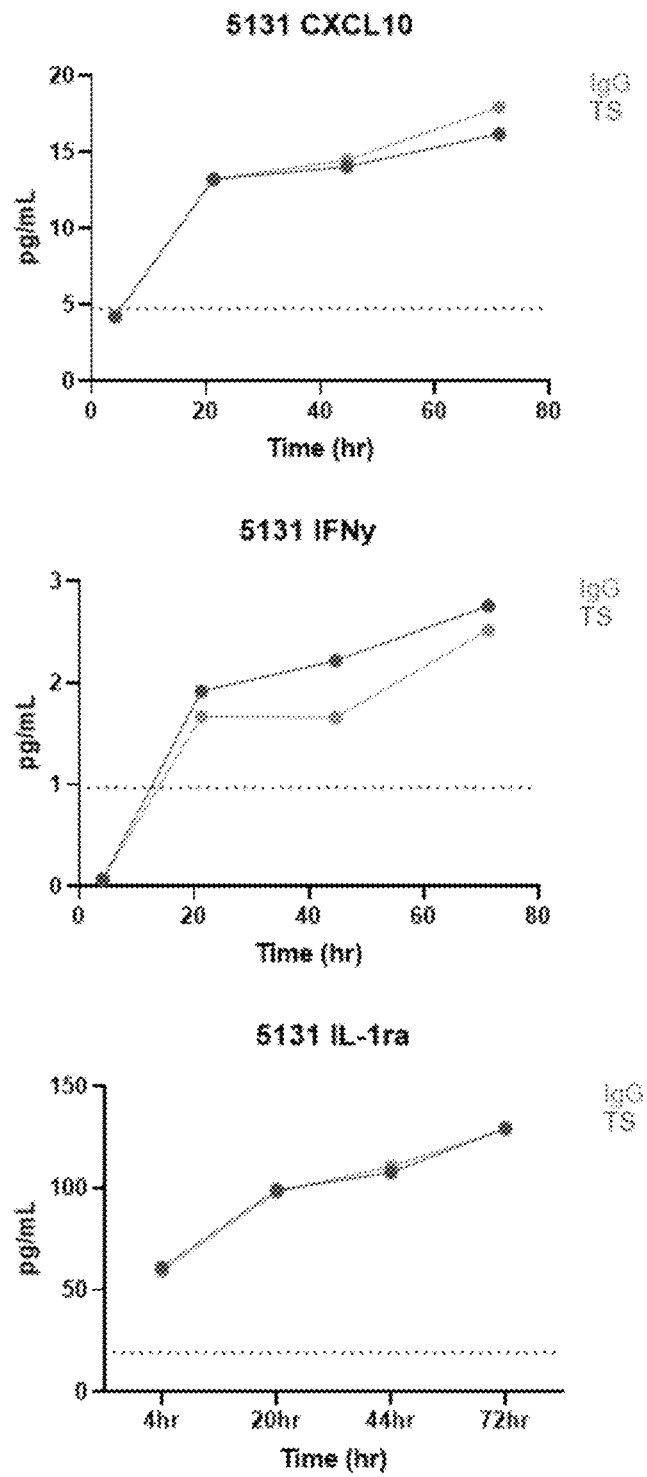

For FIG. 9C, a kidney tumor comprising living cells was obtained by tissue resection (5131 is an identifier). T cell response to anti-PD-1 treatment was not observed as there was no increase in the rate of IFNγ and CXCL10 production in the second time period (anti-PD-1 phase) compared to the first time period (IgG phase). This could be due to the absence of T cells that are responsive to stimulation with anti-CD3/anti-CD28 antibody cocktail during the third time period as observed by the lack of increase in the production rate of IFNγ.

EQUIVALENTS

The invention may be embodied in other specific forms without departing from the spirit or essential characteristics thereof. The foregoing embodiments are therefore to be considered in all respects illustrative rather than limiting the invention described herein. Scope of the invention is thus indicated by the appended claims rather than by the foregoing description, and all changes that come within the meaning and range of equivalency of the claims are intended to be embraced therein.

INCORPORATION BY REFERENCE

The entire disclosure of each of the patent documents and scientific articles referred to herein is incorporated by reference for all purposes.

What is claims is:

1. A method of measuring cellular activity in a tissue sample, comprising
    obtaining a tissue sample comprising living tumor cells derived from a biopsy of a human cancer patient, wherein the biopsy is a core needle biopsy and/or a forceps biopsy;
    obtaining a tissue section from the obtained tissue sample, wherein the tissue section comprises living tumor cells,
    wherein the tissue section comprising living tumor cells has a length between 100 μm to 8.81 mm,
    wherein the tissue section comprising living tumor cells has an approximate width between approximately 100 μm to 3 mm;
    wherein the tissue section comprising living tumor cells has an approximate height between approximately 100 μm to 1 mm;
    exposing the tissue section to a first stimulus at a first time point, wherein the first stimulus is a control stimulus comprising standard culture conditions suitable for maintaining viability of the tissue section;
    measuring cellular activity in the tissue section during and/or after exposure to the first stimulus;
    further exposing the tissue section to a second stimulus at a second time point after the first time point, wherein the second stimulus is an immune checkpoint inhibitor (ICI) added to the tissue section under standard culture conditions suitable for maintaining viability of the tissue section;
    measuring one or more cellular activities in the tissue section during and/or after exposure to the second stimulus;
    determining changes in cellular activity within the tissue section based on 1) the cellular activity measurements before the second time point, and during and/or after the first time point, and 2) the cellular activity measurements during and/or after the second time point;
    wherein the tissue section comprises living immune cells;
    wherein measuring the one or more cellular activities comprises measuring immune cell activity within the tissue section.

2. The method of claim 1, wherein determining the changes in cellular activity within the tissue section comprises determining slope-change of the measured cellular activity, and/or determining fold-change of the measured cellular activity.

3. The method of claim 1, wherein the living tumor cells are living solid tumor cells.

4. The method of claim 1, wherein the living tumor cells are living solid tumor cells related to a cancer selected from prostate, cervix, uterus, vaginal or other female adnexa, breast, naso-pharynx, trachea, larynx, bronchi, bronchioles, lung, hollow organs, esophagus, stomach, bile duct, intestine, colon, colorectum, rectum, bladder, ureter, kidney, liver, gallbladder, spleen, brain, lymphatic system, bones, skin and pancreas.

5. The method of claim 1, wherein the standard culture conditions suitable for maintaining the viability of the tissue section are standard culture conditions suitable for maintaining viability of the tissue section without changing cellular activity within the tissue section.

6. The method of claim 5, wherein the control stimulus is the standard culture conditions suitable for maintaining viability of the tissue section without changing cellular activity within the tissue section.

7. The method of claim 1, wherein the control stimulus is the standard culture conditions suitable for maintaining viability of the tissue section.

8. The method of claim 1, wherein the control stimulus is a purified control immunoglobulin added under culture conditions suitable for maintaining viability of the tissue section.

9. The method of claim 1, wherein the control stimulus is phosphate buffered saline (PBS) added under culture conditions suitable for maintaining viability of the tissue section without changing cellular activity within the tissue section.

10. The method of claim 1, wherein the control stimulus is a stimulus that does not induce changes in cellular activity within the tissue section comprising living tumor cells.

11. The method of claim 1, wherein the control stimulus is selected from the group consisting of a purified control immunoglobulin, phosphate buffered saline (PBS), and a biological buffer.

12. The method of claim 1, wherein the one or more ICIs is an inhibitor of programmed cell death protein 1 (PD-1), programmed death-ligand 1 (PD-L1), cytotoxic T-lymphocyte-associated protein 4 (CTLA4), lymphocyte-activation gene 3 (LAG3), T cell immunoreceptor with Ig and ITIM domains (TIGIT), T cell immunoglobulin and mucin-domain containing-3 (TIM3), V-domain immunoglobulin suppressor of T cell activation (VISTA), inducible T cell costimulator (ICOS), B and T lymphocyte attenuator (BTLA), glucocorticoid-induced tumor necrosis factor receptor (GITR), natural killer group 2 family of receptor A (NKG2A), CD112 receptor (CD112R), B7 homolog 3 (B7-H3), or ecto-5'-nucleotidase (CD73).

13. The method of claim 1, wherein the one or more ICIs is selected from the group consisting of nivolumab, pembrolizumab, ipilimumab, atezolizumab, avelumab, durvalumab, tremelimumab, cemiplimab, retifanlimab, dostarlimab, and toripalimab.

14. The method of claim 1,
    wherein cellular activity is measured in the tissue section continuously during and/or after the first time point but before the second time point; and/or wherein cellular activity is measured in the tissue section continuously during and/or after the second time point until an end-point.

15. The method of claim 1, wherein cellular activity is measured in the tissue section one or more times during and/or after the first time point but before the second time point; and/or
wherein cellular activity is measured in the tissue section one or more times during and/or after the second time point until an end-point.

16. The method of claim 1, wherein the one or more type of immune cell activity is selected from the group consisting of cytokine activity, macrophage activity, B lymphocyte activity, T lymphocyte activity, cytotoxic T-cell lymphocyte (CTL) activity, mast cell activity, monocyte activity, dendritic cell activity, eosinophil activity, natural killer cell activity, basophil activity, and neutrophil activity.

17. The method of claim 1, wherein the cellular activity is measured by one or more of the following: optical coherence microscopy (OCM), dynamic optical coherence microscopy (dOCM), multi-photon microscopy (MPM), fluorescent lifetime imaging microscopy (FLIM), bright field microscopy, fluorescence imaging with dyes, interferometry, or a combination thereof.

18. The method of claim 1, further comprising:
under culture conditions suitable for maintaining viability of the tissue section, further exposing the tissue section to a third stimulus,
measuring cellular activity in the tissue section during and/or after each exposure to the third stimulus, and
determining changes in cellular activity in the tissue sample following exposure to each of the third stimulus based on 1) the cellular activity measurement during and before any or all of the previous stimuli exposure, and 2) the cellular activity measurement during and/or after the most recent stimuli exposure.

19. The method of claim 1, wherein the living immune cells are one or more selected from the group consisting of macrophages, B lymphocytes, T lymphocytes, cytotoxic T-cell lymphocytes, mast cells, monocytes, dendritic cells, eosinophils, natural killer cells, basophils, and neutrophils.

* * * * *